US012801280B2

(12) United States Patent
Cooper et al.

(10) Patent No.: US 12,801,280 B2
(45) Date of Patent: Nov. 17, 2026

(54) BIOMETRIC-AUTHENTICATED PERSONAL HEALTH MONITOR DATA COMPACTION WITH CLINICAL TRIAL OPTIMIZATION

(71) Applicant: AtomBeam Technologies Inc., Moraga, CA (US)

(72) Inventors: Joshua Cooper, Columbia, SC (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/295,534

(22) Filed: Aug. 8, 2025

(65) Prior Publication Data

US 2025/0370620 A1 Dec. 4, 2025

Related U.S. Application Data

(63) Continuation-in-part of application No. 18/653,482, filed on May 2, 2024, now Pat. No. 12,430,026, (Continued)

(51) Int. Cl.
*G06F 3/06* (2006.01)
*G06F 21/32* (2013.01)
(Continued)

(52) U.S. Cl.
CPC .......... *G06F 3/0608* (2013.01); *G06F 3/0623* (2013.01); *G06F 3/0656* (2013.01); (Continued)

(58) Field of Classification Search
CPC .... G06F 3/0608; G06F 3/0623; G06F 3/0656; G06F 3/0659; G06F 3/067; G06F 3/0679; (Continued)

(56) References Cited

U.S. PATENT DOCUMENTS 5,452,358 A 9/1995 Normile et al.
6,807,312 B2 * 10/2004 Thomas .................. G06F 18/28 382/253

(Continued)

OTHER PUBLICATIONS

D. Del Testa and M. Rossi, "Lightweight Lossy Compression of Biometric Patterns via Denoising Autoencoders," in IEEE Signal Processing Letters, vol. 22, No. 12, pp. 2304-2308, Dec. 2015 (Year: 2025).*

(Continued)

*Primary Examiner* — Michael Alsip
(74) *Attorney, Agent, or Firm* — GALVIN PATENT LAW LLC; Brian R. Galvin

(57) ABSTRACT

A system and method for biometric-authenticated personal health monitor data compaction with clinical trial optimization is disclosed. The system receives biometric signals from multiple sensor modalities associated with a patient and extracts distinctive biometric features using signal processing algorithms. Patient identity verification is performed by comparing extracted features against stored biometric templates, generating cryptographic keys derived from verified biometric characteristics. Health data is divided into sourceblocks and encoded using multiple compression codebooks enhanced with biometric-derived cryptographic keys. Optimal encoded sourceblocks are selected based on compression efficiency and statistical preservation requirements. A clinical trial data optimization engine classifies health data by type and endpoint significance, determines statistical preservation requirements for regulatory compliance, and validates that compressed data maintains required statistical properties for clinical analysis. The system implements multi-modal biometric fusion, liveness detection, emergency override capabilities, and security controls including role-based access control and audit logging for secure clinical trial data management.

18 Claims, 46 Drawing Sheets

Related U.S. Application Data which is a continuation of application No. 18/396,508, filed on Dec. 26, 2023, now Pat. No. 12,039,164, which is a continuation-in-part of application No. 18/147,707, filed on Dec. 29, 2022, now Pat. No. 11,853,550, which is a continuation of application No. 17/727,913, filed on Apr. 25, 2022, now Pat. No. 11,620,051, which is a continuation of application No. 17/404,699, filed on Aug. 17, 2021, now Pat. No. 11,385,794.

(51) Int. Cl.
*H03M 7/30* (2006.01)
*H03M 7/40* (2006.01)

(52) U.S. Cl.
CPC ............ *G06F 3/0659* (2013.01); *G06F 3/067* (2013.01); *G06F 3/0679* (2013.01); *G06F 21/32* (2013.01); *H03M 7/405* (2013.01); *H03M 7/6005* (2013.01); *H03M 7/6011* (2013.01)

(58) Field of Classification Search
CPC ..... G06F 21/32; H03M 7/405; H03M 7/6005; H03M 7/6011
See application file for complete search history.

(56) References Cited

U.S. PATENT DOCUMENTS

| | | | | |
|---|---|---|---|---|
| 7,667,630 | B2 | 2/2010 | Harada et al. | |
| 7,844,827 | B1 * | 11/2010 | Itoi ....................... | H04L 9/0866 713/186 |
| 8,453,040 | B2 | 5/2013 | Henderson, Jr. et al. | |
| 9,165,130 | B2 * | 10/2015 | Malpani .................. | G06F 21/32 |
| 9,294,589 | B2 | 3/2016 | Crosta et al. | |
| 9,681,147 | B2 * | 6/2017 | Mahfoodh ........... | H04N 19/176 |
| 10,255,315 | B2 | 4/2019 | Kalevo et al. | |
| 10,264,262 | B2 | 4/2019 | Swaminathan et al. | |
| 10,346,043 | B2 | 7/2019 | Golden et al. | |
| 11,086,843 | B2 | 8/2021 | Swaminathan et al. | |
| 11,227,037 | B2 * | 1/2022 | Takahashi ............. | H04L 9/3242 |
| 2020/0128307 | A1 | 4/2020 | Li | |

OTHER PUBLICATIONS

Baohua Wang and Guoxin Yuan, "Compression of ECG data by vector quantization," in IEEE Engineering in Medicine and Biology Magazine, vol. 16, No. 4, pp. 23-26, Jul.-Aug. 1997 (Year: 1997).*

* cited by examiner

3401

| | | | | | | | | | |
|---|---|---|---|---|---|---|---|---|---|
| 3402 → | Bit | 7 | 6 | 5 | 4 | 3 | 2 | 1 | 0 |
| 3403 → | | N | R | R | R | I | C | C | C |

Control Byte

N= Next nibble (If 1, the next 4 bits (I C C C) are control bits)

RRR = Residual count (bits not used in the last byte of the code packet)

I for Codebook ID. (1 if UUID follows in the next four bytes; if the I flag is off, then use the CCC bits to index the Codebook in the cache.)

CCC = Codebook cache index

Fig. 34

BIOMETRIC-AUTHENTICATED PERSONAL HEALTH MONITOR DATA COMPACTION WITH CLINICAL TRIAL OPTIMIZATION

CROSS-REFERENCE TO RELATED APPLICATIONS

Priority is claimed in the application data sheet to the following patents or patent applications, of each of which is expressly incorporated herein by reference in its entirety:

Ser. No. 18/653,482
Ser. No. 18/396,508
Ser. No. 18/147,707
Ser. No. 17/727,913
Ser. No. 17/404,699

BACKGROUND OF THE INVENTION

Field of the Invention

The present invention is in the field of computer data encoding and biometric authentication, and in particular the usage of biometric-authenticated encoding for enhanced security and compaction of personal health data in clinical trial environments.

Discussion of the State of the Art

Smart wearable devices and personal health monitoring systems have become increasingly prevalent in clinical research and healthcare delivery. These devices collect vast amounts of sensitive biometric and health data including physiological measurements, activity patterns, and clinical assessments that require secure storage, transmission, and analysis. The integration of personal health monitoring devices into clinical trials has enabled new paradigms for decentralized clinical research, remote patient monitoring, and real-time safety surveillance.

However, current health data management systems face significant security and efficiency challenges. Biometric and health data is highly personal and sensitive, including information about an individual's physical health, activity levels, medical conditions, and potentially genetic information. Unauthorized access to this information could lead to privacy breaches, identity theft, discrimination, and potential harm to clinical trial participants. In clinical trial environments, data security is further complicated by multi-site data collection, regulatory compliance requirements, and the need for real-time safety monitoring across distributed patient populations.

Existing data compression and security systems typically use single encoding algorithms and traditional authentication methods that do not leverage the inherent biometric characteristics of patients. Traditional authentication systems rely on passwords, tokens, or certificates that can be stolen, shared, or compromised, creating security vulnerabilities in clinical data systems. Single-algorithm compression approaches do not optimize compression efficiency for different types of clinical data and fail to provide the multi-layered security required for sensitive health information.

Clinical trial data presents unique challenges for compression and security systems. Different types of clinical data, including primary endpoints, secondary endpoints, safety data, and supporting measurements, have varying requirements for statistical preservation and regulatory compliance. Current compression systems do not account for these clinical research requirements and may compromise the statistical integrity necessary for regulatory submissions and scientific analysis.

Furthermore, clinical trials increasingly operate across multiple sites and involve remote patient monitoring, creating complex data flow requirements and security challenges. Traditional centralized data management approaches are inadequate for distributed clinical trials that require real-time data integration, site-specific access controls, and emergency medical override capabilities.

Patient identity verification in clinical trials currently relies on traditional identification methods that are vulnerable to errors, fraud, and privacy breaches. The lack of continuous patient authentication creates opportunities for data misattribution, protocol violations, and compromised trial integrity. Emergency medical situations require rapid access to patient data, but current systems lack appropriate emergency override mechanisms that balance rapid access with security controls and audit requirements.

What is needed is a system and method for encoding personal health information using patient-specific biometric authentication that provides enhanced security through multi-modal biometric verification while optimizing data compression for clinical trial requirements.

SUMMARY OF THE INVENTION

The inventor has developed a system and method for biometric-authenticated personal health monitor data compaction with clinical trial optimization is disclosed. The system receives biometric signals from multiple sensor modalities associated with a patient and extracts distinctive biometric features using signal processing algorithms. Patient identity verification is performed by comparing extracted features against stored biometric templates, generating cryptographic keys derived from verified biometric characteristics. Health data is divided into sourceblocks and encoded using multiple compression codebooks enhanced with biometric-derived cryptographic keys. Optimal encoded sourceblocks are selected based on compression efficiency and statistical preservation requirements. A clinical trial data optimization engine classifies health data by type and endpoint significance, determines statistical preservation requirements for regulatory compliance, and validates that compressed data maintains required statistical properties for clinical analysis. The system implements multi-modal biometric fusion, liveness detection, emergency override capabilities, and security controls including role-based access control and audit logging for secure clinical trial data management.

According to a preferred embodiment, a system for biometric-authenticated health data compaction is disclosed, comprising: a computing device comprising a processor, a memory, and a non-volatile data storage device; a biometric authentication module comprising a first plurality of programming instructions stored in the memory and operable on the processor, wherein the first plurality of programming instructions, when operating on the processor, causes the processor to: receive biometric signals from a plurality of biometric sensors associated with a patient; extract biometric features from the received biometric signals using signal processing algorithms; perform patient identity verification by comparing the extracted biometric features against stored biometric templates; generate authentication credentials comprising cryptographic keys derived from the verified biometric features; and determine security access levels based on biometric authentication confidence scores; and a multi-codebook compaction system comprising a second plurality of programming instructions stored in the memory and operable on the processor, wherein the second plurality of programming instructions, when operating on the processor, causes the processor to: receive health data from the patient; divide the health data into a plurality of sourceblocks; encode each sourceblock using a plurality of compression codebooks enhanced with the cryptographic keys derived from the biometric authentication; select optimal encoded sourceblocks based on compression efficiency; and generate compressed health data comprising encoded sourceblocks with associated codebook identifiers and authentication metadata.

According to another preferred embodiment, a method for biometric-authenticated health data compaction is disclosed, comprising the steps of: receiving biometric signals from a plurality of biometric sensors associated with a patient; extracting biometric features from the received biometric signals using signal processing algorithms; performing patient identity verification by comparing the extracted biometric features against stored biometric templates; generating authentication credentials comprising cryptographic keys derived from the verified biometric features; determining security access levels based on biometric authentication confidence scores; receiving health data from the patient; dividing the health data into a plurality of sourceblocks; encoding each sourceblock using a plurality of compression codebooks enhanced with the cryptographic keys derived from the biometric authentication; selecting optimal encoded sourceblocks based on compression efficiency; and generating compressed health data comprising encoded sourceblocks with associated codebook identifiers and authentication metadata.

According to a further aspect, the method includes classifying the health data by clinical data type and trial endpoint significance; determining statistical preservation requirements based on regulatory compliance standards; selecting specialized compression codebooks optimized for clinical research data; and validating compressed health data maintains required statistical properties for clinical analysis.

According to a further aspect, the method includes biometric signals comprising at least two of: heart rate variability data, gait analysis data, voice pattern data, blood pressure waveform data, and breathing pattern data.

According to a further aspect, the method includes performing multi-modal biometric fusion by combining biometric features from multiple biometric modalities using mathematical fusion algorithms; and detecting liveness of the biometric signals using temporal analysis and physiological correlation verification.

According to a further aspect, the method includes detecting medical emergency conditions based on biometric anomalies or external emergency signals; performing streamlined authentication using healthcare provider credentials; and providing rapid access to compressed health data while maintaining audit trail integrity.

According to a further aspect, the method includes dynamically rotating compression codebooks based on biometric-derived selection parameters; and varying sourceblock sizes for individual sourceblocks to enhance encoding security.

According to a further aspect, the method includes classifying the health data by categorizing the health data into: primary endpoint data requiring maximum statistical preservation; secondary endpoint data requiring high statistical preservation; and safety data requiring specialized adverse event preservation protocols.

According to a further aspect, the method includes deriving codebook selection seeds from the biometric features using cryptographic key derivation functions; and creating session management tokens for continuous authentication during extended data collection periods.

According to a further aspect, the method includes implementing role-based access control using hierarchical user permissions; generating comprehensive audit logs of all authentication and data access events; and monitoring for authentication anomalies and security threats.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 34 is a flow diagram describing an exemplary codebook sorting algorithm for determining a plurality of codebooks to be shuffled between during the encoding process.

Figure 44A:
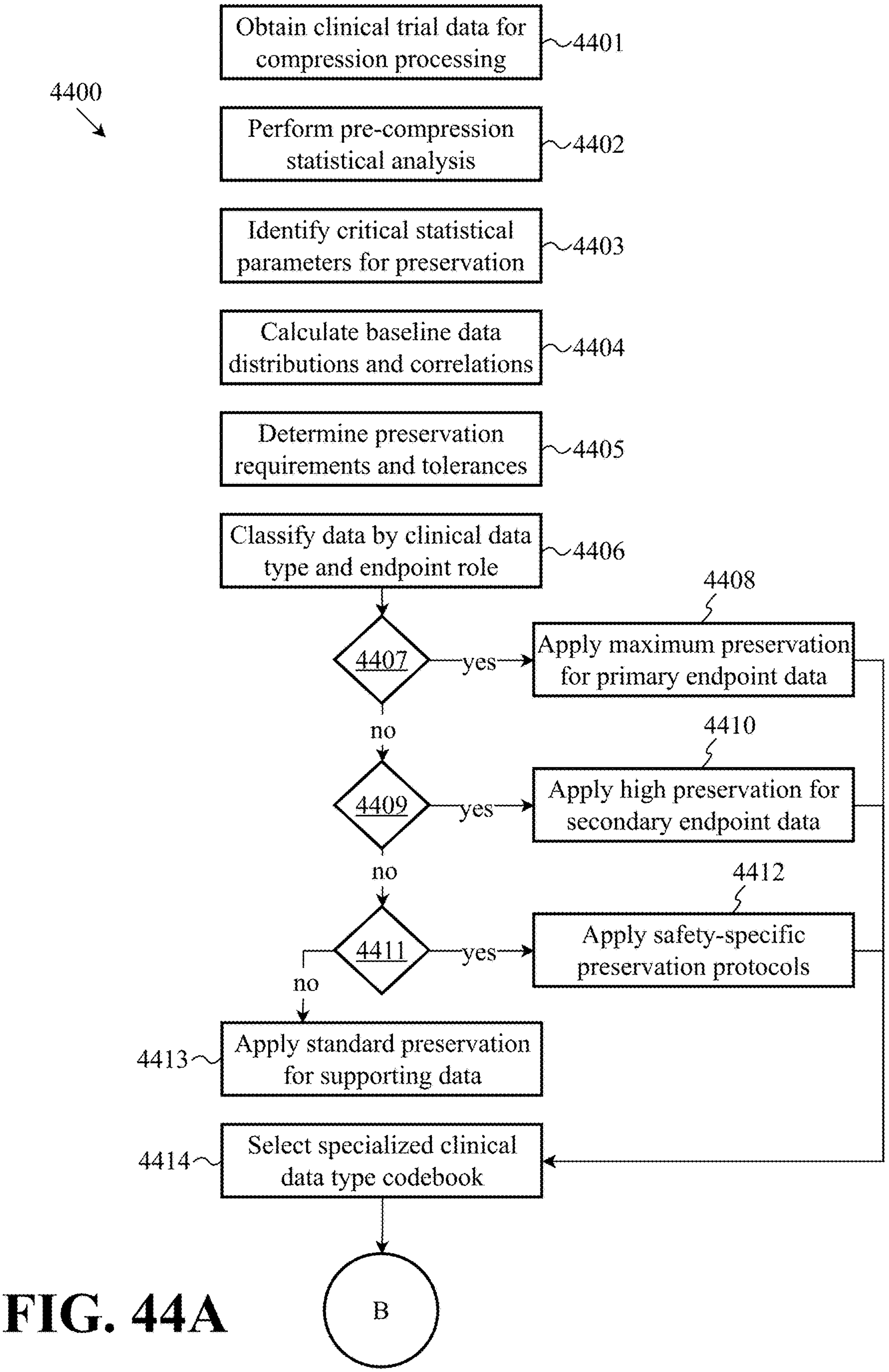
Figure 44B:
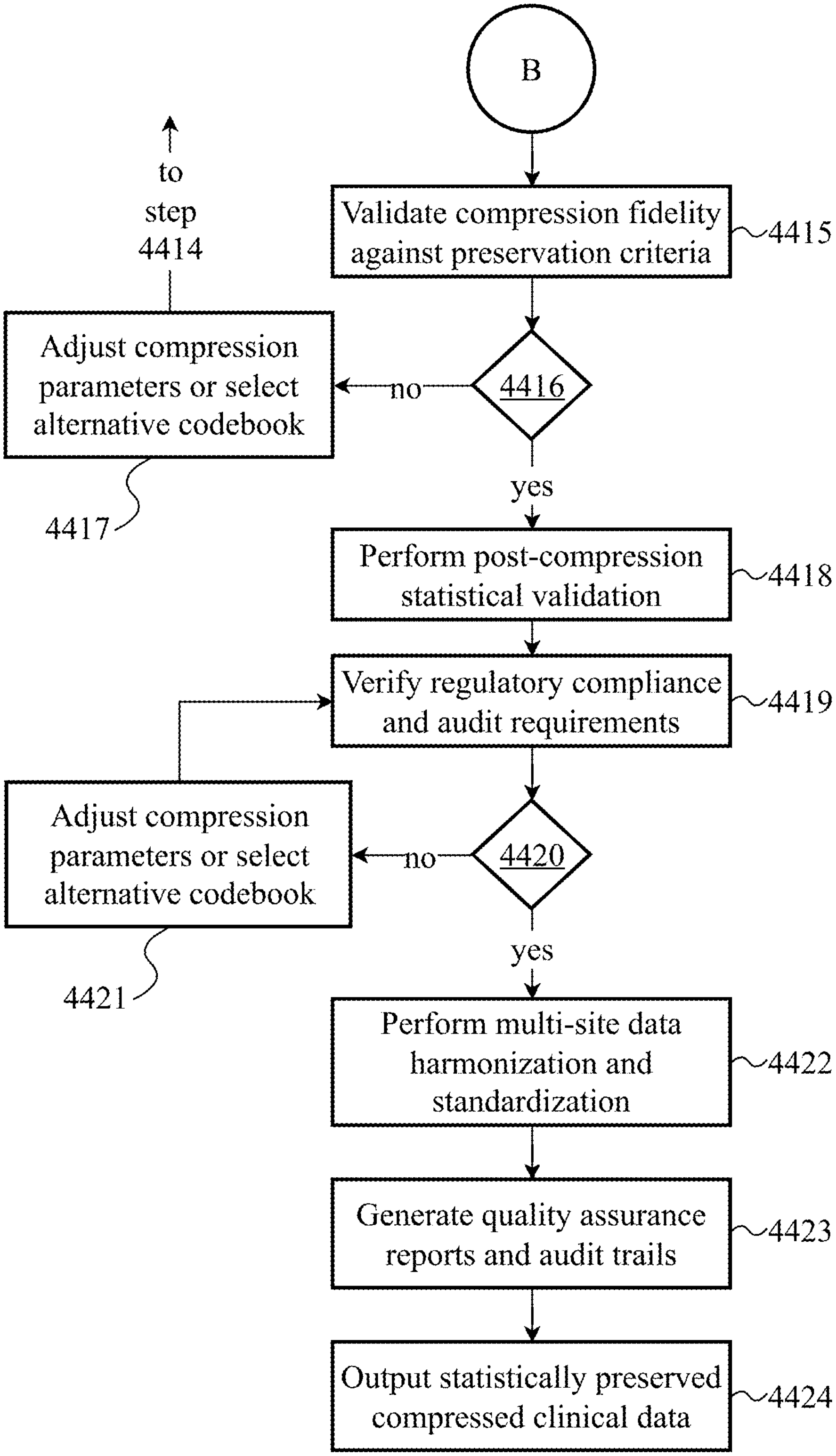

FIGS. 44A and 44B provide a method flow diagram illustrating a clinical trial data statistical preservation algorithm for maintaining research data integrity during compression processing, according to an embodiment.

Figure 45:
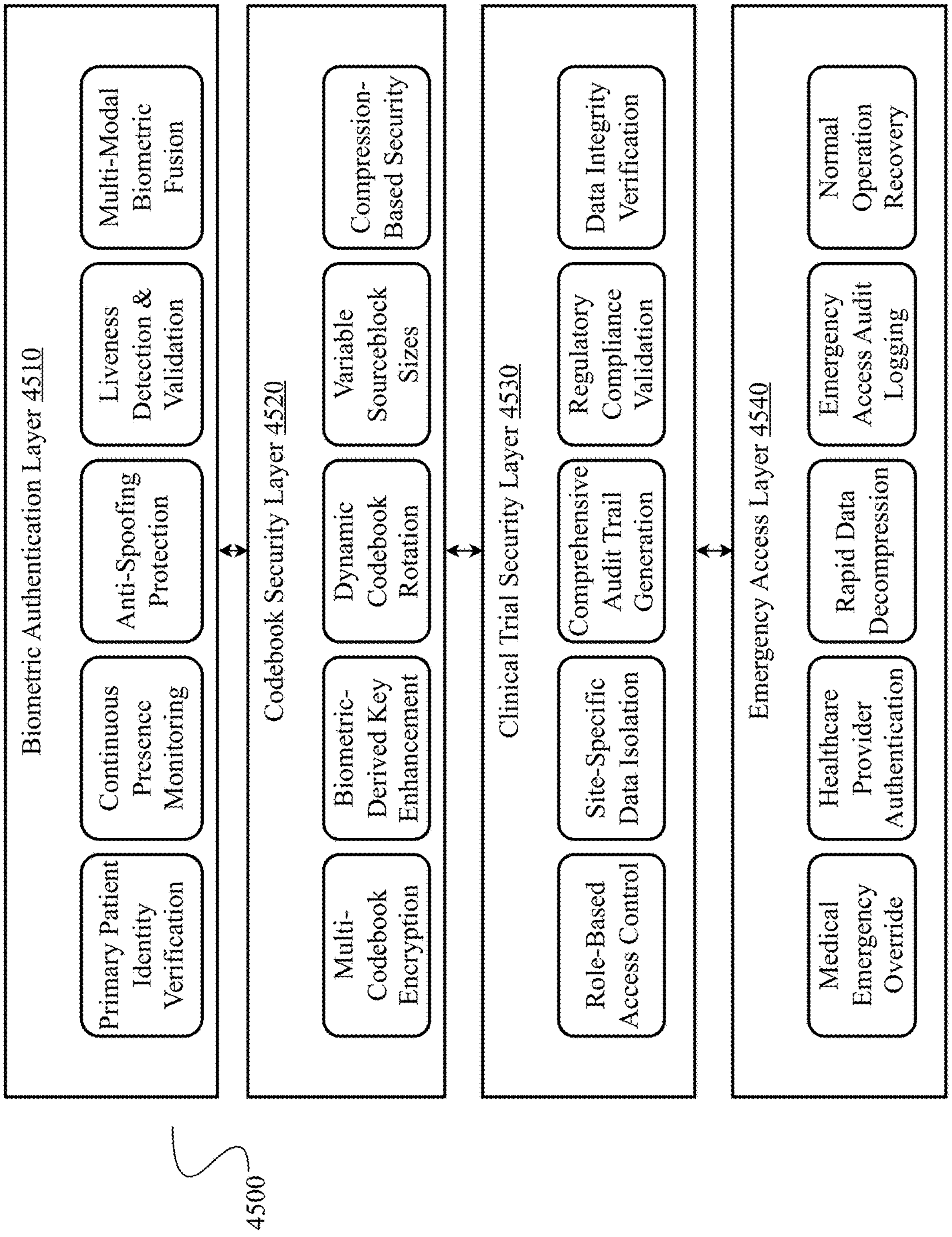

FIG. 45 is a system architecture diagram illustrating an integrated security framework with multi-layer protection for biometric-authenticated health data compression systems, according to an embodiment.

DETAILED DESCRIPTION OF THE INVENTION

The inventor has conceived, and reduced to practice, a system and method for encoding personal health monitor data using a plurality of encoding libraries.

Data encoded using multiple codebooks (i.e., encoding/decoding libraries) can provide substantial increased compaction performance compared with using a single codebook, even where the single codebook provides the best average compaction of a plurality of codebooks. The methodology described herein improves data compaction by compacting different portions of data using different codebooks, depending on which codebook provides the greatest compaction for a given portion of data.

In some embodiments, for each sourcepacket of a data set arriving at the encoder, the encoder encodes each sourcepacket using a selection of different codebooks and chooses the codebooks with the highest compaction for the sourcepacket, thus maximizing compaction of the data set as a whole. This approach yields higher compaction rates than using a single codebook, since each sourceblock is compacted according to the codebook giving the highest compaction rate, and not according to an average compaction rate of a single codebook. In some embodiments, the combination of codebooks used may combined together as a new codebook. In other embodiments, the combination of codebooks may be left as separate codebooks, but the codebooks used for encoding of each sourcebook are recorded. Not only does this method maximize compaction of a data set, but also increases security of the data set by in proportion to the number of codebooks used in compaction of the data set, as multiple codebooks would be required to decode each data set.

In some embodiments, each sourcepacket of a data set arriving at the encoder is encoded using a different sourceblock length. Changing the sourceblock length changes the encoding output of a given codebook. Two sourcepackets encoded with the same codebook but using different sourceblock lengths would produce different encoded outputs. Therefore, changing the sourceblock length of some or all sourcepackets in a data set provides additional security. Even if the codebook was known, the sourceblock length would have to be known or derived for each sourceblock in order to decode the data set. Changing the sourceblock length may be used in conjunction with the use of multiple codebooks.

In some embodiments, additional security may be provided by rotating or shuffling codebooks according to a rotation list or according to a random or pseudo-random shuffling function. In one embodiment, prior to transmission, the endpoints (users or devices) of a transmission agree in advance about the rotation list or shuffling function to be used, along with any necessary input parameters such as a list order, function code, cryptographic key, or other indicator, depending on the requirements of the type of list or function being used. Once the rotation list or shuffling function is agreed, the endpoints can encode and decode transmissions from one another using the encodings set forth in the current codebook in the rotation or shuffle plus any necessary input parameters. In some embodiments, the shuffling function may be restricted to permutations within a set of codewords of a given length.

Some non-limiting functions that may be used for shuffling include: 1. given a function f (n) which returns a codebook according to an input parameter n in the range 1 to N are, and given t the number of the current sourcepacket or sourceblock: f (t*M modulo p), where Mis an arbitrary multiplying factor (1<=M<=p−1) which acts as a key, and p is a large prime number less than or equal to N; 2. f(A^t modulo p), where A is a base relatively prime to p−1 which acts as a key, and p is a large prime number less than or equal to N; 3. f(floor(t*x) modulo N), and x is an irrational number chosen randomly to act as a key; 4. f(t XOR K) where the XOR is performed bit-wise on the binary representations of t and a key K with same number of bits in its representation of N. The function f(n) may return the nth codebook simply by referencing the nth element in a list of codebooks, or it could return the nth codebook given by a formula chosen by a user.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The term "codebook" refers to a database containing sourceblocks each with a pattern of bits and reference code unique within that library. The terms "library" and "encoding/decoding library" are synonymous with the term codebook.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data" means information in any computer-readable form.

The term "data set" refers to a grouping of data for a particular purpose. One example of a data set might be a word processing file containing text and formatting information.

The term "effective compression" or "effective compression ratio" refers to the additional amount data that can be stored using the method herein described versus conventional data storage methods. Although the method herein described is not data compression, per se, expressing the additional capacity in terms of compression is a useful comparison.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term "codeword" refers to the reference code form in which data is stored or transmitted in an aspect of the system. A codeword consists of a reference code to a sourceblock in the library plus an indication of that sourceblock's location in a particular data set.

Conceptual Architecture

Figure 40:
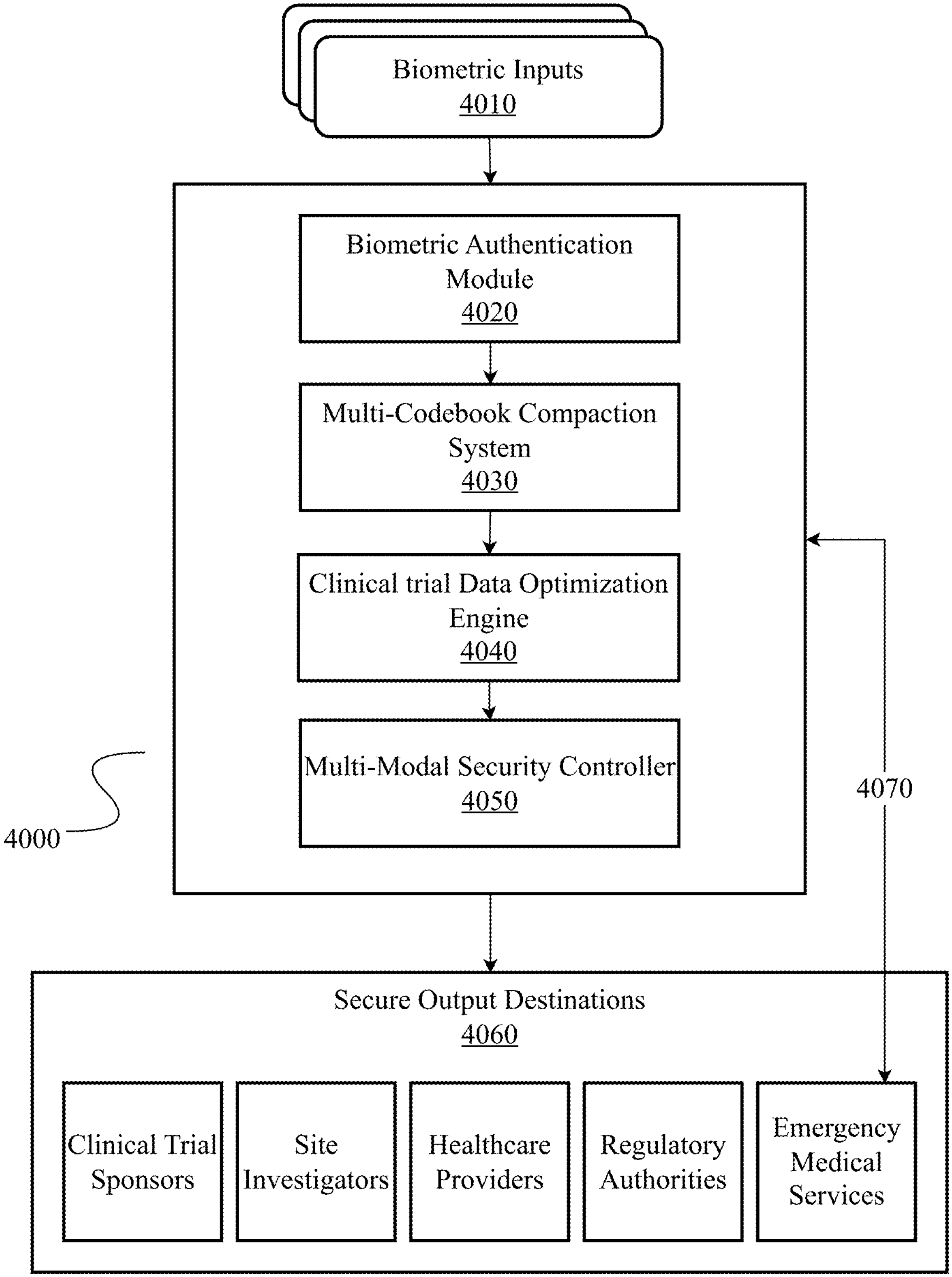
FIG. 40 is a block diagram illustrating an exemplary system architecture for biometric-authenticated personal health data compaction with clinical trial optimization, according to an embodiment.

FIG. 40 is a block diagram illustrating an exemplary system architecture 4000 for biometric-authenticated personal health data compaction with clinical trial optimization, according to an embodiment. System architecture 4000 demonstrates the integration of biometric authentication and clinical trial optimization capabilities with multi-codebook data compaction to provide enhanced security, personalized compression, and research-grade data integrity.

According to the embodiment, system 4000 comprises three primary layers: an input layer, a processing layer, and an output layer. The input layer includes patient biometric inputs 4010 comprising a plurality of biometric sensors and data collection devices configured to capture physiological characteristics unique to individual patients. Patient biometric inputs 4010 may include, but are not limited to, heart rate variability (HRV) sensors capable of detecting cardiac rhythm patterns, gait analysis systems utilizing accelerometers and gyroscopes to capture walking patterns, voice pattern recognition devices employing acoustic analysis, blood pressure monitors measuring arterial pressure waveforms, breathing pattern sensors detecting respiratory characteristics, and other physiological monitoring devices capable of generating measurable biometric signatures. The biometric data collected may include both static biometric features that remain relatively constant over time and dynamic biometric features that may vary based on patient condition, activity level, or other factors. Additionally, the input layer receives traditional health data input from various sources such as wearable devices, health monitors, mobile applications, Internet-of-Things (IoT) devices, exercise equipment, environmental sensors, and other health data generation systems.

The processing layer comprises various interconnected components configured to provide enhanced data compression with biometric authentication and clinical trial optimization capabilities. A biometric authentication module 4020 is configured to convert patient biometric signals into dynamic codebook selection keys and authentication credentials. Biometric authentication module 4020 employs signal processing algorithms to extract distinctive features from raw biometric data streams, applies pattern recognition techniques to identify patient-specific characteristics, and generates cryptographic keys and authentication tokens that are used to control access to and selection of encoding codebooks. Biometric authentication module 4020 may implement multiple biometric modalities simultaneously to enhance security through multi-factor authentication, and may include liveness detection capabilities to prevent spoofing or replay attacks. The biometric authentication process may operate continuously during data collection to provide ongoing verification of patient identity and detect any unauthorized access attempts.

A multi-codebook compaction system 4030 has been enhanced to incorporate biometric-derived codebook selection keys generated by biometric authentication module 4020. This integration allows multi-codebook compaction system 4030 to leverage patient-specific biometric characteristics for improved security and personalized compression optimization. Multi-codebook compaction system 4030 may dynamically select from a plurality of available codebooks based on biometric authentication results, patient-specific optimization parameters, data type characteristics, and security requirements. The biometric-derived keys may influence codebook selection algorithms, sourceblock size determination, and encoding sequence generation to create patient-specific compression patterns that enhance both security and compression efficiency.

A clinical trial data optimization engine 4040 is specifically configured to preserve statistical integrity for research applications and ensure regulatory compliance. Clinical trial data optimization engine 4040 implements specialized compression algorithms that maintain statistical properties essential for clinical research, including, but not limited to, preservation of data distributions, correlation structures, variance characteristics, and temporal relationships critical for efficacy and safety analyses. Clinical trial data optimization engine 4040 may employ different processing strategies for various types of clinical data, such as adverse event reports, laboratory values, patient-reported outcomes, imaging data, and genomic information. Clinical trial data optimization engine 4040 includes validation mechanisms to ensure that compressed data maintains the statistical characteristics required for regulatory submissions and clinical decision-making, and may incorporate multi-site data harmonization capabilities to standardize data formats and quality across distributed clinical trial locations.

A multi-modal security controller 4050 is configured to manage role-based access control, audit trail management, and security policy coordination across the entire system. Multi-modal security controller 4050 implements hierarchical access controls that determine which users, systems, or applications can access specific types of compressed health data based on authentication credentials, role assignments, and contextual factors such as emergency situations. Multi-modal security controller 4050 maintains comprehensive audit logs of all data access, compression, and transmission activities to support regulatory compliance and security monitoring requirements. Multi-modal security controller 4050 may also coordinate encryption policies, key management procedures, and data anonymization protocols to ensure appropriate protection of patient privacy and data integrity throughout the compression and distribution process.

The output layer comprises a plurality of secure output destinations 4060 configured to receive appropriately formatted and secured compressed health data according to the specific requirements and authorization levels of each destination type. Secure output destinations 4060 may include clinical trial sponsors who receive aggregated and de-identified datasets suitable for regulatory submissions and research analysis, site investigators who receive site-specific patient data with appropriate access controls and audit capabilities, healthcare providers who receive patient medical records formatted for clinical decision support, regulatory authorities who receive compliance-validated submission data with full documentation and traceability, and emergency medical services who have access to rapid decompression capabilities for immediate patient care during medical emergencies. Each destination type may receive data in different formats, with varying levels of compression, encryption, and access controls appropriate to the intended use and regulatory requirements.

Data flow within system 4000 proceeds sequentially through the processing components with appropriate feedback and control mechanisms. Patient biometric inputs 4010 are processed by biometric authentication module 4020 to generate authentication credentials and codebook selection parameters that are passed to multi-codebook compaction system 4030. Multi-codebook compaction system 4030 processes health data using biometric-derived keys for enhanced codebook selection and security, then passes compressed data to clinical trial data optimization engine 4040 for research-specific processing, statistical validation, and regulatory compliance checking. Clinical trial data optimization engine 4040 forwards processed data to multi-modal security controller 4050, which applies final security policies, access controls, and audit procedures before distributing data to appropriate secure output destinations 4060. Throughout this process, system 4000 maintains data integrity, traceability, and compliance with applicable healthcare data protection regulations.

System 4000 includes an emergency override pathway 4070 that provides rapid access to critical health data during medical emergencies while maintaining security and audit integrity. Emergency override pathway 4070 implements streamlined authentication procedures for authorized emergency medical personnel, enables rapid decompression of patient health data when immediate medical intervention is required, and maintains complete audit trails of emergency access events for subsequent review and compliance purposes. Emergency override pathway 4070 may include multiple authorization levels and approval mechanisms to balance the need for rapid access during emergencies with appropriate security controls and patient privacy protections.

According to various embodiments, the components of system 4000 may be implemented using different deployment architectures depending on computational requirements, security needs, and operational constraints. Biometric authentication module 4020 may be integrated with multi-codebook compaction system 4030 on the same computing device for applications requiring minimal latency, or may be distributed across multiple computing devices in communication over secure networks for applications requiring enhanced security or computational scalability. Similarly, clinical trial data optimization engine 4040 and multi-modal security controller 4050 may be implemented as integrated components within a single system or as distributed services depending on the specific requirements of clinical trial protocols, regulatory compliance needs, and organizational security policies.

Decentralized Clinical Trial Implementation Architecture

A decentralized clinical trial implementation architecture enables geographically distributed clinical research using biometric-authenticated data compression and multi-site coordination, according to an embodiment. The decentralized clinical trial implementation architecture enables geographically distributed clinical trials with enhanced patient participation, reduced site burden, and improved data quality through advanced compression and security technologies.

According to the embodiment, the decentralized clinical trial implementation architecture comprises multiple interconnected components that enable distributed clinical trial conduct while maintaining data integrity, regulatory compliance, and patient safety monitoring capabilities. A central clinical trial management system serves as the coordination hub for distributed trial operations and implements protocol management, data aggregation, regulatory coordination, and centralized safety monitoring across all participating sites and patient locations.

Protocol management implements standardized trial procedures using protocol distribution systems, version control mechanisms, and compliance monitoring tools that ensure consistent trial conduct across all sites regardless of geographic location or local operational variations. Protocol management may employ various approaches including automated protocol distribution, real-time protocol updates, or compliance tracking systems that maintain protocol adherence across distributed trial networks.

A data aggregation engine implements centralized data collection using standardized data formats, automated data integration procedures, and quality assurance protocols that combine clinical data from multiple sources while maintaining data integrity and statistical validity. Data aggregation may employ various strategies including real-time data streaming, batch data processing, or hybrid approaches that optimize data integration efficiency while ensuring comprehensive data capture across distributed trial sites.

Regulatory coordination implements compliance management using regulatory guideline interpretation, submission preparation tools, and authority communication protocols that ensure distributed trials meet applicable regulatory requirements across multiple jurisdictions. Regulatory coordination may employ various approaches including automated compliance checking, regulatory liaison management, or multi-jurisdictional submission coordination that address the complex regulatory landscape of international clinical trials.

Central safety monitoring implements real-time safety surveillance using automated safety signal detection, adverse event analysis, and risk assessment protocols that provide comprehensive safety oversight across distributed trial populations. Safety monitoring may employ various strategies including statistical safety algorithms, machine learning anomaly detection, or expert system safety evaluation that identify safety signals rapidly across geographically distributed patient populations.

A centralized multi-codebook compression controller coordinates data compression activities across all trial sites using standardized compression protocols, codebook distribution mechanisms, and compression quality assurance procedures that ensure consistent data processing while maintaining statistical preservation and regulatory compliance across distributed trial networks.

Site-specific data collection nodes implement local clinical trial operations using standardized data collection procedures, local patient management systems, and site-specific biometric authentication capabilities. Traditional clinical trial sites represent physical locations with on-site patient visits, local data collection capabilities, and direct patient interaction facilities, while remote sites represent fully virtual trial locations supporting remote patient participation through telemedicine and home monitoring technologies.

Local patient enrollment implements site-specific recruitment using local advertising, physician referrals, and community outreach programs that enable geographically diverse patient populations to participate in clinical trials without travel barriers. Patient enrollment may employ various approaches including digital recruitment platforms, community partnerships, or targeted demographic outreach that enhance trial diversity and accessibility.

Local data collection implements standardized data gathering using electronic case report forms, clinical assessment protocols, and biometric measurement procedures that capture comprehensive clinical trial data while maintaining consistency across distributed sites. Data collection may employ various strategies including automated data capture, mobile data collection platforms, or hybrid approaches that optimize data quality while reducing site burden and patient inconvenience.

Local data processing implements site-specific data management using compression algorithms, quality assurance procedures, and security protocols that prepare clinical data for transmission to central management systems while maintaining data integrity and patient privacy. Local processing may employ various approaches including real-time data processing, batch processing systems, or edge computing solutions that optimize data handling efficiency while ensuring regulatory compliance.

Biometric authentication modules implement patient identity verification using multi-modal biometric systems, continuous authentication protocols, and anti-spoofing protection that ensure data integrity and patient safety across distributed trial sites. Biometric authentication may employ various strategies including physiological signal analysis, behavioral pattern recognition, or challenge-response protocols that provide robust patient identification while maintaining usability for diverse patient populations.

Patient home monitoring systems enable remote clinical trial participation using wearable devices, mobile health applications, home IoT sensors, and telemedicine portals that capture comprehensive clinical data without requiring physical site visits. Home monitoring may employ various approaches including continuous monitoring, periodic assessment, or event-driven data collection that optimize patient convenience while maintaining data quality and regulatory compliance.

Wearable devices implement continuous physiological monitoring using advanced sensor technologies, wireless communication protocols, and local data processing capabilities that capture real-time health data throughout daily activities. Mobile health applications implement patient-reported outcome collection, medication compliance tracking, and interactive health assessments that enable comprehensive patient participation in clinical trials from home environments.

Home IoT sensors implement environmental monitoring, activity tracking, and physiological measurement capabilities that provide contextual health information supporting clinical trial assessments. Telemedicine portals implement remote clinical consultations, virtual health assessments, and healthcare provider communication that enable clinical trial participation without geographic constraints.

Local data compression engines implement patient-specific data processing using biometric-derived compression keys, specialized clinical codebooks, and statistical preservation algorithms that optimize data transmission efficiency while maintaining clinical research validity. Patient biometric authentication implements continuous identity verification, anti-spoofing protection, and privacy preservation that ensure data security and patient safety in home monitoring environments.

A sponsor data analytics platform implements comprehensive clinical trial analysis using data integration capabilities, statistical analysis tools, safety databases, and regulatory reporting systems that support clinical development decision-making and regulatory submissions. The data integration hub implements standardized data formats, automated data mapping, and quality assurance procedures that combine clinical data from distributed sources while maintaining analytical validity.

Statistical analysis implements specialized clinical research analytics using biostatistical methods, efficacy assessment procedures, and safety evaluation algorithms that support clinical trial conclusions and regulatory decision-making. Safety databases implement comprehensive adverse event tracking, safety signal detection, and risk assessment capabilities that ensure patient safety across distributed trial populations.

Regulatory reporting implements automated submission preparation, regulatory guideline compliance, and authority communication that support efficient regulatory review and approval processes. Multi-codebook decompression and analysis engines implement specialized data processing using compression algorithm coordination, statistical preservation validation, and analytical software integration that enable comprehensive clinical trial analysis using compressed data.

A regulatory submission interface implements comprehensive regulatory compliance using submission preparation tools, regulatory guideline interpretation, and authority communication protocols that support efficient regulatory review across multiple jurisdictions. FDA submission portals, EMA interfaces, and global regulatory authority connections implement jurisdiction-specific submission requirements and communication protocols.

CDISC standards implementation ensures clinical data interchange compatibility using standardized data models, controlled terminology, and metadata specifications that support regulatory submissions and cross-trial analysis. Audit trail systems implement comprehensive documentation using event logging, data lineage tracking, and compliance verification that support regulatory inspection and scientific peer review.

Compliance validation implements automated regulatory checking using guideline interpretation, policy enforcement, and validation procedures that ensure continuous compliance throughout distributed clinical trial conduct.

Secure communication and data flow management implements comprehensive security using encrypted communication channels, VPN networking, federated identity management, role-based access control, data integrity verification, and real-time compliance monitoring that protect patient data and ensure regulatory compliance across distributed trial networks.

Encrypted communication channels implement secure data transmission using advanced encryption protocols, secure key management, and communication integrity verification that protect clinical data during transmission across distributed networks. VPN and secure networking implement network-level security using virtual private networks, secure routing protocols, and network access control that provide comprehensive communication protection.

Federated identity management implements unified authentication using cross-organizational identity verification, single sign-on capabilities, and role-based access control that enable secure collaboration across distributed trial organizations. Role-based access control implements hierarchical authorization using user role definitions, permission matrices, and contextual access policies that ensure appropriate data access based on organizational responsibilities and trial requirements.

Data integrity verification implements tamper detection using cryptographic integrity checking, audit trail validation, and automated verification procedures that ensure data accuracy throughout distributed trial operations. Real-time compliance monitoring implements continuous regulatory oversight using automated compliance checking, policy enforcement, and regulatory reporting that maintain compliance throughout distributed trial conduct.

A real-time trial monitoring dashboard implements comprehensive trial oversight using patient enrollment tracking, data quality metrics, safety alerts, compliance status monitoring, site performance assessment, compression statistics, and security status monitoring that provide comprehensive visibility into distributed trial operations.

Patient enrollment tracking implements real-time recruitment monitoring using enrollment rate analysis, demographic tracking, and recruitment effectiveness assessment that optimize trial recruitment across distributed sites. Data quality metrics implement continuous data assessment using quality scoring, completeness analysis, and accuracy verification that ensure high-quality clinical data across distributed collection points.

Safety alerts implement real-time safety monitoring using automated signal detection, adverse event tracking, and risk assessment that provide immediate notification of safety concerns across distributed trial populations. Compliance status monitoring implements continuous regulatory oversight using automated compliance checking, policy verification, and regulatory reporting that maintain compliance throughout distributed trial operations.

Site performance assessment implements continuous site monitoring using enrollment metrics, data quality assessment, and operational efficiency tracking that optimize site performance across distributed trial networks. Compression statistics implement data processing monitoring using compression efficiency tracking, statistical preservation validation, and system performance assessment that ensure optimal data processing across distributed trial sites.

Security status monitoring implements continuous security oversight using threat detection, access monitoring, and security incident tracking that maintain comprehensive security across distributed trial operations while enabling efficient clinical research conduct and regulatory compliance.

Figure 41:
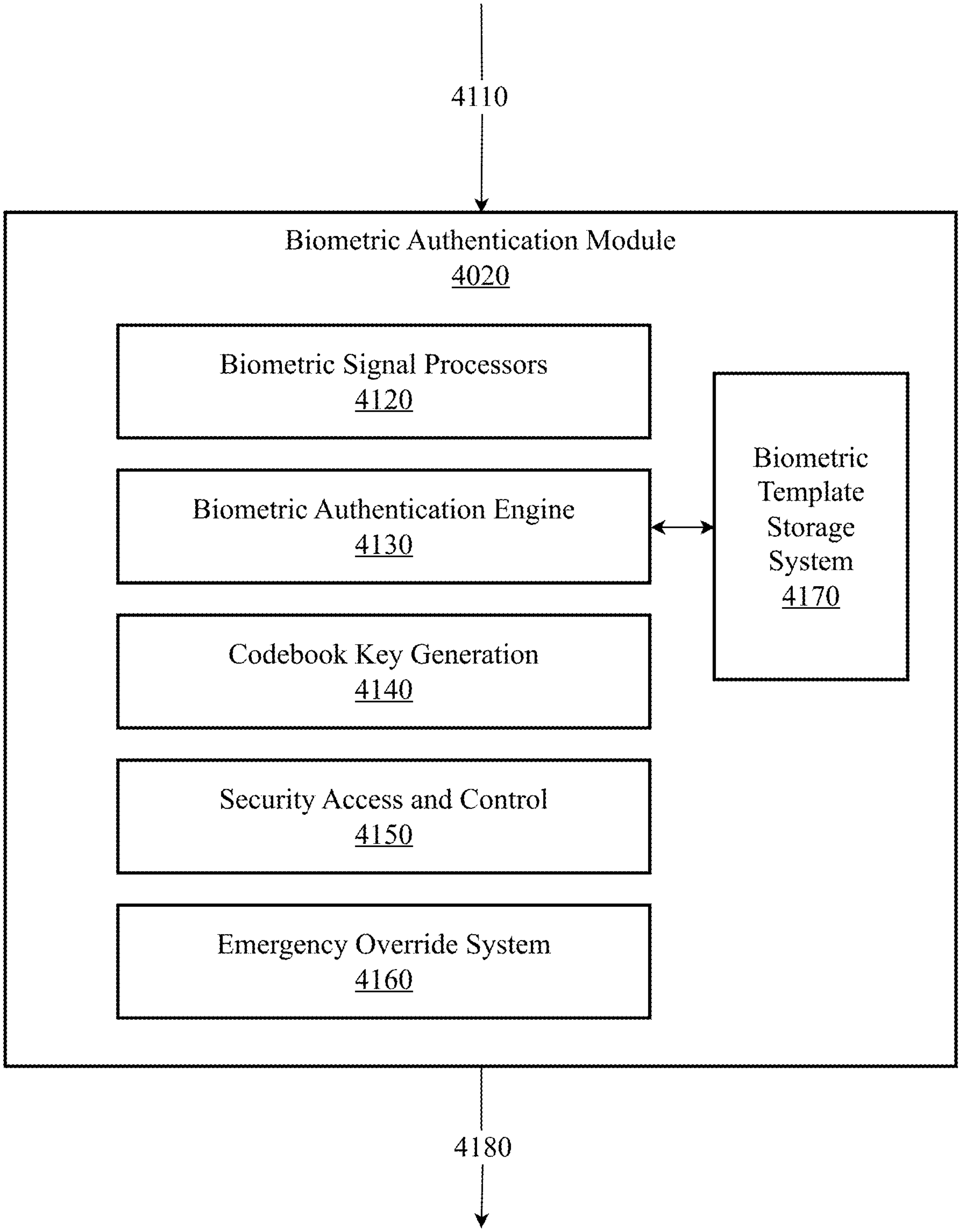
FIG. 41 is a block diagram illustrating a detailed architecture of biometric authentication module, according to an embodiment.

FIG. 41 is a block diagram illustrating a detailed architecture of biometric authentication module 4020, according to an embodiment. Biometric authentication module 4020 is configured to process multiple biometric signal inputs, perform patient authentication, and generate codebook selection keys and access credentials for integration with multi-codebook compaction system 4030.

According to the embodiment, biometric authentication module 4020 comprises several interconnected processing layers that work together to provide secure, patient-specific authentication capabilities. Raw biometric signal inputs 4110 represent the input layer and include a plurality of physiological sensors and data collection devices configured to capture distinctive patient characteristics. Raw biometric signal inputs 4110 may include HRV data comprising inter-beat intervals measured between successive heartbeats, gait analysis data from multi-axis accelerometers and gyroscopes capturing movement patterns and spatial orientation changes, voice pattern data captured through audio sensors for acoustic feature analysis, blood pressure waveforms measuring arterial pressure variations and pulse characteristics, breathing pattern data from respiratory sensors monitoring airflow or chest movement, and additional biometric sensors such as temperature monitors, skin conductance sensors, and physiological measurement devices capable of generating patient-specific signal patterns.

A biometric signal processors layer 4120 receives raw biometric signal inputs 4110 and performs signal conditioning, feature extraction, and pattern recognition operations using digital signal processing and pattern analysis techniques. An HRV feature extractor applies time-domain and frequency-domain analysis techniques to extract cardiac rhythm characteristics, calculating statistical measures of heart rate variability and spectral power distribution across physiologically relevant frequency bands to create patient-specific cardiac signatures. A gait pattern recognition engine implements temporal analysis methods using windowing techniques and dimensional reduction algorithms to extract movement characteristics, applying pattern matching algorithms to identify distinctive walking patterns and postural features that distinguish individual patients.

A voice characteristic analyzer performs audio signal preprocessing and feature extraction using spectral analysis techniques, extracting acoustic features such as frequency characteristics, spectral coefficients, and temporal patterns that capture speaker-specific vocal properties, with features processed using statistical analysis methods to create robust voice signatures resistant to natural variations in speech patterns. A pressure waveform analyzer applies signal filtering and morphological analysis techniques to extract pulse wave characteristics, identifying features such as pressure variations, waveform shape parameters, and temporal relationships that provide patient-specific cardiovascular signatures.

A respiratory pattern processor implements breath detection and pattern analysis algorithms to extract breathing characteristics including respiratory timing, pattern regularity, and breathing dynamics, applying signal analysis techniques to identify distinctive respiratory signatures while accounting for natural variations due to physical activity and emotional state.

Biometric signal processors 4120 includes a multi-modal feature fusion component that combines features from multiple biometric modalities using mathematical fusion techniques such as weighted combination methods, correlation analysis approaches, or machine learning algorithms trained to identify optimal feature combinations that maximize patient discrimination while maintaining robustness against individual biometric variations. Feature fusion may be implemented at various levels including raw signal fusion, feature-level fusion, or decision-level fusion depending on the specific requirements and computational constraints.

A signal quality assessment module evaluates biometric signal integrity using signal analysis techniques that measure signal characteristics such as noise levels, signal consistency, and physiological plausibility, applying quality metrics and threshold comparisons to identify signals suitable for authentication processing while rejecting corrupted or artificially generated signals.

A biometric authentication engine 4130 receives processed biometric features and performs patient identity verification using pattern recognition and machine learning techniques. A biometric template matching component implements similarity measurement algorithms that compare extracted features against stored patient templates, using distance calculation methods, correlation analysis, or machine learning classification approaches to determine authentication confidence levels. The matching process may employ various similarity metrics and decision algorithms optimized for the specific characteristics of each biometric modality.

A liveness detection system implements anti-spoofing techniques that analyze temporal characteristics of biometric signals to verify physiological authenticity, using signal analysis methods that detect natural variations and physiological coupling patterns inconsistent with artificial or recorded signals. Liveness detection may include challenge-response protocols that verify real-time patient response capabilities and physiological correlation analysis that confirms expected relationships between different biometric measurements.

An authentication confidence scoring system combines evidence from multiple sources using probabilistic reasoning, fuzzy logic, or machine learning approaches to generate numerical confidence measures indicating the reliability of patient identification. Confidence scoring may incorporate factors such as signal quality, template matching scores, liveness detection results, and historical authentication patterns to provide comprehensive assessment of authentication reliability.

A biometric drift compensation module implements adaptive algorithms that account for natural changes in biometric characteristics over time, using statistical methods, machine learning approaches, or signal processing techniques to update patient templates while maintaining discrimination against unauthorized users. Drift compensation may employ various adaptation strategies including gradual template updating, multi-template approaches, or dynamic threshold adjustment based on observed biometric evolution patterns.

A codebook key generation system 4140 converts authenticated biometric features into cryptographic keys and selection parameters using mathematical transformation techniques. A cryptographic key derivation function applies one-way mathematical functions such as cryptographic hash algorithms or key derivation functions to transform biometric features into secure encryption keys, using techniques that preserve biometric uniqueness while preventing reverse engineering of biometric data. Key generation may incorporate additional security measures such as salt values, key stretching algorithms, or multi-factor key derivation to enhance cryptographic strength.

A codebook selection seed generator creates deterministic selection parameters by processing biometric features through mathematical functions that generate consistent outputs for identical inputs while maintaining unpredictability for unauthorized users. Seed generation may use various approaches including hash-based methods, mathematical transformations, or pseudo-random generation algorithms seeded with biometric-derived values.

Security level assignment implements decision algorithms that determine appropriate security and access levels based on authentication confidence, patient risk assessment, data sensitivity, and contextual factors. Security level determination may use rule-based systems, multi-criteria decision methods, or machine learning approaches trained to optimize security policies based on organizational requirements and risk management objectives.

A security and access control layer 4150 manages authentication policies, session management, and audit functions across biometric authentication module 4020. A multi-factor authentication controller coordinates authentication requirements across multiple biometric modalities using policy engines that define authentication rules and combination requirements, implementing decision logic that determines when sufficient authentication evidence has been collected and which biometric modalities are required for different security contexts. The controller may use various combination strategies including sequential authentication, parallel authentication, or adaptive authentication selection based on availability and quality of biometric inputs.

An authentication threshold manager implements dynamic threshold adjustment algorithms that modify acceptance criteria based on contextual factors, risk assessments, and operational requirements. Threshold management may employ statistical methods, machine learning approaches, or rule-based systems that adjust authentication sensitivity to balance security requirements with usability considerations, accounting for factors such as time-sensitive medical situations, patient condition changes, or environmental factors that may affect biometric signal quality.

A session management system maintains secure authentication sessions using token-based authentication, session state tracking, or cryptographic session management protocols that control access duration, renewal requirements, and session termination procedures. Session management may implement various security mechanisms including session encryption, timeout management, and concurrent session control to ensure appropriate access control while supporting clinical workflow requirements.

An access policy engine enforces authorization rules using policy evaluation algorithms that interpret role-based access control definitions, attribute-based access control policies, or dynamic access control rules based on patient consent, healthcare provider credentials, and data sensitivity classifications. Policy enforcement may use various decision mechanisms including policy decision points, rule engines, or machine learning models trained to evaluate access requests against organizational policies and regulatory requirements.

A comprehensive audit logging system records authentication and access events using structured logging formats that capture relevant security information including authentication attempts, biometric processing results, access decisions, and system interactions. Audit logging may implement various recording strategies including real-time logging, batch processing, or distributed logging approaches that ensure comprehensive audit trails while maintaining system performance and meeting regulatory compliance requirements.

An authentication anomaly detection module identifies unusual patterns using statistical analysis, machine learning algorithms, or behavioral analysis techniques that compare current authentication patterns against historical baselines to detect potential security threats, system malfunctions, or medical emergencies. Anomaly detection may employ various approaches including outlier detection algorithms, time-series analysis, or pattern recognition methods that trigger alerts or automated responses when suspicious activities are identified.

An emergency override system 4160 provides expedited access to compressed health data during medical emergencies while maintaining security and audit integrity. An emergency detection component implements monitoring algorithms that analyze biometric signals, external emergency indicators, or manual activation signals to identify potential medical emergencies requiring immediate data access. Emergency detection may use various approaches including threshold-based monitoring, pattern recognition algorithms, or integration with external emergency systems to automatically trigger override procedures when appropriate conditions are detected.

A medical override authentication module implements alternative authentication procedures for emergency situations using streamlined verification methods such as emergency access codes, healthcare provider credential verification, or biometric authentication of medical personnel. Emergency authentication may employ various approaches including pre-shared keys, certificate-based authentication, or multi-party authorization protocols that balance rapid access requirements with security controls appropriate for emergency medical situations.

A rapid codebook access protocol enables immediate decompression of critical patient data using expedited key generation, cached authentication credentials, or pre-authorized access mechanisms that bypass standard authentication delays while maintaining audit trails and security logging. Rapid access may implement various strategies including emergency key escrow, priority processing queues, or alternative codebook selection methods optimized for speed while preserving data integrity and security requirements.

A biometric template storage system 4170 securely manages patient biometric reference data and authentication information using encrypted storage, access control mechanisms, and data integrity protection methods. Encrypted biometric templates implement cryptographic protection using encryption algorithms, key management systems, or tokenization approaches that protect stored biometric data against unauthorized access while enabling efficient template matching operations. Template encryption may use various approaches including format-preserving encryption, homomorphic encryption, or secure multi-party computation techniques that enable biometric matching without exposing plaintext template data.

A template versioning system maintains multiple generations of biometric templates using version control mechanisms, temporal storage strategies, or change tracking systems that enable template evolution while providing rollback capabilities and historical analysis. Template versioning may implement various approaches including incremental updates, snapshot-based versioning, or distributed version control adapted for biometric data management requirements.

Backup template storage provides redundancy using distributed storage systems, replication mechanisms, or cloud-based backup strategies that ensure template availability during system failures while maintaining security and privacy protections. Backup systems may implement various approaches including synchronized replication, geographically distributed storage, or hybrid cloud-premise backup strategies optimized for healthcare data protection requirements.

An adaptive template update engine refines biometric templates using machine learning algorithms, statistical updating methods, or signal processing techniques that incorporate new biometric measurements to improve authentication accuracy while preventing template corruption or unauthorized modification. Template updating may employ various strategies including supervised learning approaches, unsupervised adaptation algorithms, or hybrid methods that balance template stability with adaptation to natural biometric evolution.

A secure template deletion module implements cryptographically secure erasure procedures using data sanitization techniques, cryptographic key destruction, or secure deletion protocols that ensure complete removal of biometric data in compliance with privacy regulations and patient rights. Secure deletion may employ various approaches including cryptographic erasure, multiple-pass overwriting, or physical destruction methods appropriate for different storage technologies and regulatory requirements.

Authentication outputs 4180 represent the interface between biometric authentication module 4020 and multi-codebook compaction system 4030, providing authentication results, cryptographic keys, and control information necessary for secure data compression operations. Codebook selection keys provide deterministic parameters for compression algorithm selection using cryptographically derived values, mathematical transformations of biometric features, or pseudo-random generation seeded with authenticated biometric data. Authentication tokens provide verifiable proof of successful patient identification using digital signatures, cryptographic tokens, or authentication certificates that can be validated by downstream systems without exposing biometric data.

Security level indicators specify appropriate protection levels using classification schemes, numerical security ratings, or policy-based designations that inform compression and encryption decisions based on authentication confidence, patient risk profiles, and data sensitivity requirements. Access permissions define authorization scope using role-based specifications, attribute-based policies, or capability-based access control information that determines which systems, users, or applications may access specific types of compressed patient data.

Audit metadata provides comprehensive logging information using structured data formats, standardized audit records, or regulatory compliance documentation that supports security monitoring, forensic analysis, and regulatory reporting requirements while maintaining patient privacy and system security.

Figure 42:
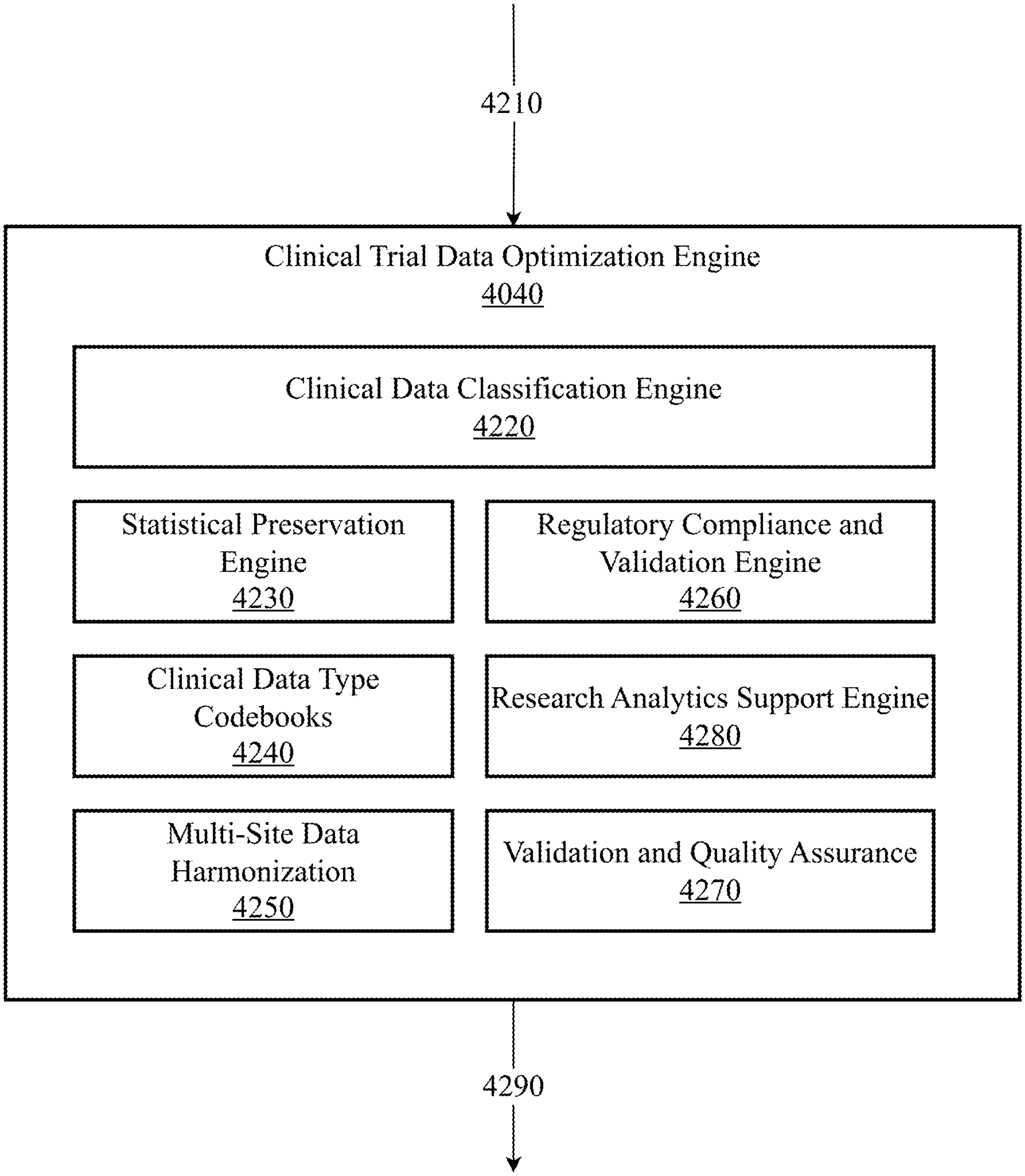
FIG. 42 is a block diagram illustrating a detailed architecture of clinical trial data optimization engine, according to an embodiment.

FIG. 42 is a block diagram illustrating a detailed architecture of clinical trial data optimization engine 4040, according to an embodiment. Clinical trial data optimization engine 4040 is configured to process various types of clinical health data while preserving statistical properties essential for research applications and ensuring regulatory compliance for clinical trial submissions.

According to the embodiment, clinical trial data optimization engine 4040 comprises multiple specialized processing layers designed to handle the unique requirements of clinical research data compression. Clinical health data inputs 4210 represent diverse data types collected during clinical trials and include adverse event (AE) data comprising, but not limited to, safety reports and severity classifications, laboratory values including blood tests, biomarker measurements, and chemistry panel results, patient-reported outcomes (PRO) data including, but not limited to, quality of life assessments and symptom scoring instruments, vital signs and physiological data including blood pressure measurements, heart rate monitoring, and temperature recordings, medical imaging data from various modalities including X-rays, magnetic resonance imaging (MRI), computed tomography (CT) scans, and ultrasound examinations, genomic and biomarker data including DNA sequence information and protein expression profiles, and medication and dosing records documenting treatment administration and patient compliance information.

A clinical data classification engine 4220 receives clinical health data inputs 4210 and performs automated categorization and analysis to determine appropriate processing strategies for different data types. A data type and format classifier implements pattern recognition algorithms and metadata analysis techniques to identify clinical data formats, determine data structure characteristics, and classify information according to clinical trial taxonomy and regulatory requirements. Data classification may employ various approaches including rule-based classification systems, machine learning classifiers trained on clinical data repositories, or hybrid approaches that combine automated classification with domain-specific knowledge bases.

A primary and secondary endpoint identifier analyzes clinical data to determine relationships to trial objectives using protocol analysis algorithms, endpoint mapping techniques, or statistical correlation methods that identify data elements critical for efficacy and safety evaluations. Endpoint identification may implement various strategies including natural language processing of study protocols, statistical analysis of historical trial data, or expert system approaches that encode clinical research domain knowledge.

A protocol compliance mapper ensures data processing aligns with study protocol requirements using compliance checking algorithms, protocol parsing techniques, or validation frameworks that verify data handling procedures meet regulatory and scientific standards. Protocol mapping may employ various approaches including automated protocol interpretation, compliance rule engines, or validation frameworks that compare data processing procedures against study-specific requirements.

A statistical requirement analysis component determines preservation requirements for different data types using statistical analysis techniques, clinical research methodologies, or regulatory guidance interpretation that identifies critical statistical properties requiring protection during compression. Statistical requirement analysis may implement various approaches including power analysis calculations, effect size determination methods, or regulatory guideline interpretation algorithms that specify preservation criteria for different clinical data types.

A statistical preservation engine 4230 implements specialized algorithms designed to maintain statistical properties essential for clinical research analysis. A distribution preservation module maintains probability distributions of clinical measurements using statistical transformation techniques, distribution fitting algorithms, or preservation strategies that ensure compressed data maintains original distributional characteristics required for hypothesis testing and confidence interval calculations. Distribution preservation may employ various approaches including moment preservation methods, quantile preservation techniques, or distribution-specific compression algorithms optimized for different types of clinical measurements.

A correlation structure maintenance component preserves relationships between clinical variables using multivariate statistical techniques, correlation analysis methods, or dependency preservation algorithms that maintain inter-variable relationships critical for multivariate analysis and confounding variable assessment. Correlation preservation may implement various strategies including covariance matrix preservation, partial correlation maintenance, or mutual information conservation techniques that ensure multivariate statistical analyses remain valid after data compression.

A variance and precision control module manages statistical variability preservation using variance decomposition techniques, precision analysis methods, or statistical power preservation algorithms that ensure compressed data maintains sufficient precision for detecting clinically meaningful effects. Variance control may employ various approaches including variance component analysis, statistical power calculations, or precision-preserving compression techniques that balance data reduction with analytical requirements.

A temporal relationship integrity component preserves time-dependent relationships in longitudinal clinical data using time-series analysis techniques, temporal correlation methods, or sequential pattern preservation algorithms that maintain the temporal structure essential for survival analysis, repeated measures analysis, and time-to-event studies. Temporal integrity preservation may implement various approaches including autocorrelation preservation, trend analysis maintenance, or time-dependent covariate relationship conservation that ensures longitudinal statistical models remain valid after compression.

Clinical data type codebooks 4240 comprise specialized compression libraries optimized for different categories of clinical research data. Adverse event codebooks implement compression algorithms specifically designed for safety data characteristics including categorical severity classifications, temporal event patterns, and causality assessment structures, using encoding strategies that preserve the hierarchical nature of adverse event classification systems and maintain the statistical properties required for safety signal detection. Laboratory data codebooks utilize compression techniques optimized for numerical measurement data including reference range relationships, unit conversions, and measurement precision requirements, implementing encoding strategies that preserve the distributional characteristics and measurement relationships essential for biomarker analysis and laboratory parameter trending.

PRO assessment codebooks implement compression algorithms designed for patient-reported outcome data including questionnaire response patterns, scale score calculations, and quality of life measurement structures, using encoding strategies that preserve the psychometric properties of validated instruments and maintain the statistical characteristics required for patient-reported outcome analysis. Medical imaging codebooks utilize specialized compression techniques for different imaging modalities including lossless compression for diagnostic-quality images, region-of-interest preservation for quantitative analysis, and metadata preservation for imaging protocol documentation, implementing encoding strategies that maintain diagnostic image quality while achieving significant data reduction for storage and transmission efficiency.

Genomic data codebooks implement compression algorithms specifically designed for biological sequence data including DNA sequence compression, protein expression data reduction, and biomarker profile encoding, using specialized techniques that preserve the biological significance of genetic variations while achieving substantial compression ratios for large-scale genomic datasets.

A multi-site data harmonization layer 4250 standardizes clinical data across distributed trial locations to ensure consistency and comparability of compressed data. A site data standardization component implements data normalization algorithms, unit conversion procedures, or formatting standardization techniques that ensure clinical data from different sites can be effectively combined for statistical analysis. Site standardization may employ various approaches including automated data transformation, reference standard mapping, or protocol-driven normalization procedures that account for site-specific variations in data collection procedures and measurement techniques.

A protocol alignment engine ensures consistent implementation of compression protocols across multiple trial sites using protocol distribution mechanisms, compliance monitoring systems, or standardization verification procedures that maintain data processing consistency across distributed clinical trial networks. Protocol alignment may implement various strategies including centralized protocol management, automated compliance checking, or distributed validation frameworks that ensure uniform data processing standards across all participating sites.

A cross-site data validation component implements quality assurance procedures using inter-site comparison algorithms, outlier detection methods, or consistency checking procedures that identify potential data quality issues arising from site-specific factors or protocol deviations. Cross-site validation may employ various approaches including statistical outlier detection, pattern recognition algorithms, or expert system validation rules that flag potential data quality concerns for manual review and resolution.

A real-time data quality monitoring system continuously assesses data integrity using automated quality assessment algorithms, statistical process control methods, or anomaly detection techniques that identify data quality issues as they occur during trial conduct. Quality monitoring may implement various strategies including real-time statistical analysis, automated alert systems, or dashboard-based quality metrics that provide continuous oversight of data collection and processing quality across all trial sites.

An inter-site inconsistency detection module identifies discrepancies between sites using comparative analysis algorithms, statistical divergence detection methods, or pattern recognition techniques that flag potential protocol deviations or data collection inconsistencies requiring investigation. Inconsistency detection may employ various approaches including statistical comparison tests, machine learning anomaly detection, or rule-based validation systems that automatically identify patterns suggesting protocol non-compliance or data quality concerns.

A regulatory compliance and validation engine 4260 ensures compressed clinical data meets requirements for regulatory submission and clinical research standards. FDA 21 CFR Part 11 compliance components implement electronic record and signature requirements using audit trail generation, data integrity verification, or access control mechanisms that ensure compressed clinical data meets federal regulatory standards for electronic clinical trial data. Compliance implementation may employ various approaches including cryptographic validation, comprehensive audit logging, or access control frameworks that demonstrate regulatory compliance throughout the data compression and storage lifecycle.

ICH E6 (R2) Good Clinical Practice (GCP) compliance components ensure data processing meets international clinical research standards using quality management principles, risk-based monitoring approaches, or data integrity frameworks that align compressed data handling with global clinical research best practices. GCP compliance may implement various strategies including quality by design principles, risk assessment methodologies, or continuous improvement processes that ensure clinical data compression meets international research standards.

CDISC standards compliance components implement clinical data interchange standards (CDISC) using standardized data models, controlled terminology, or metadata specifications that ensure compressed clinical data can be effectively shared and analyzed across different systems and organizations. CDISC compliance may employ various approaches including automated data mapping, terminology validation, or metadata preservation techniques that maintain standards compliance while achieving compression objectives.

A data integrity validation component ensures compressed clinical data maintains accuracy, completeness, and consistency using validation algorithms, integrity checking procedures, or audit verification methods that demonstrate data reliability for regulatory review and scientific analysis. Data integrity validation may implement various strategies including cryptographic integrity checking, statistical validation procedures, or audit trail verification that provides comprehensive documentation of data processing integrity throughout the compression lifecycle.

A comprehensive audit trails component maintains detailed records of all data processing activities using structured logging systems, event tracking mechanisms, or audit documentation procedures that provide complete traceability for regulatory inspection and scientific peer review. Audit trail generation may employ various approaches including real-time event logging, structured audit databases, or automated documentation systems that capture all relevant information for regulatory compliance and scientific transparency.

A validation and quality assurance layer 4270 implements comprehensive testing and verification procedures to ensure compressed clinical data meets scientific and regulatory requirements. A statistical validation component verifies preservation of statistical properties using hypothesis testing procedures, power analysis calculations, or statistical comparison methods that demonstrate compressed data maintains the analytical characteristics required for clinical research conclusions. Statistical validation may employ various approaches including bootstrap validation techniques, cross-validation procedures, or comparative statistical analysis that provides quantitative evidence of data preservation quality.

A compression fidelity component measures the accuracy of data compression using error analysis techniques, signal fidelity metrics, or information preservation assessments that quantify the degree to which compressed data maintains the characteristics of original clinical measurements. Compression fidelity assessment may implement various strategies including mean squared error calculations, correlation analysis, or information theoretic measures that provide objective assessment of compression quality for different types of clinical data.

A clinical validity check component ensures compressed data maintains clinical significance using domain expertise validation, clinical correlation analysis, or medical significance assessment procedures that verify compressed data retains the clinical meaning essential for research interpretation and regulatory decision-making. Clinical validity assessment may employ various approaches including expert review procedures, clinical correlation studies, or automated clinical significance checking that demonstrates compressed data maintains clinical utility for intended research applications.

A research analytics support engine 4280 provides specialized capabilities for clinical research analysis using compressed data. An efficacy preservation component ensures compressed data maintains the statistical power and analytical characteristics required for treatment efficacy evaluation using power analysis techniques, effect size preservation methods, or statistical sensitivity analysis that demonstrates compressed data supports robust efficacy conclusions. Safety data integrity components maintain the completeness and accuracy of adverse event information using safety signal preservation techniques, causality assessment preservation, or risk evaluation maintenance procedures that ensure compressed safety data supports comprehensive safety analysis and regulatory safety reporting.

Biostatistics support components provide specialized analytical capabilities using statistical computing frameworks, analytical software integration, or specialized statistical procedures optimized for compressed clinical data analysis, ensuring statistical analysis procedures can be effectively applied to compressed datasets without loss of analytical capability or statistical validity.

Clinical trial optimized outputs 4290 provide appropriately formatted compressed data for different stakeholders and use cases. Outputs 4290 may comprise, but are not limited to, sponsor datasets, regulatory submissions, site-specific reports, safety databases, analytics-ready data, and/or the like. Sponsor datasets provide pharmaceutical companies and research organizations with comprehensive clinical trial data formatted for regulatory submission, statistical analysis, and research publication requirements. Regulatory submissions provide health authorities with clinical data formatted according to regulatory guidelines and submission requirements, ensuring compressed data supports efficient regulatory review and approval processes. Site-specific reports provide clinical investigators with relevant data for their patient populations and study conduct oversight, enabling effective trial management and patient safety monitoring using compressed data formats.

Figure 43:
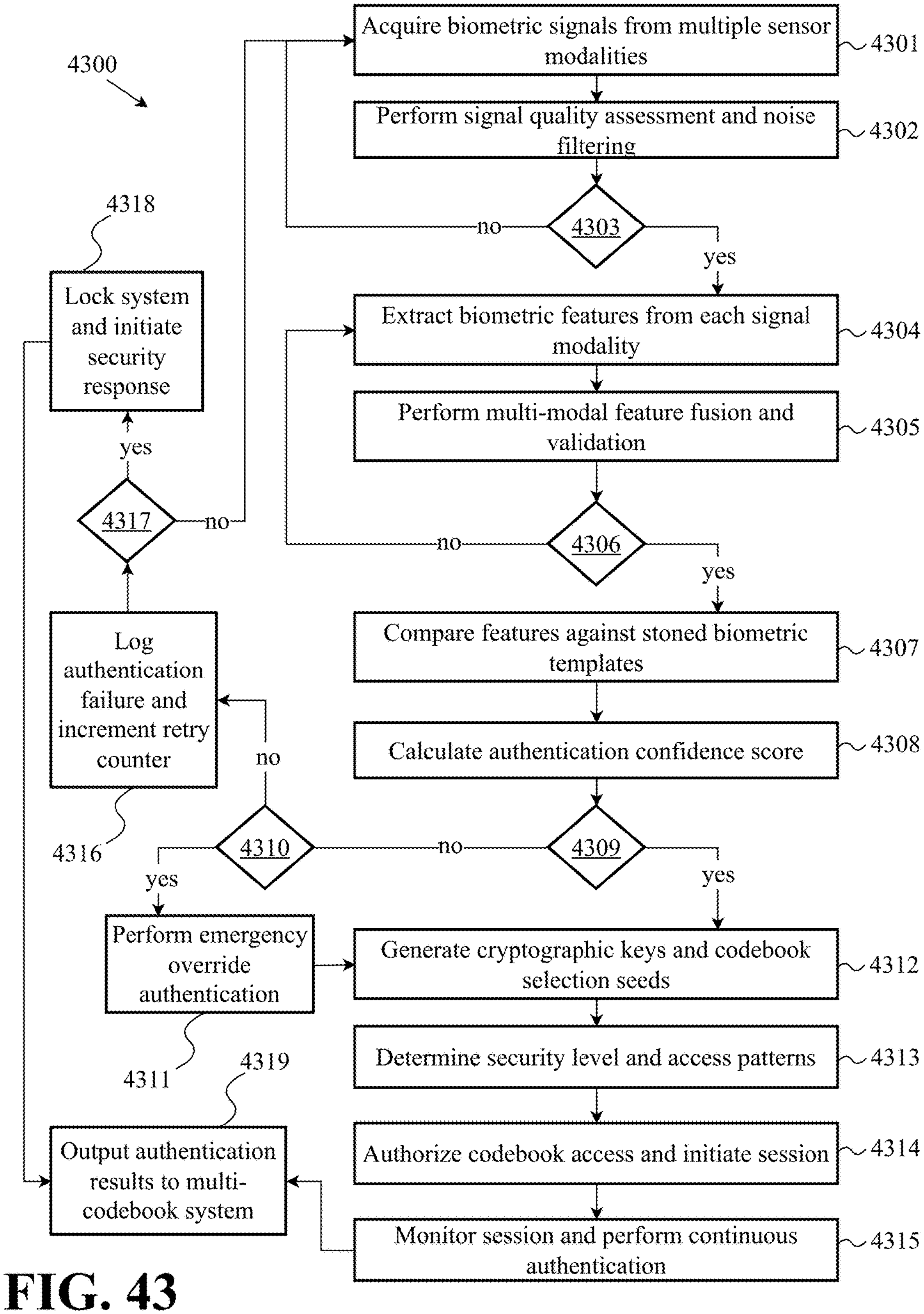
FIG. 43 is a flow diagram illustrating an exemplary method for multi-modal biometric authentication for patient identity verification and codebook access control, according to an embodiment.

FIG. 43 is a flow diagram illustrating an exemplary method for multi-modal biometric authentication 4300 for patient identity verification and codebook access control, according to an embodiment. The method provides a systematic approach for converting patient biometric signals into authenticated access credentials while maintaining security controls and emergency override capabilities.

According to the embodiment, the process begins with at 4301 where biometric signals are acquired from multiple sensor modalities. The system simultaneously collects biometric data from various sources including heart rate monitors, gait analysis sensors, voice recognition devices, blood pressure monitors, and other physiological measurement devices to capture comprehensive biometric information for patient identification.

At step 4302, the method performs signal quality assessment and noise filtering on the acquired biometric signals. This step implements signal conditioning algorithms to evaluate signal integrity, remove environmental interference, and enhance signal characteristics to ensure reliable biometric processing.

The method proceeds to decision point 4303 where signal quality is evaluated against predetermined acceptability criteria. If signal quality is determined to be unacceptable, the process returns to step 4301 to reacquire biometric signals with improved sensor positioning, environmental conditions, or alternative biometric modalities.

When signal quality is acceptable, the method advances to step 4304 where biometric features are extracted from each signal modality. This step implements specialized feature extraction algorithms for each biometric type to identify distinctive characteristics suitable for patient identification, including, but not limited to, cardiac rhythm patterns, movement signatures, vocal characteristics, and physiological parameters.

At step 4305, the method performs multi-modal feature fusion and validation by combining extracted features from multiple biometric modalities using mathematical fusion techniques to create composite biometric signatures with enhanced discrimination capability and reliability.

Decision point 4306 evaluates whether the extracted and fused features meet validation criteria for authentication processing. If features are determined to be invalid or insufficient, the process returns to step 4304 to re-extract features using alternative algorithms, additional signal processing, or different biometric modalities.

When features are validated, the method proceeds to step 4307 where the extracted biometric features are compared against stored biometric templates using pattern matching algorithms, distance calculations, or machine learning classification techniques to determine similarity scores for patient identification.

Step 4308 calculates an authentication confidence score by combining evidence from template matching results, signal quality assessments, and biometric validation outcomes using probabilistic reasoning, statistical analysis, or machine learning approaches to generate a numerical confidence measure indicating authentication reliability.

At decision point 4309, the method evaluates whether authentication has been successful by comparing the calculated confidence score against predetermined threshold criteria. If authentication fails, the process proceeds to decision point 4310 to determine whether emergency override procedures should be activated.

Decision point 4310 evaluates whether emergency override conditions are present, such as medical emergency situations, healthcare provider emergency activation, or automated emergency detection based on physiological parameters. If emergency override is not required, the method proceeds to step 4316 to log the authentication failure.

When emergency override is required, the method proceeds to step 4311 where emergency override authentication is performed using streamlined verification procedures, healthcare provider credentials, or alternative authentication methods appropriate for emergency medical situations.

Upon successful authentication (either normal or emergency), the method proceeds to step 4312 where cryptographic keys and codebook selection seeds are generated using the validated biometric features. This step implements key derivation functions, hash algorithms, or biometric encryption techniques to create secure access credentials. Step 4313 determines the appropriate security level and access permissions based on authentication confidence scores, patient risk profiles, and contextual factors. This step implements policy evaluation algorithms to assign appropriate access levels for codebook selection and data compression operations.

At step 4314, the method authorizes codebook access and initiates a secure session using the generated cryptographic keys and assigned permissions. This step establishes secure communication channels and implements session management protocols for subsequent data compression activities. Step 4315 monitors the active session and performs continuous authentication using ongoing biometric sampling, behavioral monitoring, or periodic reauthentication to maintain security throughout extended clinical sessions.

When authentication fails and emergency override is not activated, step 4316 logs the authentication failure event and increments a retry counter to track failed authentication attempts for security monitoring and policy enforcement.

Decision point 4317 evaluates whether the retry limit has been reached by comparing the current retry count against predetermined maximum failure thresholds. If the retry limit has not been reached, the process returns to step 4301 to attempt authentication again with potentially improved biometric capture or alternative authentication approaches.

When the retry limit is reached, step 4318 locks the system and initiates security response procedures including access revocation, alert generation, and incident logging to prevent unauthorized access attempts and notify security personnel of potential threats.

Step 4319 outputs authentication results to multi-codebook compaction system 4030, providing either successful authentication credentials with access permissions and cryptographic keys, or failure notifications with appropriate security status information. This step completes the authentication process and enables subsequent data compression operations using the authenticated access credentials and security parameters established through the biometric authentication procedure. The method provides comprehensive biometric authentication with appropriate security controls, emergency access capabilities, and audit logging to support secure clinical data compression while maintaining patient safety and operational flexibility for healthcare environments.

FIGS. 44A and 44B provide a method flow diagram illustrating a clinical trial data statistical preservation algorithm 4400 for maintaining research data integrity during compression processing, according to an embodiment. The method provides systematic procedures for preserving statistical properties essential for clinical research analysis while achieving optimal data compression for regulatory submissions and multi-site trial management.

According to the embodiment, the method begins with step 4401 where clinical trial data is received for compression processing. The system accepts various types of clinical research data including adverse event reports, laboratory measurements, patient-reported outcomes, vital signs, medical imaging data, genomic information, and medication records collected during clinical trial conduct.

At step 4402, the method performs pre-compression statistical analysis on the received clinical data. This step implements comprehensive statistical evaluation including distribution analysis, correlation assessment, variance characterization, and temporal relationship identification to establish baseline statistical properties that must be preserved during compression processing.

Step 4403 identifies critical statistical parameters for preservation based on clinical research requirements, regulatory guidelines, and study protocol specifications. This step analyzes data characteristics to determine which statistical properties are essential for maintaining analytical validity, including primary endpoint calculations, secondary outcome assessments, safety signal detection, and biostatistical analysis requirements.

At step 4404, the method calculates baseline data distributions and correlations using statistical analysis techniques to quantify the original data characteristics that must be maintained throughout compression processing. This step establishes reference measurements for subsequent validation of compression fidelity and statistical integrity.

Step 4405 determines preservation requirements and tolerances by evaluating clinical research objectives, regulatory submission standards, and statistical analysis plans to establish acceptable limits for compression-induced variations in statistical properties. This step defines quantitative criteria for assessing whether compressed data maintains sufficient statistical validity for intended research applications.

At step 4406, the method classifies data by clinical data type and endpoint role using automated classification algorithms that identify different categories of clinical information and their relative importance for research conclusions. This classification determines appropriate preservation strategies and compression parameters for different types of clinical data. Decision point 4407 evaluates whether the current data represents primary endpoint information critical for demonstrating treatment efficacy or safety. If the data is identified as primary endpoint data, the method proceeds to step 4408 for maximum preservation processing.

Step 4408 applies maximum preservation protocols for primary endpoint data using specialized compression algorithms that prioritize statistical integrity over compression efficiency. This step implements the most stringent preservation requirements to ensure primary endpoint calculations remain statistically valid and scientifically meaningful for regulatory decision-making.

When data is not primary endpoint information, decision point 4409 evaluates whether the data represents secondary endpoint measurements important for supporting research conclusions. If identified as secondary endpoint data, the method proceeds to step 4410 for high preservation processing.

Step 4410 applies high preservation protocols for secondary endpoint data using compression algorithms that maintain statistical validity while achieving moderate compression efficiency. This step balances preservation requirements with compression objectives to support secondary endpoint analysis while reducing data storage and transmission requirements.

When data is not secondary endpoint information, decision point 4411 evaluates whether the data represents safety information or adverse event reports critical for patient safety monitoring. If identified as safety or adverse event data, the method proceeds to step 4412 for safety-specific preservation processing. Step 4412 applies safety-specific preservation protocols using specialized algorithms designed for adverse event data characteristics including categorical classifications, temporal relationships, and causality assessments. This step ensures safety signal detection capabilities are preserved while achieving appropriate compression for safety database management.

When data does not fall into primary, secondary, or safety categories, step 4413 applies standard preservation protocols for supporting data using compression algorithms that maintain basic statistical properties while prioritizing compression efficiency for descriptive and exploratory data analysis applications. At step 4414, the method selects specialized clinical data type codebooks based on the data classification and preservation requirements determined in previous steps. This step chooses compression algorithms optimized for specific clinical data characteristics and preservation objectives from libraries of specialized codebooks designed for different types of clinical research data.

Referring now to FIG. 44B, step 4415 validates compression fidelity against preservation criteria by comparing compressed data statistical properties with baseline measurements established during pre-compression analysis. This step implements quantitative assessment procedures to verify that compression processing maintains required statistical characteristics within acceptable tolerance limits.

Decision point 4416 evaluates whether statistical integrity has been maintained by comparing validation results against predetermined acceptance criteria. If statistical integrity is not adequately preserved, the method proceeds to step 4417 for compression parameter adjustment.

Step 4417 adjusts compression parameters or selects alternative codebooks to improve statistical preservation while maintaining compression objectives. This step implements iterative optimization procedures that modify compression settings or choose different compression algorithms to achieve better preservation of statistical properties.

When statistical integrity is adequately maintained, the method proceeds to step 4418 where post-compression statistical validation is performed using comprehensive analysis procedures that confirm compressed data maintains all required statistical characteristics for intended clinical research applications.

Step 4419 verifies regulatory compliance and audit requirements by checking compressed data against regulatory guidelines, submission standards, and audit trail requirements to ensure compliance with clinical research regulations and quality standards.

Decision point 4420 evaluates whether compliance has been verified by comparing audit results against regulatory requirements and submission criteria. If compliance is not adequately demonstrated, the method proceeds to step 4421 for additional documentation generation.

Step 4421 generates additional compliance documentation and validation evidence to meet regulatory requirements including supplementary statistical analyses, audit trail enhancements, or validation reports that demonstrate compressed data maintains regulatory compliance for clinical trial submissions.

When compliance is verified, step 4422 performs multi-site data harmonization and standardization to ensure compressed data from different clinical trial sites maintains consistency and comparability for combined statistical analysis across the entire clinical trial network. Step 4423 generates quality assurance reports and audit trails documenting the statistical preservation process including validation results, compliance verification, and quality metrics that provide comprehensive documentation for regulatory review and scientific peer evaluation. Step 4424 outputs statistically preserved compressed clinical data along with associated documentation including preservation validation reports, compliance certificates, and quality assurance documentation that enables subsequent clinical research analysis while maintaining regulatory compliance and scientific validity.

The method provides systematic statistical preservation for clinical trial data compression while maintaining research validity, regulatory compliance, and multi-site trial coordination capabilities essential for modern clinical research operations.

FIG. 45 is a system architecture diagram illustrating an integrated security framework 4500 with multi-layer protection for biometric-authenticated health data compression systems, according to an embodiment. Integrated security framework 4500 implements defense-in-depth security principles using layered protection mechanisms that provide comprehensive security coverage while maintaining clinical operational efficiency and emergency medical access capabilities.

According to the embodiment, integrated security framework 4500 comprises various security layers that work together to provide comprehensive protection for patient health data throughout the compression, storage, and transmission lifecycle. A biometric authentication layer 4510 serves as the foundational security layer and implements patient-specific identity verification using multiple biometric modalities and advanced authentication techniques.

Primary patient identity verification implements comprehensive biometric analysis using multi-modal biometric fusion, template matching algorithms, and confidence scoring methods that establish patient identity with high reliability and prevent unauthorized access attempts. Primary identity verification may employ various approaches including physiological signal analysis, behavioral pattern recognition, or challenge-response protocols that provide robust patient identification while maintaining usability for clinical workflows.

Continuous presence monitoring implements ongoing biometric surveillance using background biometric sampling, behavioral analysis, or periodic reauthentication procedures that verify patient presence throughout extended clinical sessions. Continuous monitoring may employ various strategies including passive biometric collection, activity pattern analysis, or environmental sensing that maintain authentication confidence without disrupting clinical procedures.

Anti-spoofing protection implements countermeasures against various attack vectors using liveness detection algorithms, signal analysis techniques, or challenge-response protocols that prevent presentation attacks, replay attacks, or synthetic biometric generation. Anti-spoofing protection may employ various approaches including temporal analysis, physiological correlation verification, or multi-modal consistency checking that detect and prevent various forms of biometric spoofing attempts.

Liveness detection and validation implements real-time verification of biometric authenticity using physiological signal analysis, temporal pattern recognition, or challenge-response protocols that confirm biometric signals originate from living patients rather than artificial sources. Liveness detection may employ various strategies including physiological coupling analysis, signal variability assessment, or interactive biometric challenges that provide reliable verification of patient presence and participation.

Multi-modal biometric fusion combines evidence from multiple biometric sources using mathematical fusion techniques, machine learning algorithms, or statistical combination methods that enhance authentication reliability and reduce vulnerability to individual biometric modality failures. Biometric fusion may employ various approaches including weighted combination strategies, neural network fusion, or probabilistic reasoning that optimize authentication performance across diverse clinical environments and patient populations.

A codebook security layer 4520 implements encryption and compression security mechanisms that protect compressed health data using patient-specific cryptographic keys and advanced encoding techniques. Multi-codebook encryption implements distributed encryption using multiple compression algorithms, key rotation procedures, and patient-specific encoding parameters that prevent unauthorized data reconstruction and enhance security through algorithmic diversity.

Biometric-derived key enhancement implements cryptographic key generation using validated biometric features, key derivation functions, and patient-specific parameters that create encryption keys uniquely tied to individual patients. Key enhancement may employ various approaches including biometric hashing, fuzzy commitment schemes, or error correction coding that generate secure encryption keys while maintaining key consistency across biometric variations.

Dynamic codebook rotation implements temporal security enhancement using scheduled codebook changes, pseudo-random selection algorithms, or event-driven rotation procedures that prevent long-term cryptographic analysis and enhance security through temporal diversity. Codebook rotation may employ various strategies including time-based rotation, usage-based rotation, or security event-triggered rotation that balance security enhancement with operational stability.

Variable sourceblock sizes implement additional security through encoding parameter diversity using dynamic block size selection, patient-specific sizing algorithms, or context-dependent size optimization that create patient-specific encoding patterns while maintaining compression efficiency. Variable sizing may employ various approaches including adaptive size selection, biometric-derived sizing, or clinical context-based sizing that enhance security through encoding diversity.

Compression-based security implements inherent protection through the compression process using reference-based encoding, distributed data storage, or algorithmic obfuscation that provides security benefits beyond traditional encryption approaches. Compression security may employ various strategies including data fragmentation, reference code generation, or algorithmic complexity that create multiple layers of protection through the compression process itself.

A clinical trial security layer 4530 implements research-specific security controls using role-based access management, regulatory compliance mechanisms, and clinical trial-specific protection procedures. Role-based access control implements hierarchical authorization using user role definitions, permission matrices, and contextual access policies that ensure appropriate access to clinical data based on user responsibilities, organizational affiliations, and clinical trial requirements.

Site-specific data isolation implements multi-site security using logical data separation, access control boundaries, and inter-site communication protocols that maintain data security across distributed clinical trial networks while enabling appropriate data sharing for research purposes. Data isolation may employ various approaches including virtual private networks, encrypted communication channels, or federated access control that protect site-specific data while supporting multi-site collaboration.

Comprehensive audit trail generation implements regulatory compliance using detailed event logging, tamper-evident audit records, and regulatory reporting capabilities that provide complete documentation of all data access, processing, and transmission activities. Audit trail generation may employ various strategies including real-time logging, cryptographic integrity protection, or automated compliance reporting that meet regulatory requirements for clinical trial documentation.

Regulatory compliance validation implements automated compliance checking using regulatory guideline interpretation, policy enforcement algorithms, and compliance verification procedures that ensure all security activities meet applicable healthcare data protection regulations. Compliance validation may employ various approaches including rule-based compliance checking, automated policy enforcement, or regulatory framework integration that provide ongoing compliance assurance.

Data integrity verification implements tamper detection using cryptographic hash functions, digital signatures, or blockchain-based integrity protection that ensure compressed health data maintains accuracy and completeness throughout storage and transmission. Integrity verification may employ various strategies including cryptographic checksums, distributed verification, or consensus-based validation that provide reliable detection of data tampering or corruption.

An emergency access layer 4540 implements rapid access capabilities for medical emergency situations while maintaining security controls and audit compliance. Medical emergency override protocols implement streamlined access procedures using emergency detection algorithms, healthcare provider authentication, or automated emergency response that enable immediate access to critical patient data during medical emergencies.

Healthcare provider authentication implements professional credential verification using license validation, institutional authentication, or emergency responder identification that ensures emergency data access is limited to authorized medical personnel. Provider authentication may employ various approaches including digital credential verification, institutional directory integration, or emergency services coordination that provide appropriate authorization for emergency medical access.

Rapid data decompression implements expedited data processing using priority processing queues, cached authentication credentials, or simplified decompression algorithms that enable immediate access to critical patient information during time-sensitive medical situations. Rapid decompression may employ various strategies including emergency key escrow, pre-computed decompression keys, or simplified authentication procedures that balance rapid access with appropriate security controls.

Emergency access audit logging implements comprehensive documentation using emergency event recording, access justification documentation, or post-emergency review procedures that maintain complete audit trails for all emergency access activities. Emergency audit logging may employ various approaches including real-time emergency logging, automated justification collection, or post-emergency audit review that ensure emergency access maintains appropriate accountability and regulatory compliance.

Normal operation recovery implements restoration procedures using security state restoration, access control reactivation, or system integrity verification that return security systems to normal operation following emergency access events. Recovery procedures may employ various strategies including automated security restoration, manual security verification, or gradual access control reactivation that ensure appropriate security posture following emergency access situations.

In some embodiments, an integrated security control center is present and configured to coordinate security operations across all protection layers using centralized monitoring, threat detection, and incident response capabilities. Real-time threat detection implements continuous security monitoring using anomaly detection algorithms, pattern recognition techniques, or behavioral analysis that identify potential security threats across all system components and protection layers.

Security orchestration implements coordinated security response using automated threat response, security policy enforcement, or incident escalation procedures that provide unified security management across the multi-layer protection framework. Policy enforcement implements consistent security controls using centralized policy management, distributed policy enforcement, or automated compliance verification that ensure uniform security standards across all system components.

Incident response implements coordinated security incident handling using automated threat containment, escalation procedures, or recovery coordination that provide effective response to security events while minimizing impact on clinical operations. Compliance monitoring implements ongoing regulatory oversight using automated compliance checking, audit report generation, or regulatory notification procedures that ensure continuous compliance with applicable healthcare data protection requirements.

Foundational System Architecture

The following sections describe technology disclosed in U.S. application Ser. No. 18/653,482.

Figure 1:
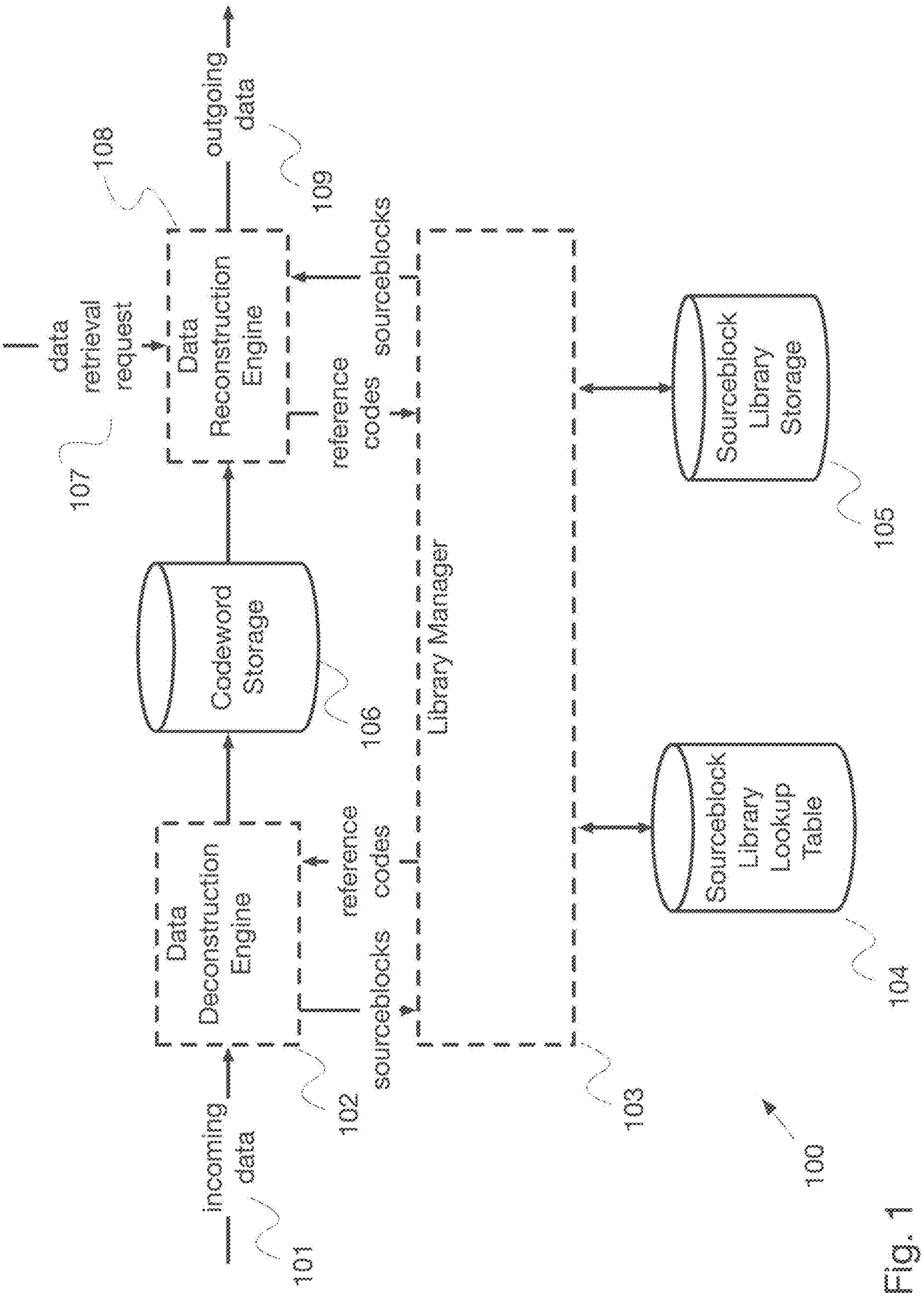
FIG. 1 is a diagram showing an embodiment of the system in which all components of the system are operated locally.

FIG. 1 is a diagram showing an embodiment 100 of the system in which all components of the system are operated locally. As incoming data 101 is received by data deconstruction engine 102. Data deconstruction engine 102 breaks the incoming data into sourceblocks, which are then sent to library manager 103. Using the information contained in sourceblock library lookup table 104 and sourceblock library storage 105, library manager 103 returns reference codes to data deconstruction engine 102 for processing into codewords, which are stored in codeword storage 106. When a data retrieval request 107 is received, data reconstruction engine 108 obtains the codewords associated with the data from codeword storage 106, and sends them to library manager 103. Library manager 103 returns the appropriate sourceblocks to data reconstruction engine 108, which assembles them into the proper order and sends out the data in its original form 109.

Figure 2:
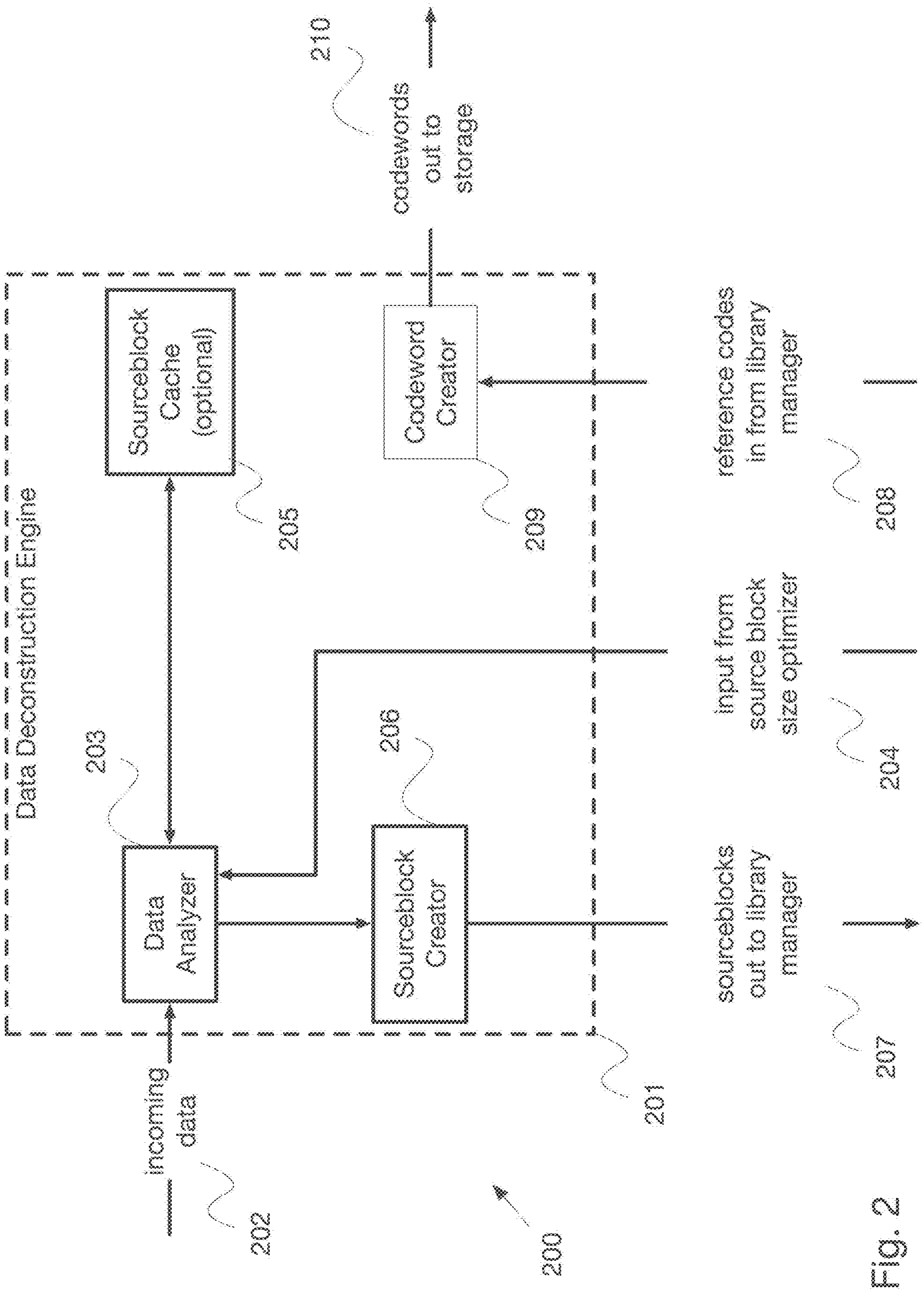
FIG. 2 is a diagram showing an embodiment of one aspect of the system, the data deconstruction engine.

FIG. 2 is a diagram showing an embodiment of one aspect 200 of the system, specifically data deconstruction engine 201. Incoming data 202 is received by data analyzer 203, which optimally analyzes the data based on machine learning algorithms and input 204 from a sourceblock size optimizer, which is disclosed below. Data analyzer may optionally have access to a sourceblock cache 205 of recently-processed sourceblocks, which can increase the speed of the system by avoiding processing in library manager 103. Based on information from data analyzer 203, the data is broken into sourceblocks by sourceblock creator 206, which sends sourceblocks 207 to library manager 203 for additional processing. Data deconstruction engine 201 receives reference codes 208 from library manager 103, corresponding to the sourceblocks in the library that match the sourceblocks sent by sourceblock creator 206, and codeword creator 209 processes the reference codes into codewords comprising a reference code to a sourceblock and a location of that sourceblock within the data set. The original data may be discarded, and the codewords representing the data are sent out to storage 210.

Figure 3:
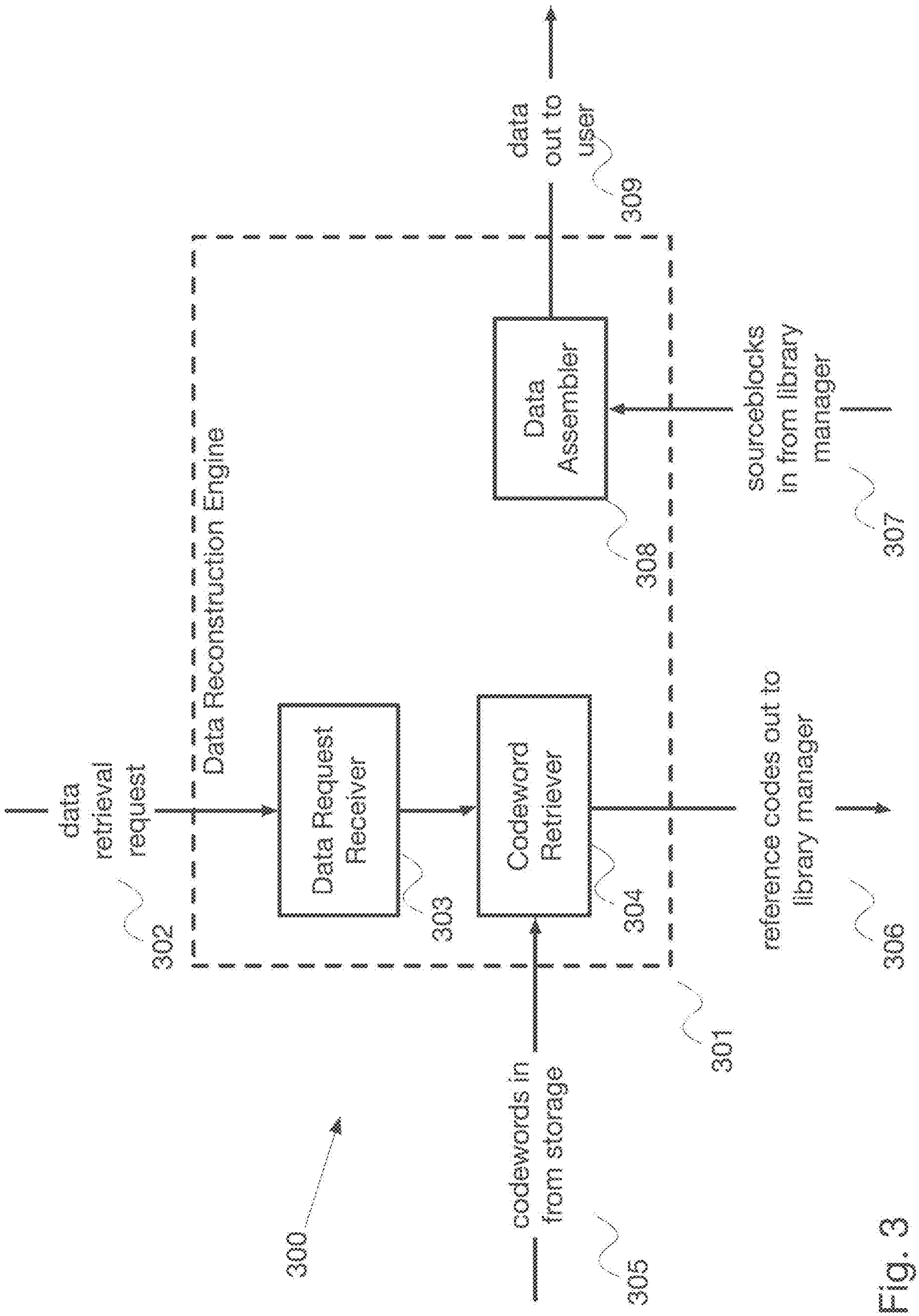
FIG. 3 is a diagram showing an embodiment of one aspect of the system, the data reconstruction engine.

FIG. 3 is a diagram showing an embodiment of another aspect of system 300, specifically data reconstruction engine 301. When a data retrieval request 302 is received by data request receiver 303 (in the form of a plurality of codewords corresponding to a desired final data set), it passes the information to data retriever 304, which obtains the requested data 305 from storage. Data retriever 304 sends, for each codeword received, a reference codes from the codeword 306 to library manager 103 for retrieval of the specific sourceblock associated with the reference code. Data assembler 308 receives the sourceblock 307 from library manager 103 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 309 in its original form.

Figure 4:
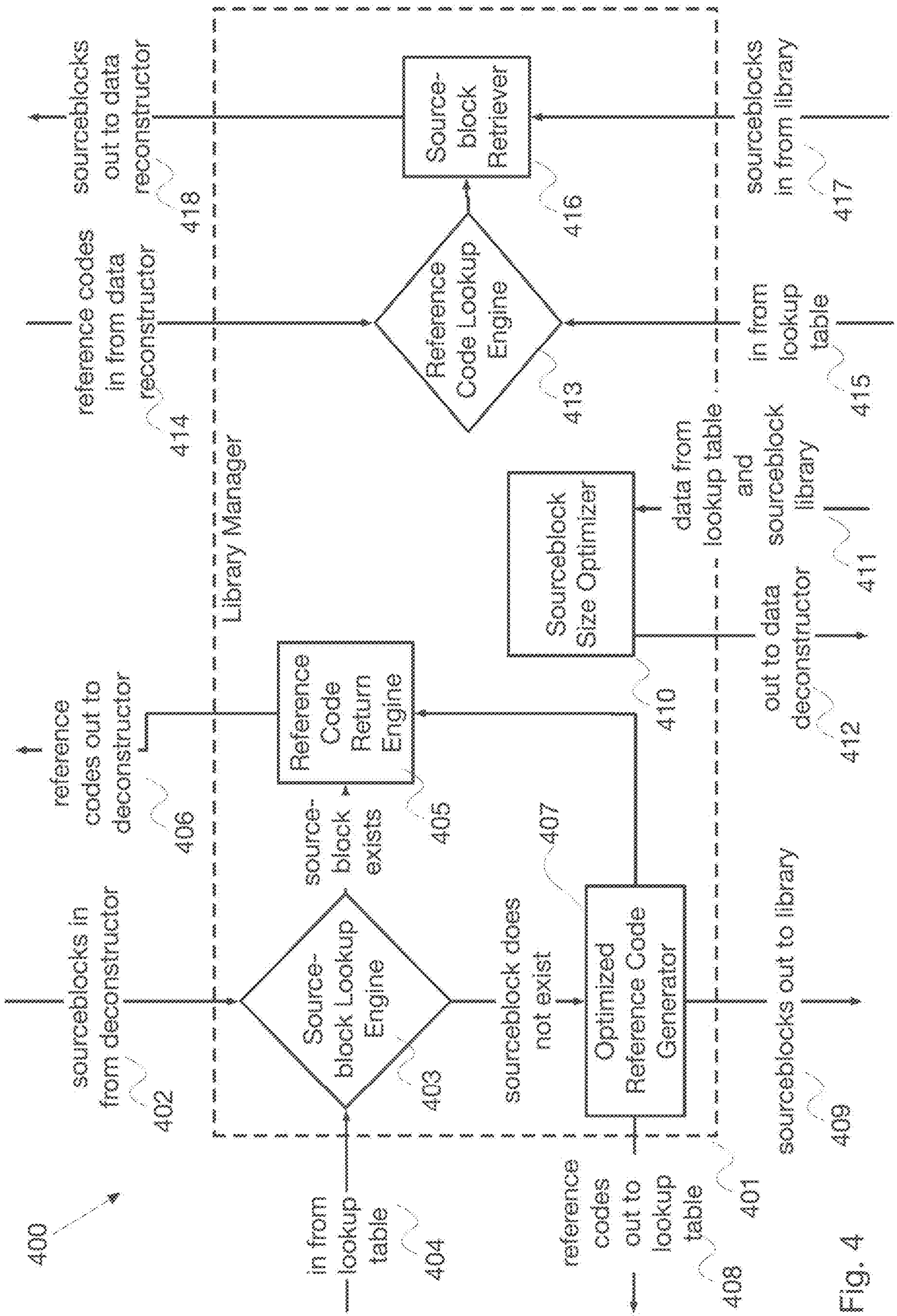
FIG. 4 is a diagram showing an embodiment of one aspect of the system, the library management module.

FIG. 4 is a diagram showing an embodiment of another aspect of the system 400, specifically library manager 401. One function of library manager 401 is to generate reference codes from sourceblocks received from data deconstruction engine 301. As sourceblocks are received 402 from data deconstruction engine 301, sourceblock lookup engine 403 checks sourceblock library lookup table 404 to determine whether those sourceblocks already exist in sourceblock library storage 105. If a particular sourceblock exists in sourceblock library storage 105, reference code return engine 405 sends the appropriate reference code 406 to data deconstruction engine 301. If the sourceblock does not exist in sourceblock library storage 105, optimized reference code generator 407 generates a new, optimized reference code based on machine learning algorithms. Optimized reference code generator 407 then saves the reference code 408 to sourceblock library lookup table 104; saves the associated sourceblock 409 to sourceblock library storage 105; and passes the reference code to reference code return engine 405 for sending 406 to data deconstruction engine 301. Another function of library manager 401 is to optimize the size of sourceblocks in the system. Based on information 411 contained in sourceblock library lookup table 104, sourceblock size optimizer 410 dynamically adjusts the size of sourceblocks in the system based on machine learning algorithms and outputs that information 412 to data analyzer 203. Another function of library manager 401 is to return sourceblocks associated with reference codes received from data reconstruction engine 301. As reference codes are received 414 from data reconstruction engine 301, reference code lookup engine 413 checks sourceblock library lookup table 415 to identify the associated sourceblocks; passes that information to sourceblock retriever 416, which obtains the sourceblocks 417 from sourceblock library storage 105; and passes them 418 to data reconstruction engine 301.

Figure 5:
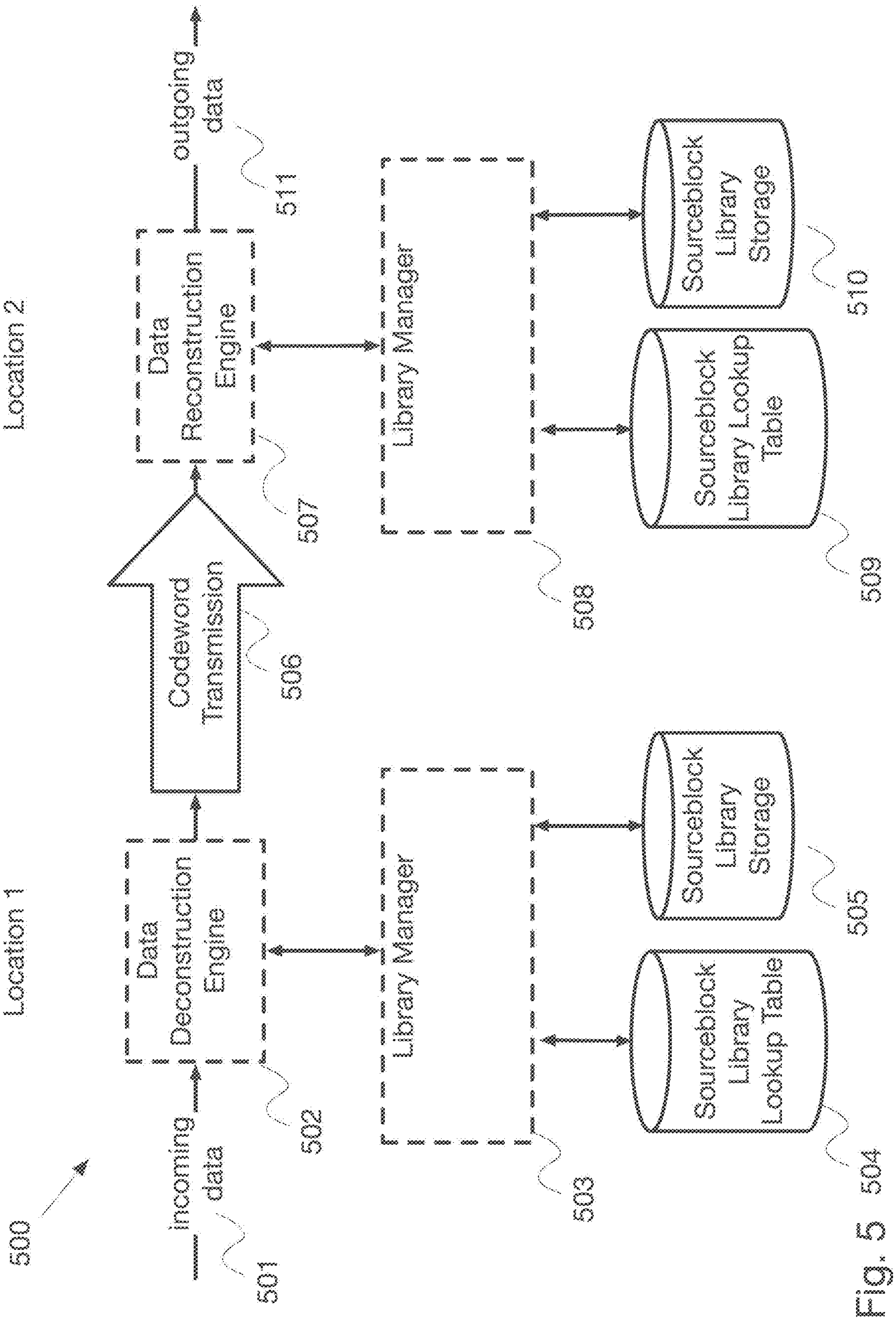
FIG. 5 is a diagram showing another embodiment of the system in which data is transferred between remote locations.

FIG. 5 is a diagram showing another embodiment of system 500, in which data is transferred between remote locations. As incoming data 501 is received by data deconstruction engine 502 at Location 1, data deconstruction engine 301 breaks the incoming data into sourceblocks, which are then sent to library manager 503 at Location 1. Using the information contained in sourceblock library lookup table 504 at Location 1 and sourceblock library storage 505 at Location 1, library manager 503 returns reference codes to data deconstruction engine 301 for processing into codewords, which are transmitted 506 to data reconstruction engine 507 at Location 2. In the case where the reference codes contained in a particular codeword have been newly generated by library manager 503 at Location 1, the codeword is transmitted along with a copy of the associated sourceblock. As data reconstruction engine 507 at Location 2 receives the codewords, it passes them to library manager module 508 at Location 2, which looks up the sourceblock in sourceblock library lookup table 509 at Location 2, and retrieves the associated from sourceblock library storage 510. Where a sourceblock has been transmitted along with a codeword, the sourceblock is stored in sourceblock library storage 510 and sourceblock library lookup table 504 is updated. Library manager 503 returns the appropriate sourceblocks to data reconstruction engine 507, which assembles them into the proper order and sends the data in its original form 511.

Figure 6:
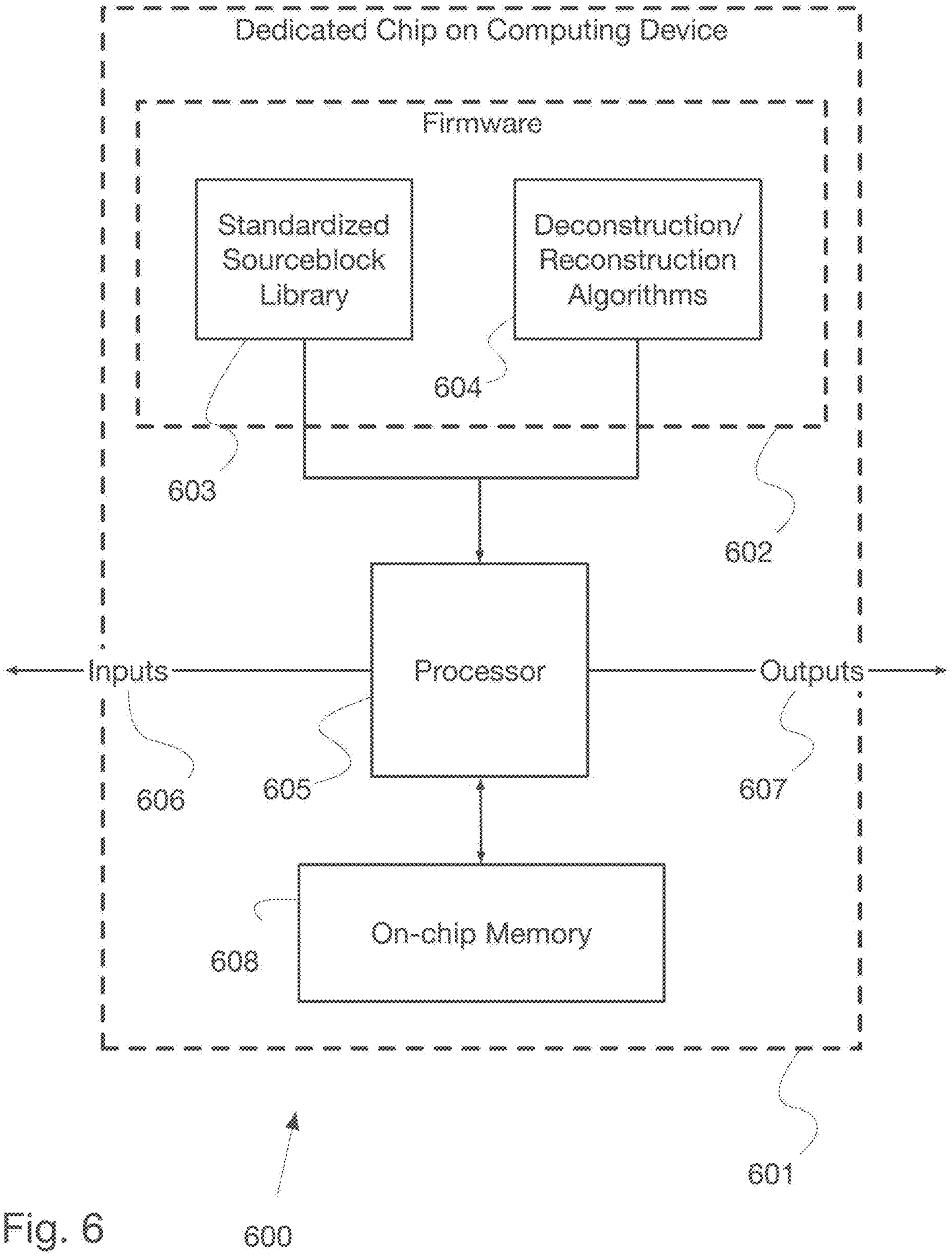
FIG. 6 is a diagram showing an embodiment in which a standardized version of the sourceblock library and associated algorithms would be encoded as firmware on a dedicated processing chip included as part of the hardware of a plurality of devices.

FIG. 6 is a diagram showing an embodiment 600 in which a standardized version of a sourceblock library 603 and associated algorithms 604 would be encoded as firmware 602 on a dedicated processing chip 601 included as part of the hardware of a plurality of devices 600. Contained on dedicated chip 601 would be a firmware area 602, on which would be stored a copy of a standardized sourceblock library 603 and deconstruction/reconstruction algorithms 604 for processing the data. Processor 605 would have both inputs 606 and outputs 607 to other hardware on the device 600. Processor 605 would store incoming data for processing on on-chip memory 608, process the data using standardized sourceblock library 603 and deconstruction/reconstruction algorithms 604, and send the processed data to other hardware on device 600. Using this embodiment, the encoding and decoding of data would be handled by dedicated chip 601, keeping the burden of data processing off device's 600 primary processors. Any device equipped with this embodiment would be able to store and transmit data in a highly optimized, bandwidth-efficient format with any other device equipped with this embodiment.

Figure 12:
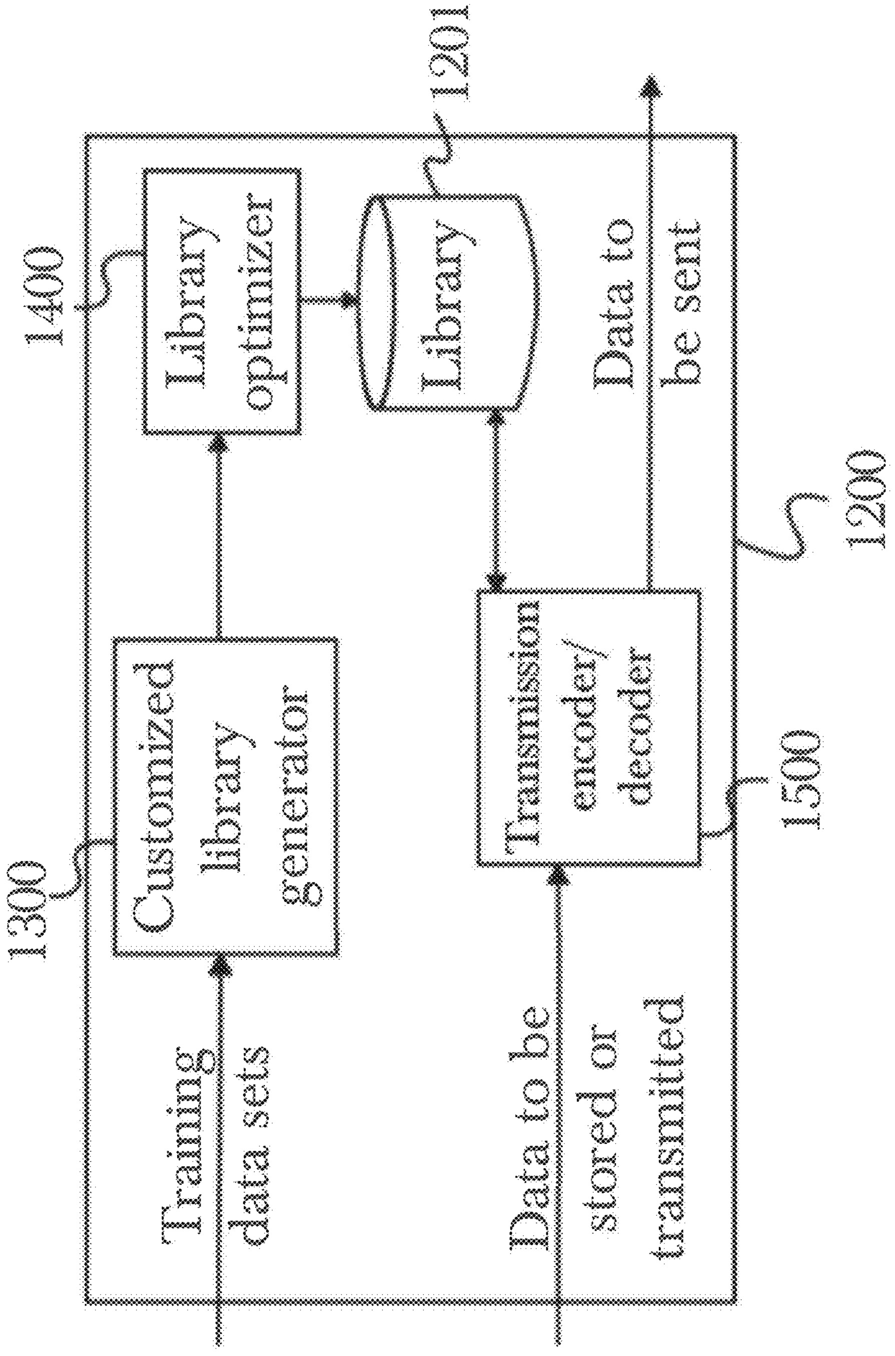
FIG. 12 is a diagram showing an exemplary system architecture, according to a preferred embodiment of the invention.

FIG. 12 is a diagram showing an exemplary system architecture 1200, according to a preferred embodiment of the invention. Incoming training data sets may be received at a customized library generator 1300 that processes training data to produce a customized word library 1201 comprising key-value pairs of data words (each comprising a string of bits) and their corresponding calculated binary Huffman codewords. The resultant word library 1201 may then be processed by a library optimizer 1400 to reduce size and improve efficiency, for example by pruning low-occurrence data entries or calculating approximate codewords that may be used to match more than one data word. A transmission encoder/decoder 1500 may be used to receive incoming data intended for storage or transmission, process the data using a word library 1201 to retrieve codewords for the words in the incoming data, and then append the codewords (rather than the original data) to an outbound data stream. Each of these components is described in greater detail below, illustrating the particulars of their respective processing and other functions, referring to FIGS. 2-4.

System 1200 provides near-instantaneous source coding that is dictionary-based and learned in advance from sample training data, so that encoding and decoding may happen concurrently with data transmission. This results in computational latency that is near zero but the data size reduction is comparable to classical compression. For example, if N bits are to be transmitted from sender to receiver, the compression ratio of classical compression is C, the ratio between the deflation factor of system 1200 and that of multi-pass source coding is p, the classical compression encoding rate is $R_C$ bit/s and the decoding rate is $R_D$ bit/s, and the transmission speed is S bit/s, the compress-send-decompress time will be $$T_{old} = \frac{N}{R_C} + \frac{N}{CS} + \frac{N}{CR_D}$$

while the transmit-while-coding time for system 1200 will be (assuming that encoding and decoding happen at least as quickly as network latency):

$$T_{new} = \frac{N_p}{CS}$$

so that the total data transit time improvement factor is $$\frac{T_{old}}{T_{new}} = \frac{\frac{CS}{R_C} + 1 + \frac{S}{R_D}}{p},$$

which presents a savings whenever $$\frac{CS}{R_C} + \frac{S}{R_D} > p - 1.$$

This is a reasonable scenario given that typical values in real-world practice are C=0.32, $R_C=1.1\cdot10^{12}$, $R_D=4.2\cdot 10^{12}$, $S=10^{11}$, giving $$\frac{CS}{R_C} + \frac{S}{R_D} = 0.053\ldots,$$

such that system 1200 will outperform the total transit time of the best compression technology available as long as its deflation factor is no more than 5% worse than compression. Such customized dictionary-based encoding will also sometimes exceed the deflation ratio of classical compression, particularly when network speeds increase beyond 100 Gb/s.

The delay between data creation and its readiness for use at a receiving end will be equal to only the source word length t (typically 5-15 bytes), divided by the deflation factor C/p and the network speed S, i.e.

$$\text{delay}_{invention} = \frac{tp}{CS}$$

since encoding and decoding occur concurrently with data transmission. On the other hand, the latency associated with classical compression is $$\text{delay}_{priorart} = \frac{N}{R_C} + \frac{N}{CS} + \frac{N}{CR_D}$$

where N is the packet/file size. Even with the generous values chosen above as well as N=512K, t=10, and p=1.05, this results in $\text{delay}_{invention} \approx 3.3 \cdot 10^{-10}$ while $\text{delay}_{priorart} \approx 1.3 \cdot 10^{-7}$, a more than 400-fold reduction in latency.

A key factor in the efficiency of Huffman coding used by system 1200 is that key-value pairs be chosen carefully to minimize expected coding length, so that the average deflation/compression ratio is minimized. It is possible to achieve the best possible expected code length among all instantaneous codes using Huffman codes if one has access to the exact probability distribution of source words of a given desired length from the random variable generating them. In practice this is impossible, as data is received in a wide variety of formats and the random processes underlying the source data are a mixture of human input, unpredictable (though in principle, deterministic) physical events, and noise. System 1200 addresses this by restriction of data types and density estimation; training data is provided that is representative of the type of data anticipated in "real-world" use of system 1200, which is then used to model the distribution of binary strings in the data in order to build a Huffman code word library 1200.

Figure 13:
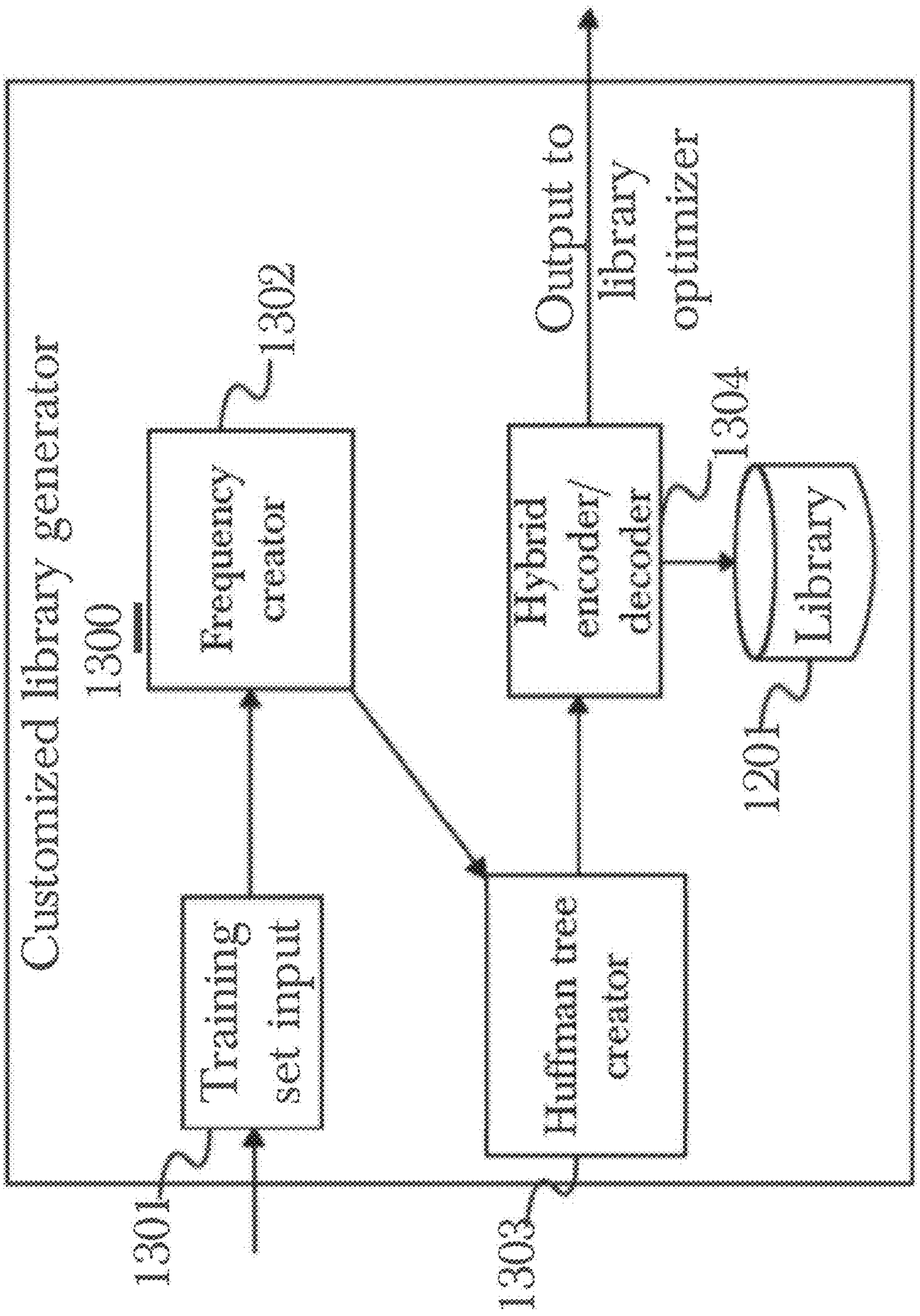
FIG. 13 is a diagram showing a more detailed architecture for a customized library generator.

FIG. 13 is a diagram showing a more detailed architecture for a customized library generator 1300. When an incoming training data set 1301 is received, it may be analyzed using a frequency creator 1302 to analyze for word frequency (that is, the frequency with which a given word occurs in the training data set). Word frequency may be analyzed by scanning all substrings of bits and directly calculating the frequency of each substring by iterating over the data set to produce an occurrence frequency, which may then be used to estimate the rate of word occurrence in non-training data. A first Huffman binary tree is created based on the frequency of occurrences of each word in the first dataset, and a Huffman codeword is assigned to each observed word in the first dataset according to the first Huffman binary tree. Machine learning may be utilized to improve results by processing a number of training data sets and using the results of each training set to refine the frequency estimations for non-training data, so that the estimation yield better results when used with real-world data (rather than, for example, being only based on a single training data set that may not be very similar to a received non-training data set). A second Huffman tree creator 1303 may be utilized to identify words that do not match any existing entries in a word library 1201 and pass them to a hybrid encoder/decoder 1304, that then calculates a binary Huffman codeword for the mismatched word and adds the codeword and original data to the word library 1201 as a new key-value pair. In this manner, customized library generator 1300 may be used both to establish an initial word library 1201 from a first training set, as well as expand the word library 1201 using additional training data to improve operation.

Figure 14:
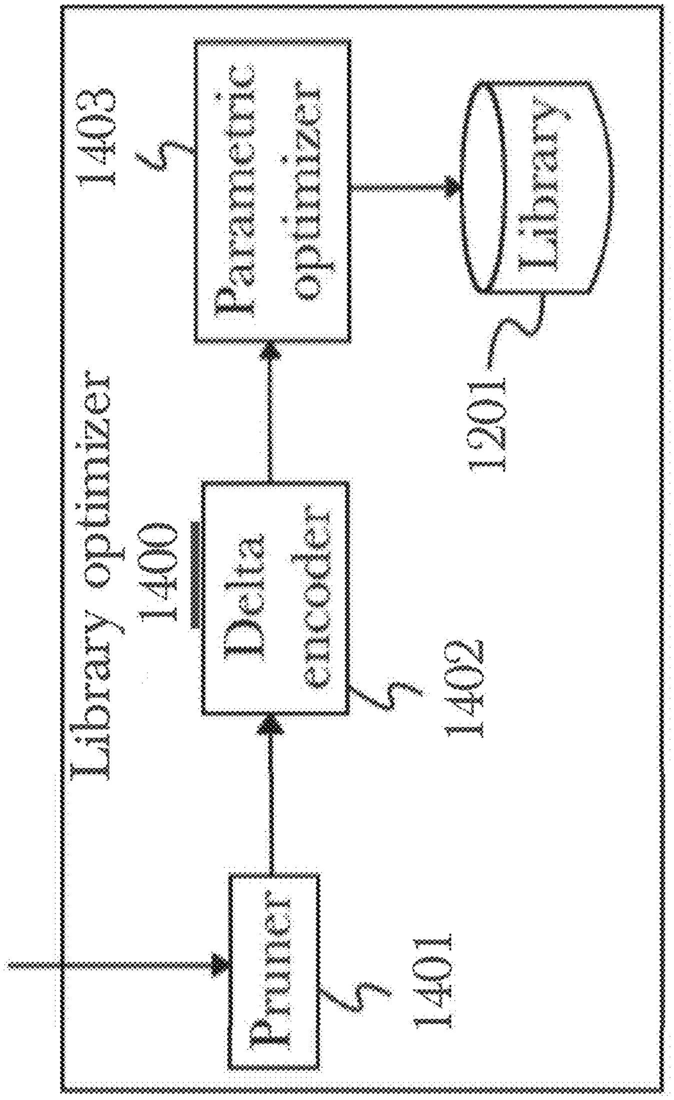
FIG. 14 is a diagram showing a more detailed architecture for a library optimizer.

FIG. 14 is a diagram showing a more detailed architecture for a library optimizer 1400. A pruner 1401 may be used to load a word library 1201 and reduce its size for efficient operation, for example by sorting the word library 1201 based on the known occurrence probability of each key-value pair and removing low-probability key-value pairs based on a loaded threshold parameter. This prunes low-value data from the word library to trim the size, eliminating large quantities of very-low-frequency key-value pairs such as single-occurrence words that are unlikely to be encountered again in a data set. Pruning eliminates the least-probable entries from word library 1201 up to a given threshold, which will have a negligible impact on the deflation factor since the removed entries are only the least-common ones, while the impact on word library size will be larger because samples drawn from asymptotically normal distributions (such as the log-probabilities of words generated by a probabilistic finite state machine, a model well-suited to a wide variety of real-world data) which occur in tails of the distribution are disproportionately large in counting measure. A delta encoder 1402 may be utilized to apply delta encoding to a plurality of words to store an approximate codeword as a value in the word library, for which each of the plurality of source words is a valid corresponding key. This may be used to reduce library size by replacing numerous key-value pairs with a single entry for the approximate codeword and then represent actual codewords using the approximate codeword plus a delta value representing the difference between the approximate codeword and the actual codeword. Approximate coding is optimized for low-weight sources such as Golomb coding, run-length coding, and similar techniques. The approximate source words may be chosen by locality-sensitive hashing, so as to approximate Hamming distance without incurring the intractability of nearest-neighbor-search in Hamming space. A parametric optimizer 1403 may load configuration parameters for operation to optimize the use of the word library 1201 during operation. Best-practice parameter/hyperparameter optimization strategies such as stochastic gradient descent, quasi-random grid search, and evolutionary search may be used to make optimal choices for all interdependent settings playing a role in the functionality of system 1200. In cases where lossless compression is not required, the delta value may be discarded at the expense of introducing some limited errors into any decoded (reconstructed) data.

Figure 15:
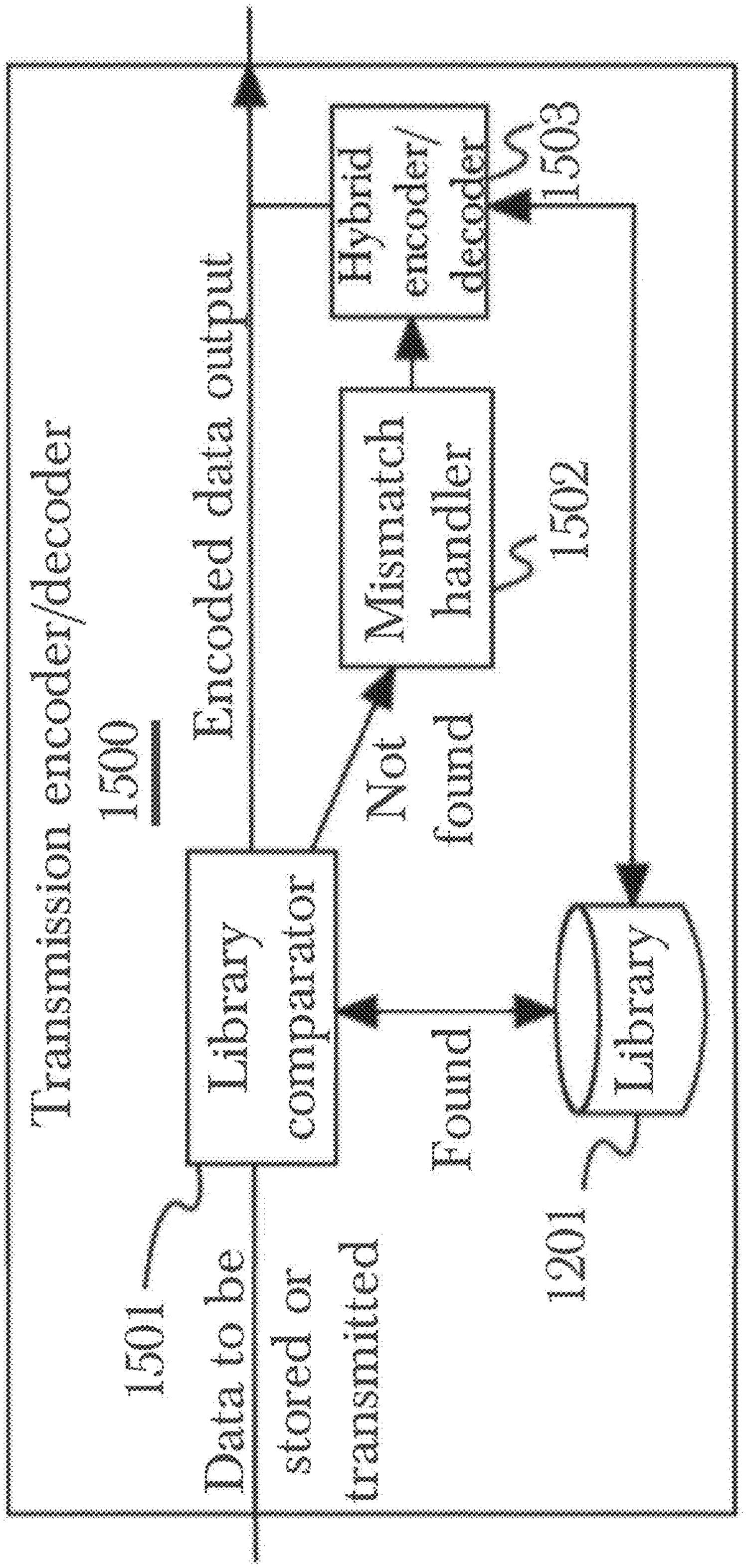
FIG. 15 is a diagram showing a more detailed architecture for a transmission and storage engine.

FIG. 15 is a diagram showing a more detailed architecture for a transmission encoder/decoder 1500. According to various arrangements, transmission encoder/decoder 1500 may be used to deconstruct data for storage or transmission, or to reconstruct data that has been received, using a word library 1201. A library comparator 1501 may be used to receive data comprising words or codewords, and compare against a word library 1201 by dividing the incoming stream into substrings of length t and using a fast hash to check word library 1201 for each substring. If a substring is found in word library 1201, the corresponding key/value (that is, the corresponding source word or codeword, according to whether the substring used in comparison was itself a word or codeword) is returned and appended to an output stream. If a given substring is not found in word library 1201, a mismatch handler 1502 and hybrid encoder/decoder 1503 may be used to handle the mismatch similarly to operation during the construction or expansion of word library 1201. A mismatch handler 1502 may be utilized to identify words that do not match any existing entries in a word library 1201 and pass them to a hybrid encoder/decoder 1503, that then calculates a binary Huffman codeword for the mismatched word and adds the codeword and original data to the word library 1201 as a new key-value pair. The newly-produced codeword may then be appended to the output stream. In arrangements where a mismatch indicator is included in a received data stream, this may be used to preemptively identify a substring that is not in word library 1201 (for example, if it was identified as a mismatch on the transmission end), and handled accordingly without the need for a library lookup.

Figure 19:
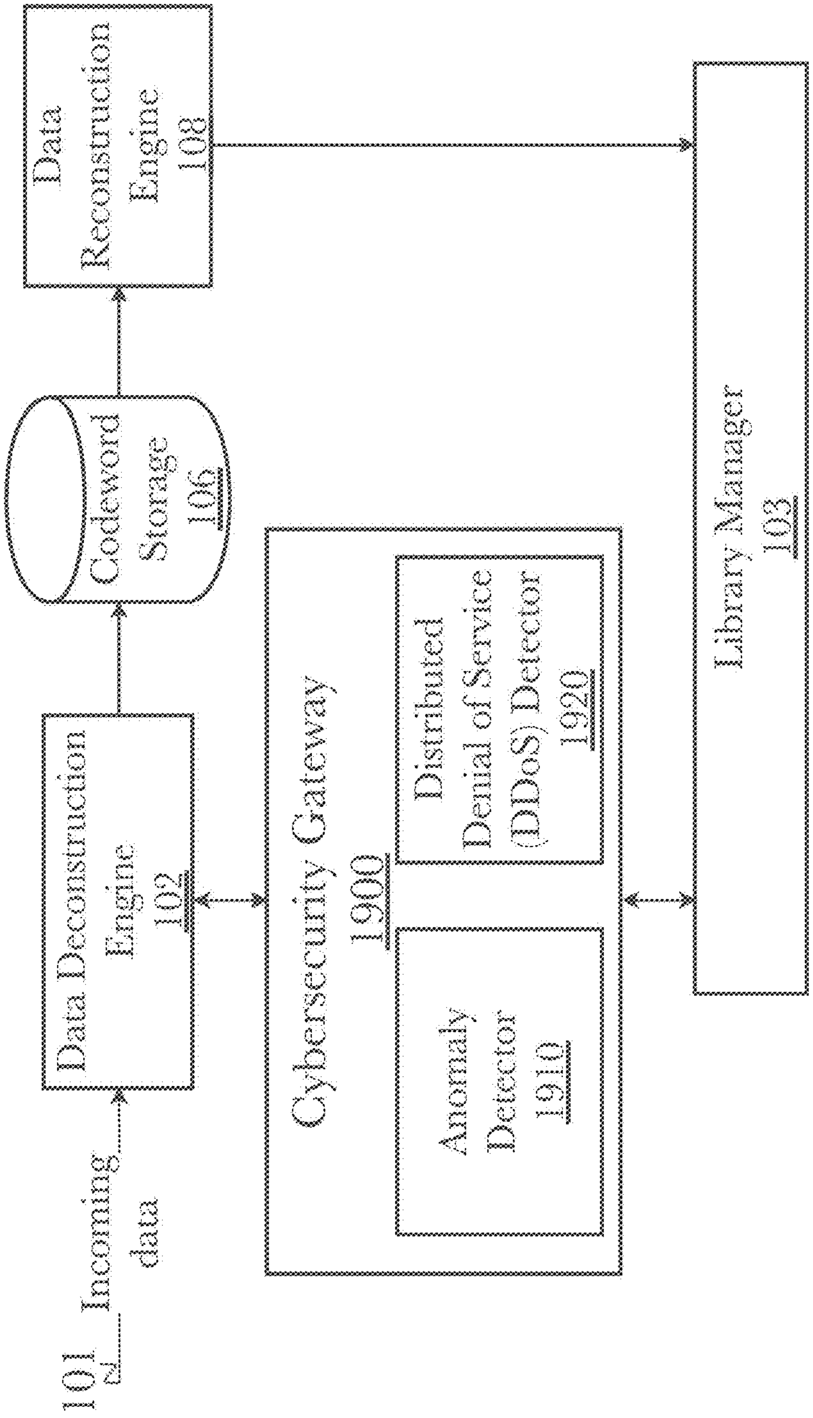
FIG. 19 is an exemplary system architecture of a data encoding system used for cyber security purposes.

FIG. 19 is an exemplary system architecture of a data encoding system used for cyber security purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. However, a cybersecurity gateway 1900 is present, communicating in-between a library manager 103 and a deconstruction engine 102, and containing an anomaly detector 1910 and distributed denial of service (DDoS) detector 1920. The anomaly detector examines incoming data to determine whether there is a disproportionate number of incoming reference codes that do not match reference codes in the existing library. A disproportionate number of non-matching reference codes may indicate that data is being received from an unknown source, of an unknown type, or contains unexpected (possibly malicious) data. If the disproportionate number of non-matching reference codes exceeds an established threshold or persists for a certain length of time, the anomaly detector 1910 raises a warning to a system administrator. Likewise, the DDOS detector 1920 examines incoming data to determine whether there is a disproportionate amount of repetitive data. A disproportionate amount of repetitive data may indicate that a DDOS attack is in progress. If the disproportionate amount of repetitive data exceeds an established threshold or persists for a certain length of time, the DDOS detector 1910 raises a warning to a system administrator. In this way, a data encoding system may detect and warn users of, or help mitigate, common cyber-attacks that result from a flow of unexpected and potentially harmful data, or attacks that result from a flow of too much irrelevant data meant to slow down a network or system, as in the case of a DDOS attack.

Figure 22:
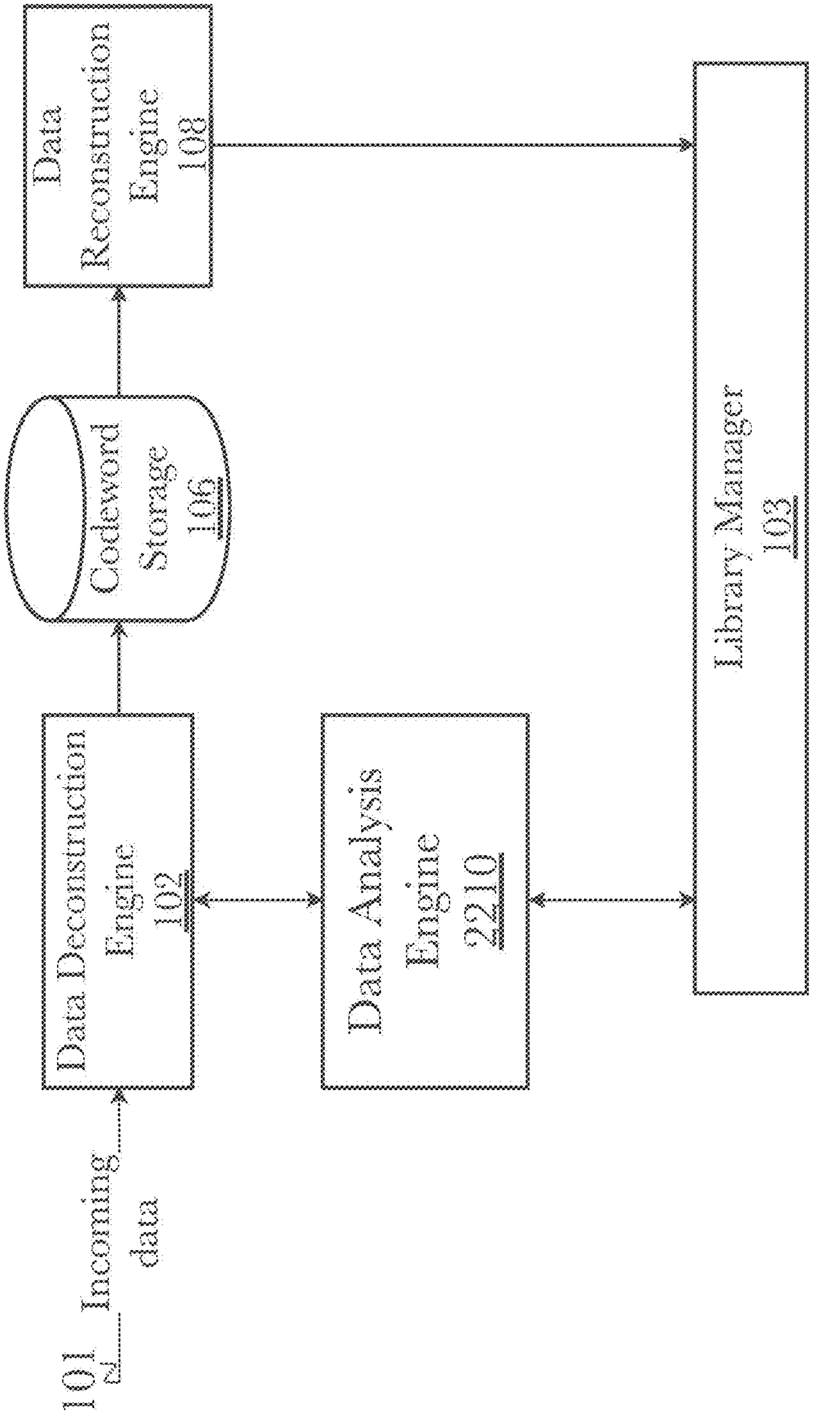
FIG. 22 is an exemplary system architecture of a data encoding system used for data mining and analysis purposes.

FIG. 22 is an exemplary system architecture of a data encoding system used for data mining and analysis purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. A data analysis engine 2210, typically operating while the system is otherwise idle, sends requests for data to the data reconstruction engine 108, which retrieves the codewords representing the requested data from codeword storage 106, reconstructs them into the data represented by the codewords, and send the reconstructed data to the data analysis engine 2210 for analysis and extraction of useful data (i.e., data mining). Because the speed of reconstruction is significantly faster than decompression using traditional compression technologies (i.e., significantly less decompression latency), this approach makes data mining feasible. Very often, data stored using traditional compression is not mined precisely because decompression lag makes it unfeasible, especially during shorter periods of system idleness. Increasing the speed of data reconstruction broadens the circumstances under which data mining of stored data is feasible.

Figure 24:
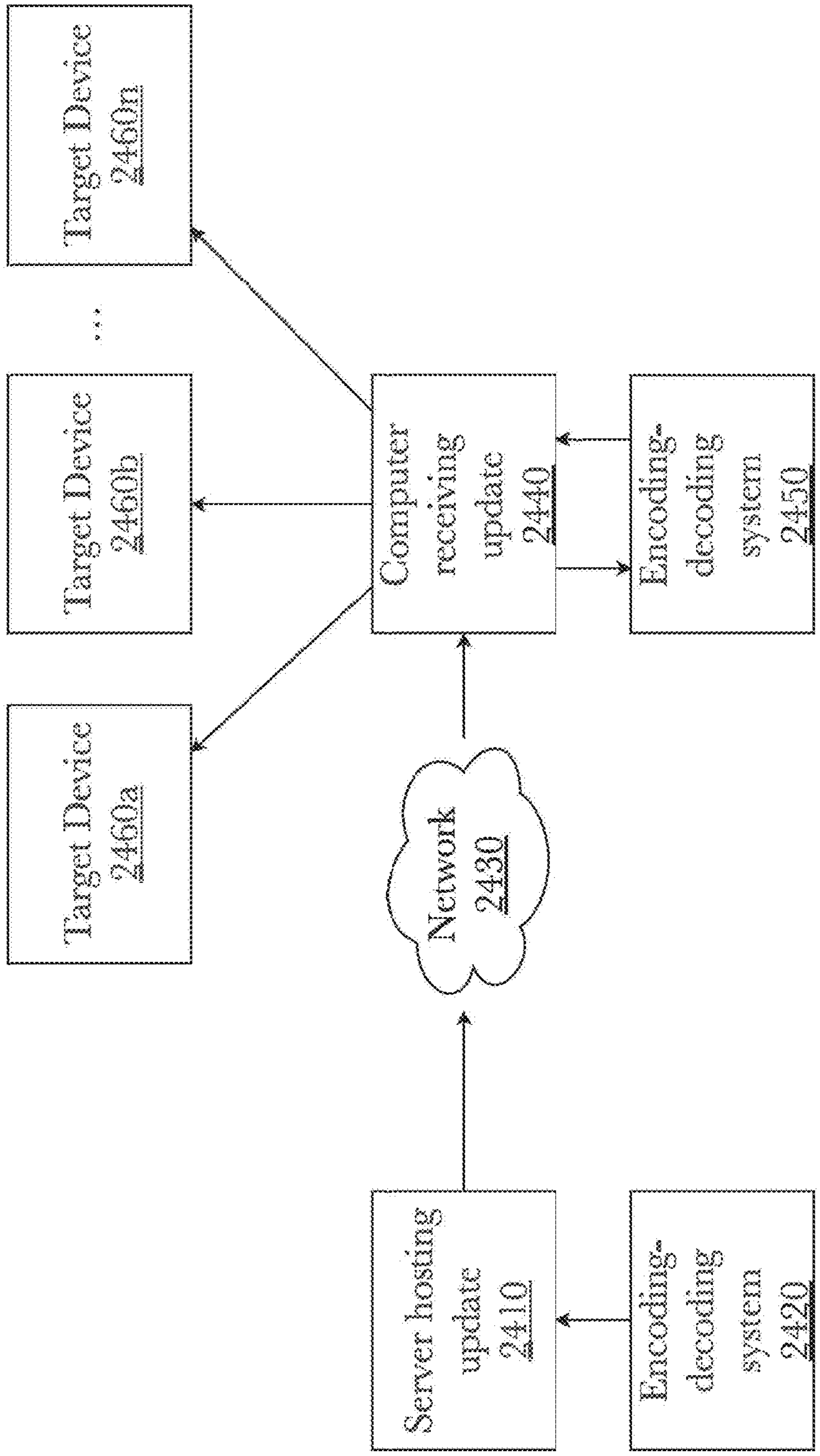
FIG. 24 is an exemplary system architecture of a data encoding system used for remote software and firmware updates.

FIG. 24 is an exemplary system architecture of a data encoding system used for remote software and firmware updates. Software and firmware updates typically require smaller, but more frequent, file transfers. A server which hosts a software or firmware update 2410 may host an encoding-decoding system 2420, allowing for data to be encoded into, and decoded from, sourceblocks or codewords, as disclosed in previous figures. Such a server may possess a software update, operating system update, firmware update, device driver update, or any other form of software update, which in some cases may be minor changes to a file, but nevertheless necessitate sending the new, completed file to the recipient. Such a server is connected over a network 2430, which is further connected to a recipient computer 2440, which may be connected to a server 2410 for receiving such an update to its system. In this instance, the recipient device 2440 also hosts the encoding and decoding system 2450, along with a codebook or library of reference codes that the hosting server 2410 also shares. The updates are retrieved from storage at the hosting server 2410 in the form of codewords, transferred over the network 2430 in the form of codewords, and reconstructed on the receiving computer 2440. In this way, a far smaller file size, and smaller total update size, may be sent over a network. The receiving computer 2440 may then install the updates on any number of target computing devices 2460*a-n*, using a local network or other high-bandwidth connection.

Figure 26:
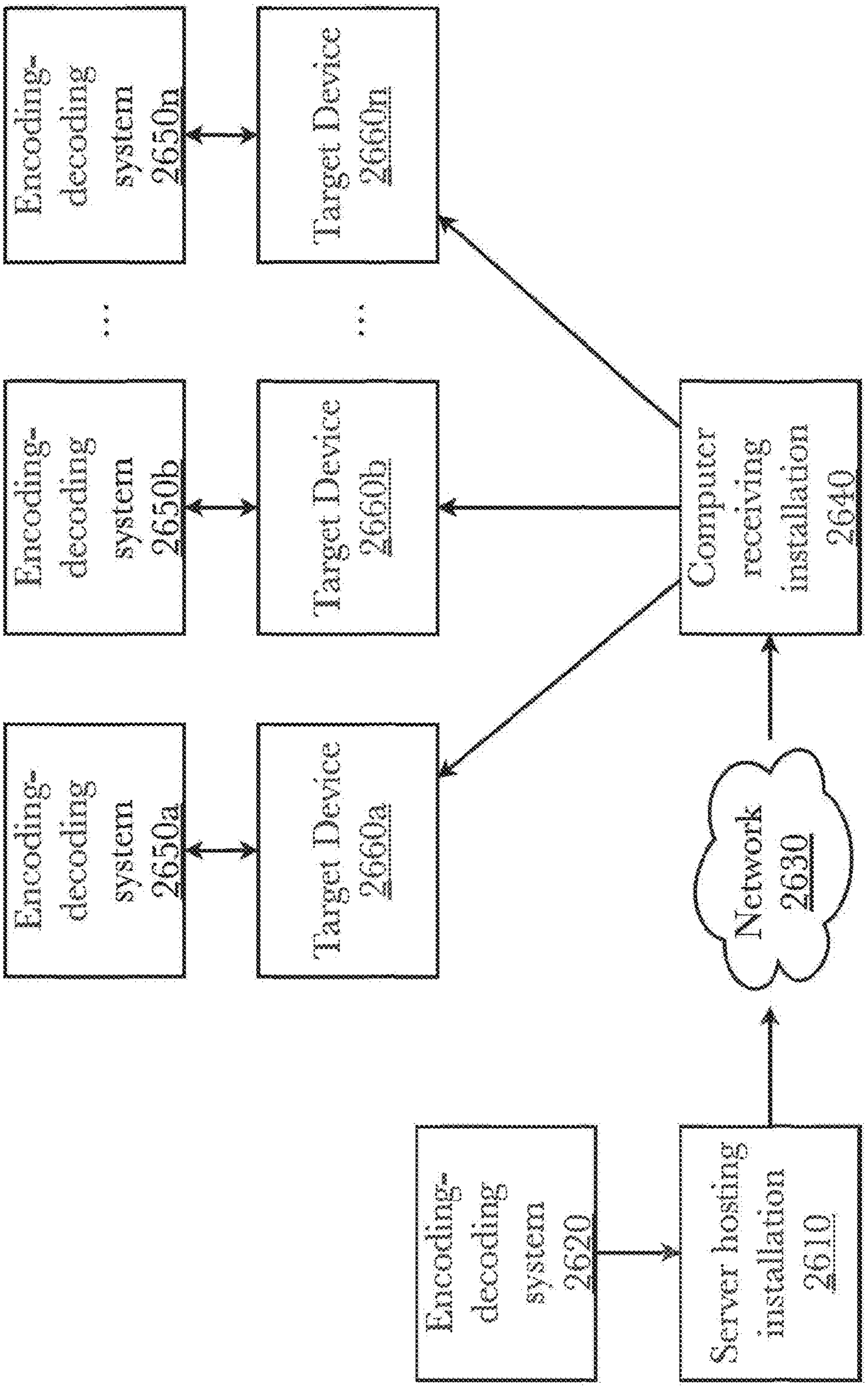
FIG. 26 is an exemplary system architecture of a data encoding system used for large-scale software installation such as operating systems.

FIG. 26 is an exemplary system architecture of a data encoding system used for large-scale software installation such as operating systems. Large-scale software installations typically require very large, but infrequent, file transfers. A server which hosts an installable software 2610 may host an encoding-decoding system 2620, allowing for data to be encoded into, and decoded from, sourceblocks or codewords, as disclosed in previous figures. The files for the large scale software installation are hosted on the server 2610, which is connected over a network 2630 to a recipient computer 2640. In this instance, the encoding and decoding system 2650*a-n* is stored on or connected to one or more target devices 2660*a-n*, along with a codebook or library of reference codes that the hosting server 2610 shares. The software is retrieved from storage at the hosting server 2610 in the form of codewords and transferred over the network 2630 in the form of codewords to the receiving computer 2640. However, instead of being reconstructed at the receiving computer 2640, the codewords are transmitted to one or more target computing devices, and reconstructed and installed directly on the target devices 2660*a-n*. In this way, a far smaller file size, and smaller total update size, may be sent over a network or transferred between computing devices, even where the network 2630 between the receiving computer 2640 and target devices 2660*a-n* is low bandwidth, or where there are many target devices 2660*a-n*.

Figure 28:
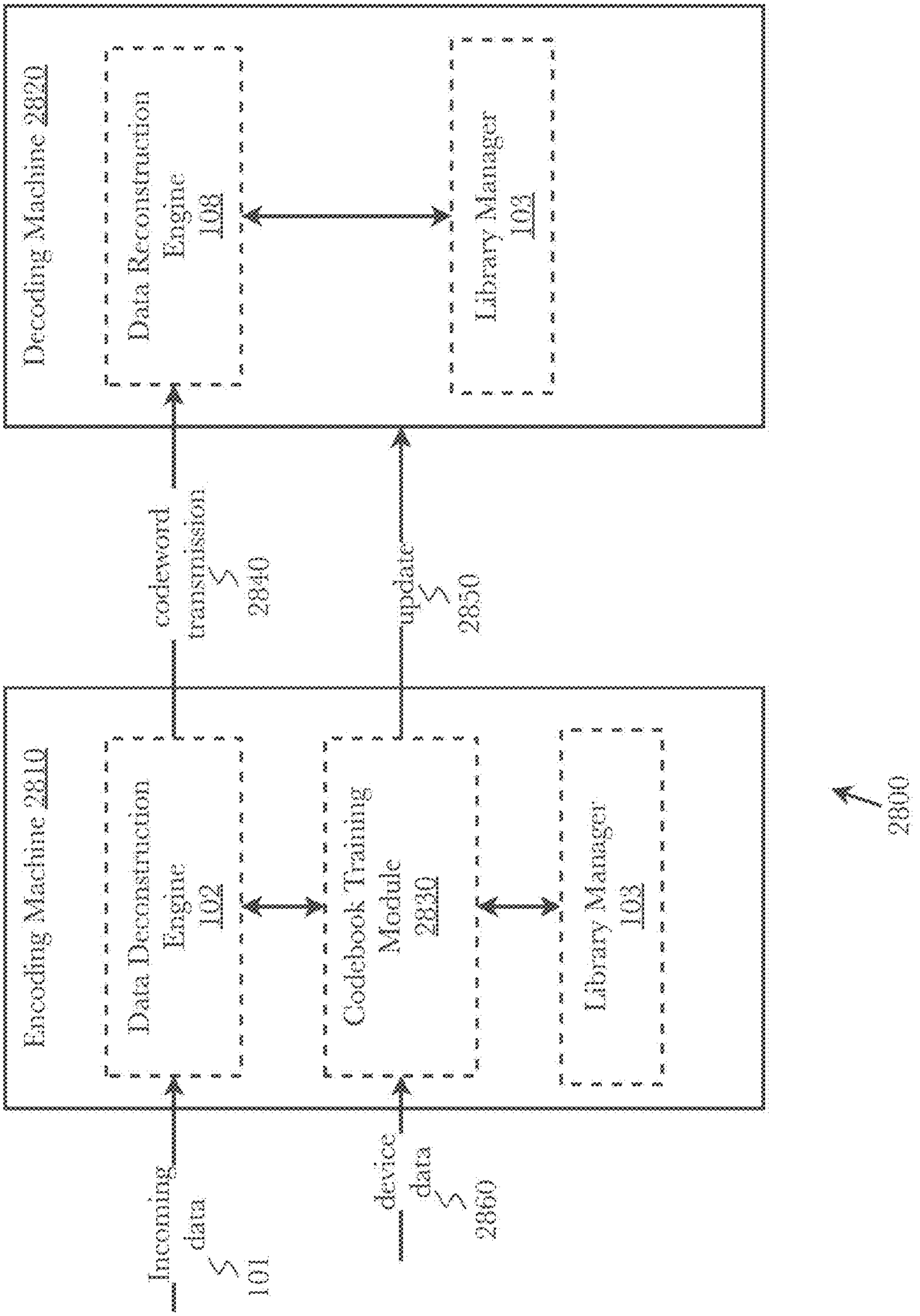
FIG. 28 is a block diagram of an exemplary system architecture of a codebook training system for a data encoding system, according to an embodiment.

FIG. 28 is a block diagram of an exemplary system architecture 2800 of a codebook training system for a data encoding system, according to an embodiment. According to this embodiment, two separate machines may be used for encoding 2810 and decoding 2820. Much like in FIG. 1, incoming data 101 to be deconstructed is sent to a data deconstruction engine 102 residing on encoding machine 2810, which may attempt to deconstruct the data and turn it into a collection of codewords using a library manager 103.

Codewords may be transmitted 2840 to a data reconstruction engine 108 residing on decoding machine 2820, which may reconstruct the original data from the codewords, using a library manager 103. However, according to this embodiment, a codebook training module 2830 is present on the decoding machine 2810, communicating in-between a library manager 103 and a deconstruction engine 102. According to other embodiments, codebook training module 2830 may reside instead on decoding machine 2820 if the machine has enough computing resources available; which machine the module 2830 is located on may depend on the system user's architecture and network structure. Codebook training module 2830 may send requests for data to the data reconstruction engine 2810, which routes incoming data 101 to codebook training module 2830. Codebook training module 2830 may perform analyses on the requested data in order to gather information about the distribution of incoming data 101 as well as monitor the encoding/decoding model performance. Additionally, codebook training module 2830 may also request and receive device data 2860 to supervise network connected devices and their processes and, according to some embodiments, to allocate training resources when requested by devices running the encoding system. Devices may include, but are not limited to, encoding and decoding machines, training machines, sensors, mobile computing devices, and Internet-of-things ("IoT") devices. Based on the results of the analyses, the codebook training module 2830 may create a new training dataset from a subset of the requested data in order to counteract the effects of data drift on the encoding/decoding models, and then publish updated 2850 codebooks to both the encoding machine 2810 and decoding machine 2820.

Figure 29:
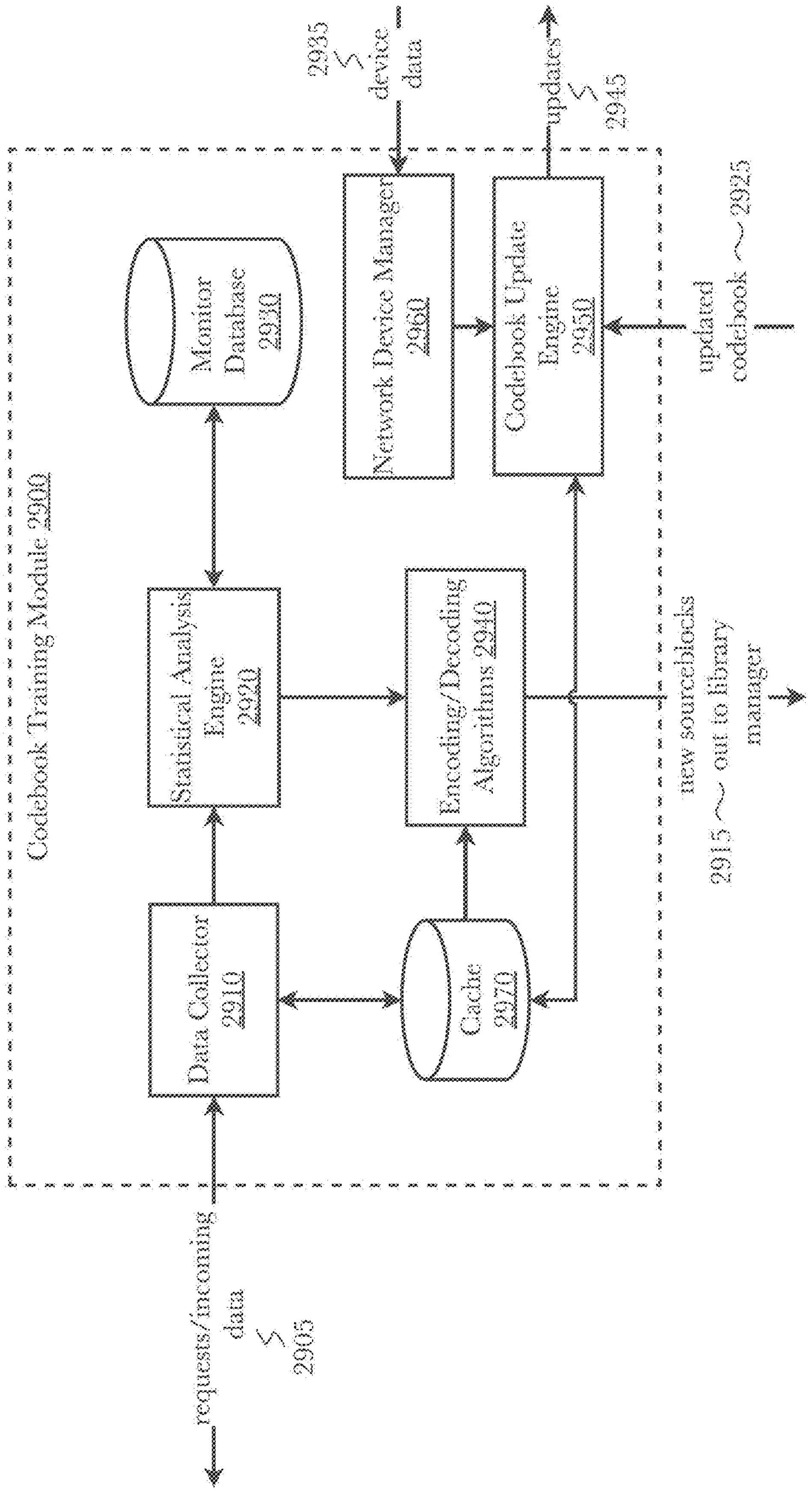
FIG. 29 is a block diagram of an exemplary architecture for a codebook training module, according to an embodiment.

FIG. 29 is a block diagram of an exemplary architecture for a codebook training module 2900, according to an embodiment. According to the embodiment, a data collector 2910 is present which may send requests for incoming data 2905 to a data deconstruction engine 102 which may receive the request and route incoming data to codebook training module 2900 where it may be received by data collector 2910. Data collector 2910 may be configured to request data periodically such as at schedule time intervals, or for example, it may be configured to request data after a certain amount of data has been processed through the encoding machine 2810 or decoding machine 2820. The received data may be a plurality of sourceblocks, which are a series of binary digits, originating from a source packet otherwise referred to as a datagram. The received data may compiled into a test dataset and temporarily stored in a cache 2970. Once stored, the test dataset may be forwarded to a statistical analysis engine 2920 which may utilize one or more algorithms to determine the probability distribution of the test dataset. Best-practice probability distribution algorithms such as Kullback-Leibler divergence, adaptive windowing, and Jensen-Shannon divergence may be used to compute the probability distribution of training and test datasets. A monitoring database 2930 may be used to store a variety of statistical data related to training datasets and model performance metrics in one place to facilitate quick and accurate system monitoring capabilities as well as assist in system debugging functions. For example, the original or current training dataset and the calculated probability distribution of this training dataset used to develop the current encoding and decoding algorithms may be stored in monitor database 2930.

Since data drifts involve statistical change in the data, the best approach to detect drift is by monitoring the incoming data's statistical properties, the model's predictions, and their correlation with other factors. After statistical analysis engine 2920 calculates the probability distribution of the test dataset it may retrieve from monitor database 2930 the calculated and stored probability distribution of the current training dataset. It may then compare the two probability distributions of the two different datasets in order to verify if the difference in calculated distributions exceeds a predetermined difference threshold. If the difference in distributions does not exceed the difference threshold, that indicates the test dataset, and therefore the incoming data, has not experienced enough data drift to cause the encoding/decoding system performance to degrade significantly, which indicates that no updates are necessary to the existing codebooks. However, if the difference threshold has been surpassed, then the data drift is significant enough to cause the encoding/decoding system performance to degrade to the point where the existing models and accompanying codebooks need to be updated. According to an embodiment, an alert may be generated by statistical analysis engine 2920 if the difference threshold is surpassed or if otherwise unexpected behavior arises.

In the event that an update is required, the test dataset stored in the cache 2970 and its associated calculated probability distribution may be sent to monitor database 2930 for long term storage. This test dataset may be used as a new training dataset to retrain the encoding and decoding algorithms 2940 used to create new sourceblocks based upon the changed probability distribution. The new sourceblocks may be sent out to a library manager 2915 where the sourceblocks can be assigned new codewords. Each new sourceblock and its associated codeword may then be added to a new codebook and stored in a storage device. The new and updated codebook may then be sent back 2925 to codebook training module 2900 and received by a codebook update engine 2950. Codebook update engine 2950 may temporarily store the received updated codebook in the cache 2970 until other network devices and machines are ready, at which point codebook update engine 2950 will publish the updated codebooks 2945 to the necessary network devices.

A network device manager 2960 may also be present which may request and receive network device data 2935 from a plurality of network connected devices and machines. When the disclosed encoding system and codebook training system 2800 are deployed in a production environment, upstream process changes may lead to data drift, or other unexpected behavior. For example, a sensor being replaced that changes the units of measurement from inches to centimeters, data quality issues such as a broken sensor always reading 0, and covariate shift which occurs when there is a change in the distribution of input variables from the training set. These sorts of behavior and issues may be determined from the received device data 2935 in order to identify potential causes of system error that is not related to data drift and therefore does not require an updated codebook. This can save network resources from being unnecessarily used on training new algorithms as well as alert system users to malfunctions and unexpected behavior devices connected to their networks. Network device manager 2960 may also utilize device data 2935 to determine available network resources and device downtime or periods of time when device usage is at its lowest. Codebook update engine 2950 may request network and device availability data from network device manager 2960 in order to determine the most optimal time to transmit updated codebooks (i.e., trained libraries) to encoder and decoder devices and machines.

Figure 30:
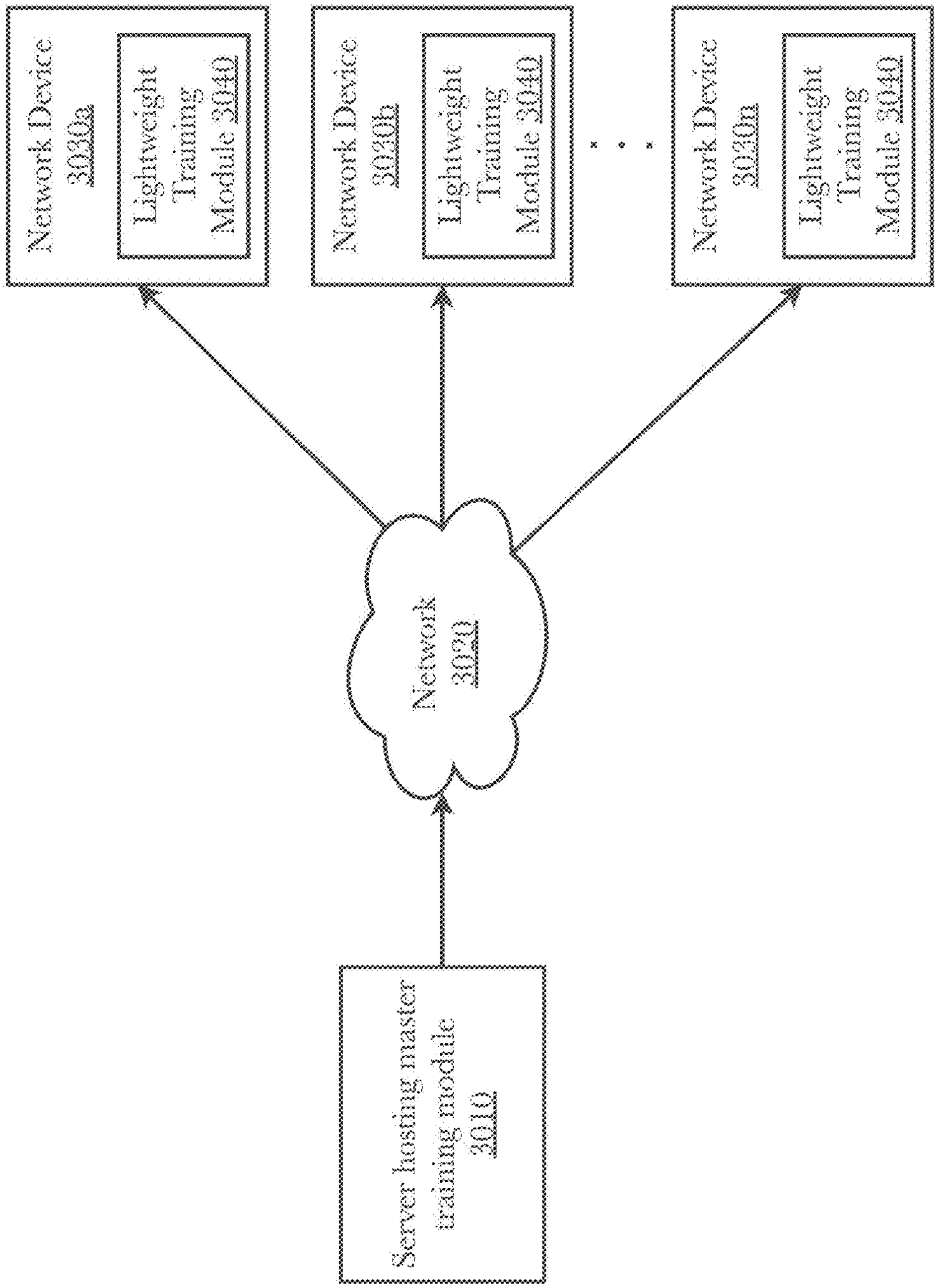
FIG. 30 is a block diagram of another embodiment of the codebook training system using a distributed architecture and a modified training module.

FIG. 30 is a block diagram of another embodiment of the codebook training system using a distributed architecture and a modified training module. According to an embodiment, there may be a server which maintains a master supervisory process over remote training devices hosting a master training module 3010 which communicates via a network 3020 to a plurality of connected network devices 3030*a-n*. The server may be located at the remote training end such as, but not limited to, cloud-based resources, a user-owned data center, etc. The master training module located on the server operates similarly to the codebook training module disclosed in FIG. 29 above, however, the server 3010 utilizes the master training module via the network device manager 2960 to farm out training resources to network devices 3030*a-n*. The server 3010 may allocate resources in a variety of ways, for example, round-robin, priority-based, or other manner, depending on the user needs, costs, and number of devices running the encoding/decoding system. Server 3010 may identify elastic resources which can be employed if available to scale up training when the load becomes too burdensome. On the network devices 3030*a-n* may be present a lightweight version of the training module 3040 that trades a little suboptimality in the codebook for training on limited machinery and/or makes training happen in low-priority threads to take advantage of idle time. In this way the training of new encoding/decoding algorithms may take place in a distributed manner which allows data gathering or generating devices to process and train on data gathered locally, which may improve system latency and optimize available network resources.

Figure 32:
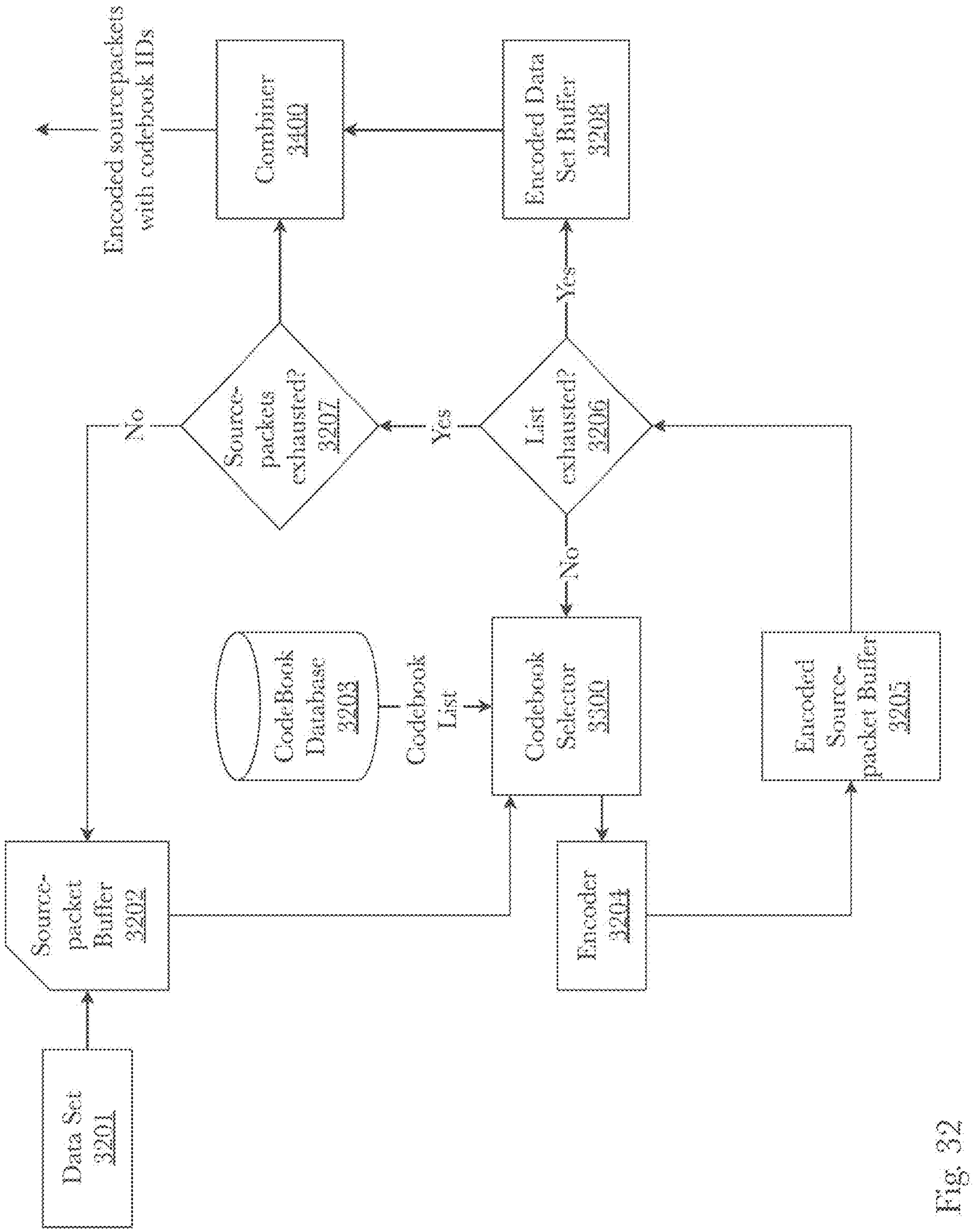
FIG. 32 is an exemplary system architecture for an encoding system with multiple codebooks.

FIG. 32 is an exemplary system architecture for an encoding system with multiple codebooks. A data set to be encoded 3201 is sent to a sourcepacket buffer 3202. The sourcepacket buffer is an array which stores the data which is to be encoded and may contain a plurality of sourcepackets. Each sourcepacket is routed to a codebook selector 3300, which retrieves a list of codebooks from a codebook database 3203. The sourcepacket is encoded using the first codebook on the list via an encoder 3204, and the output is stored in an encoded sourcepacket buffer 3205. The process is repeated with the same sourcepacket using each subsequent codebook on the list until the list of codebooks is exhausted 3206, at which point the most compact encoded version of the sourcepacket is selected from the encoded sourcepacket buffer 3205 and sent to an encoded data set buffer 3208 along with the ID of the codebook used to produce it. The sourcepacket buffer 3202 is determined to be exhausted 3207, a notification is sent to a combiner 3400, which retrieves all of the encoded sourcepackets and codebook IDs from the encoded data set buffer 3208 and combines them into a single file for output.

According to an embodiment, the list of codebooks used in encoding the data set may be consolidated to a single codebook which is provided to the combiner 3400 for output along with the encoded sourcepackets and codebook IDs. In this case, the single codebook will contain the data from, and codebook IDs of, each of the codebooks used to encode the data set. This may provide a reduction in data transfer time, although it is not required since each sourcepacket (or sourceblock) will contain a reference to a specific codebook ID which references a codebook that can be pulled from a database or be sent alongside the encoded data to a receiving device for the decoding process.

In some embodiments, each sourcepacket of a data set 3201 arriving at the encoder 3204 is encoded using a different sourceblock length. Changing the sourceblock length changes the encoding output of a given codebook. Two sourcepackets encoded with the same codebook but using different sourceblock lengths would produce different encoded outputs. Therefore, changing the sourceblock length of some or all sourcepackets in a data set 3201 provides additional security. Even if the codebook was known, the sourceblock length would have to be known or derived for each sourceblock in order to decode the data set 3201. Changing the sourceblock length may be used in conjunction with the use of multiple codebooks.

Figure 33:
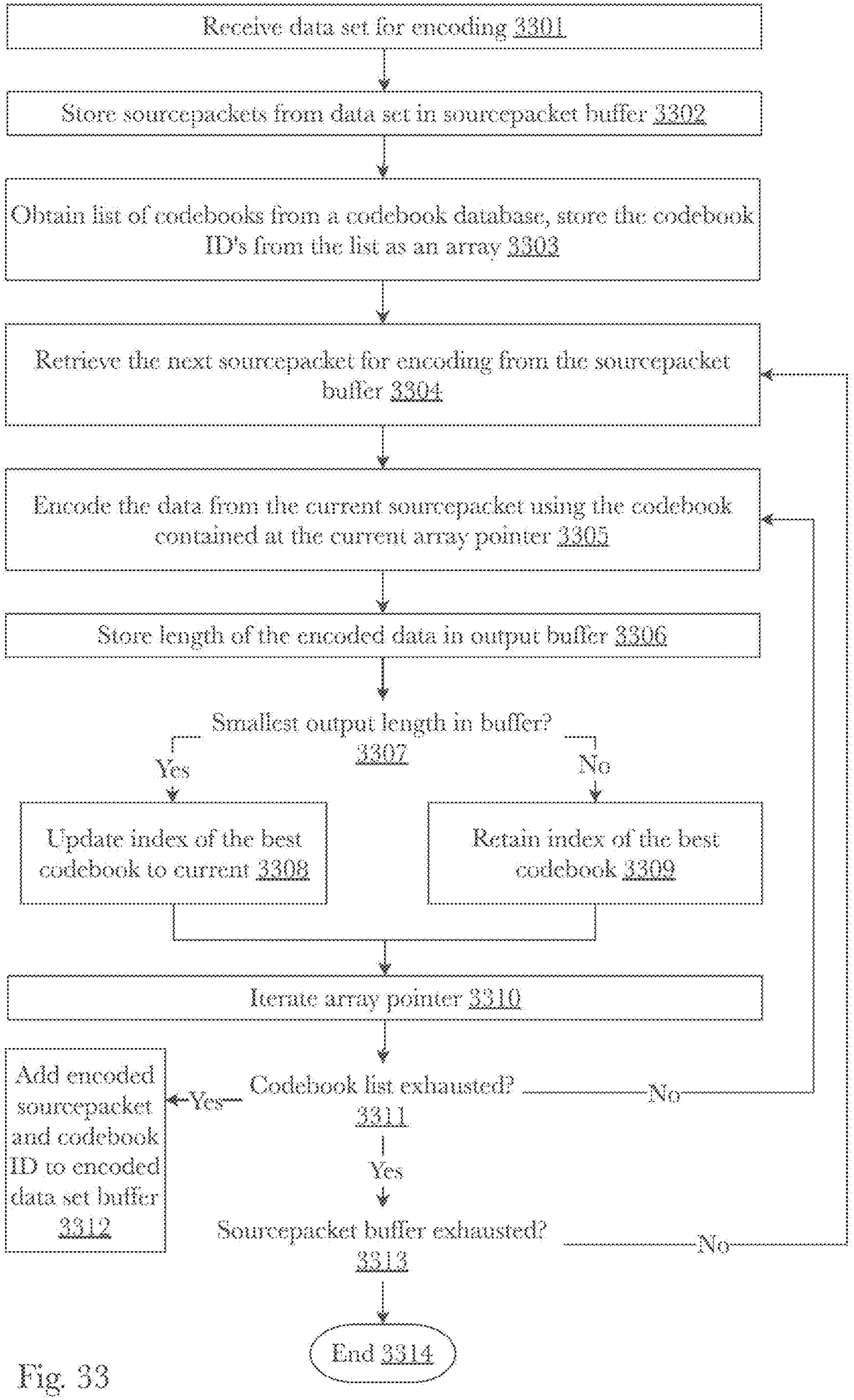
FIG. 33 is a flow diagram describing an exemplary algorithm for encoding of data using multiple codebooks.

FIG. 33 is a flow diagram describing an exemplary algorithm for encoding of data using multiple codebooks. A data set is received for encoding 3301, the data set comprising a plurality of sourcepackets. The sourcepackets are stored in a sourcepacket buffer 3302. A list of codebooks to be used for multiple codebook encoding is retrieved from a codebook database (which may contain more codebooks than are contained in the list) and the codebook IDs for each codebook on the list are stored as an array 3303. The next sourcepacket in the sourcepacket buffer is retrieved from the sourcepacket buffer for encoding 3304. The sourcepacket is encoded using the codebook in the array indicated by a current array pointer 3305. The encoded sourcepacket and length of the encoded sourcepacket is stored in an encoded sourcepacket buffer 3306. If the length of the most recently stored sourcepacket is the shortest in the buffer 3607, an index in the buffer is updated to indicate that the codebook indicated by the current array pointer is the most efficient codebook in the buffer for that sourcepacket. If the length of the most recently stored sourcepacket is not the shortest in the buffer 3607, the index in the buffer is not updated because a previous codebook used to encode that sourcepacket was more efficient 3309. The current array pointer is iterated to select the next codebook in the list 3310. If the list of codebooks has not been exhausted 3311, the process is repeated for the next codebook in the list, starting at step 3305. If the list of codebooks has been exhausted 3311, the encoded sourcepacket in the encoded sourcepacket buffer (the most compact version) and the codebook ID for the codebook that encoded it are added to an encoded data set buffer 3312 for later combination with other encoded sourcepackets from the same data set. At that point, the sourcepacket buffer is checked to see if any sourcepackets remain to be encoded 3313. If the sourcepacket buffer is not exhausted, the next sourcepacket is retrieved 3304 and the process is repeated starting at step 3304. If the sourcepacket buffer is exhausted 3313, the encoding process ends 3314. In some embodiments, rather than storing the encoded sourcepacket itself in the encoded sourcepacket buffer, a universal unique identification (UUID) is assigned to each encoded sourcepacket, and the UUID is stored in the encoded sourcepacket buffer instead of the entire encoded sourcepacket.

FIG. 34 is a diagram showing an exemplary control byte used to combine sourcepackets encoded with multiple codebooks. In this embodiment, a control byte 3401 (i.e., a series of 8 bits) is inserted at the before (or after, depending on the configuration) the encoded sourcepacket with which it is associated, and provides information about the codebook that was used to encode the sourcepacket. In this way, sourcepackets of a data set encoded using multiple codebooks can be combined into a data structure comprising the encoded sourcepackets, each with a control byte that tells the system how the sourcepacket can be decoded. The data structure may be of numerous forms, but in an embodiment, the data structure comprises a continuous series of control bytes followed by the sourcepacket associated with the control byte. In some embodiments, the data structure will comprise a continuous series of control bytes followed by the UUID of the sourcepacket associated with the control byte (and not the encoded sourcepacket, itself). In some embodiments, the data structure may further comprise a UUID inserted to identify the codebook used to encode the sourcepacket, rather than identifying the codebook in the control byte. Note that, while a very short control code (one byte) is used in this example, the control code may be of any length, and may be considerably longer than one byte in cases where the sourceblocks size is large or in cases where a large number of codebooks have been used to encode the sourcepacket or data set.

In this embodiment, for each bit location 3402 of the control byte 3401, a data bit or combinations of data bits 3403 provide information necessary for decoding of the sourcepacket associated with the control byte. Reading in reverse order of bit locations, the first bit N (location 7) indicates whether the entire control byte is used or not. If a single codebook is used to encode all sourcepackets in the data set, N is set to 0, and bits 3 to 0 of the control byte 3401 are ignored. However, where multiple codebooks are used, N is set to 1 and all 8 bits of the control byte 3401 are used. The next three bits RRR (locations 6 to 4) are a residual count of the number of bits that were not used in the last byte of the sourcepacket. Unused bits in the last byte of a sourcepacket can occur depending on the sourceblock size used to encode the sourcepacket. The next bit I (location 3) is used to identify the codebook used to encode the sourcepacket. If bit I is 0, the next three bits CCC (locations 2 to 0) provide the codebook ID used to encode the sourcepacket. The codebook ID may take the form of a codebook cache index, where the codebooks are stored in an enumerated cache. If bit I is 1, then the codebook is identified using a four-byte UUID that follows the control byte.

Figure 35:
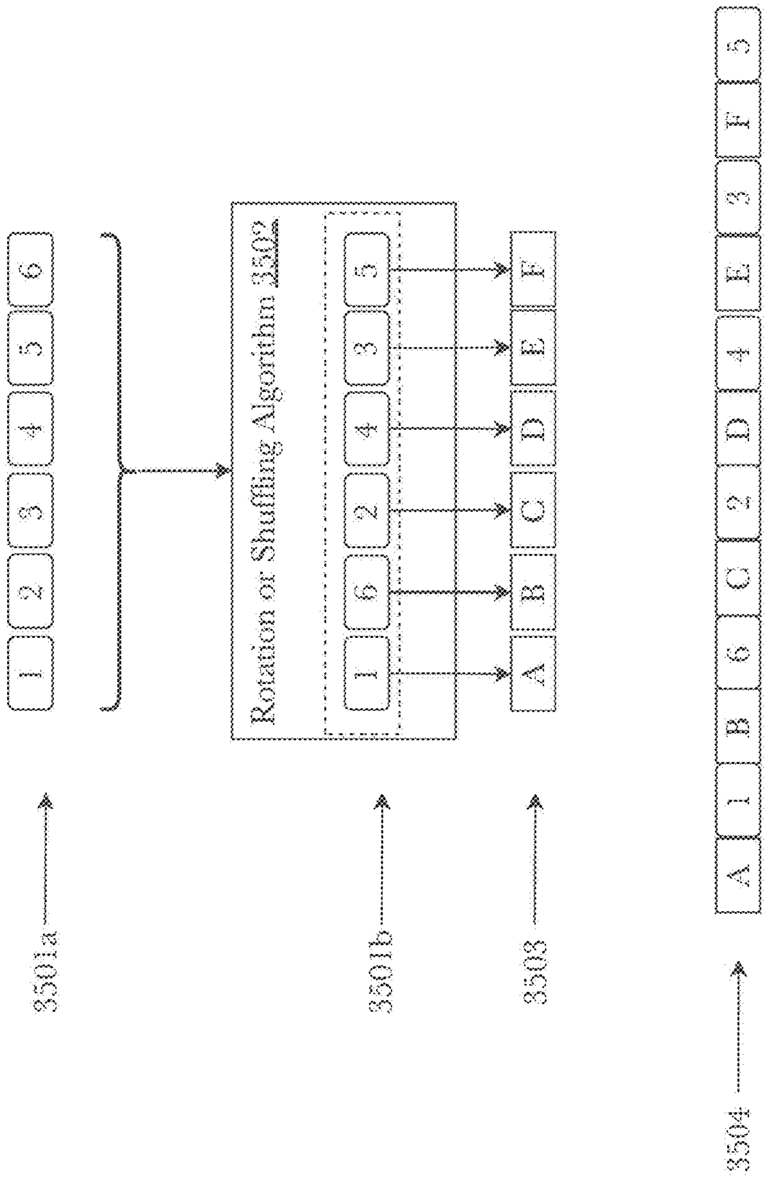
FIG. 35 is a diagram showing an exemplary codebook shuffling method.

FIG. 35 is a diagram showing an exemplary codebook shuffling method. In this embodiment, rather than selecting codebooks for encoding based on their compaction efficiency, codebooks are selected either based on a rotating list or based on a shuffling algorithm. The methodology of this embodiment provides additional security to compacted data, as the data cannot be decoded without knowing the precise sequence of codebooks used to encode any given sourcepacket or data set.

Here, a list of six codebooks is selected for shuffling, each identified by a number from 1 to 6 3501*a*. The list of codebooks is sent to a rotation or shuffling algorithm 3502, and reorganized according to the algorithm 3501*b*. The first six of a series of sourcepackets, each identified by a letter from A to E, 3503 is each encoded by one of the algorithms, in this case A is encoded by codebook 1, B is encoded by codebook 6, C is encoded by codebook 2, D is encoded by codebook 4, E is encoded by codebook 13 A is encoded by codebook 5. The encoded sourcepackets 3503 and their associated codebook identifiers 3501*b* are combined into a data structure 3504 in which each encoded sourcepacket is followed by the identifier of the codebook used to encode that particular sourcepacket.

According to an embodiment, the codebook rotation or shuffling algorithm 3502 may produce a random or pseudo-random selection of codebooks based on a function. Some non-limiting functions that may be used for shuffling include:

1. given a function f(n) which returns a codebook according to an input parameter n in the range 1 to N are, and given t the number of the current sourcepacket or sourceblock: f(t*M modulo p), where M is an arbitrary multiplying factor (1<=M<=p−1) which acts as a key, and p is a large prime number less than or equal to N;
2. f(A^t modulo p), where A is a base relatively prime to p−1 which acts as a key, and p is a large prime number less than or equal to N;
3. f(floor (t*x) modulo N), and x is an irrational number chosen randomly to act as a key;
4. f(t XOR K) where the XOR is performed bit-wise on the binary representations of t and a key K with same number of bits in its representation of N. The function f(n) may return the nth codebook simply by referencing the nth element in a list of codebooks, or it could return the nth codebook given by a formula chosen by a user.

In one embodiment, prior to transmission, the endpoints (users or devices) of a transmission agree in advance about the rotation list or shuffling function to be used, along with any necessary input parameters such as a list order, function code, cryptographic key, or other indicator, depending on the requirements of the type of list or function being used. Once the rotation list or shuffling function is agreed, the endpoints can encode and decode transmissions from one another using the encodings set forth in the current codebook in the rotation or shuffle plus any necessary input parameters.

In some embodiments, the shuffling function may be restricted to permutations within a set of codewords of a given length.

Note that the rotation or shuffling algorithm is not limited to cycling through codebooks in a defined order. In some embodiments, the order may change in each round of encoding. In some embodiments, there may be no restrictions on repetition of the use of codebooks.

In some embodiments, codebooks may be chosen based on some combination of compaction performance and rotation or shuffling. For example, codebook shuffling may be repeatedly applied to each sourcepacket until a codebook is found that meets a minimum level of compaction for that sourcepacket. Thus, codebooks are chosen randomly or pseudo-randomly for each sourcepacket, but only those that produce encodings of the sourcepacket better than a threshold will be used.

Figure 36:
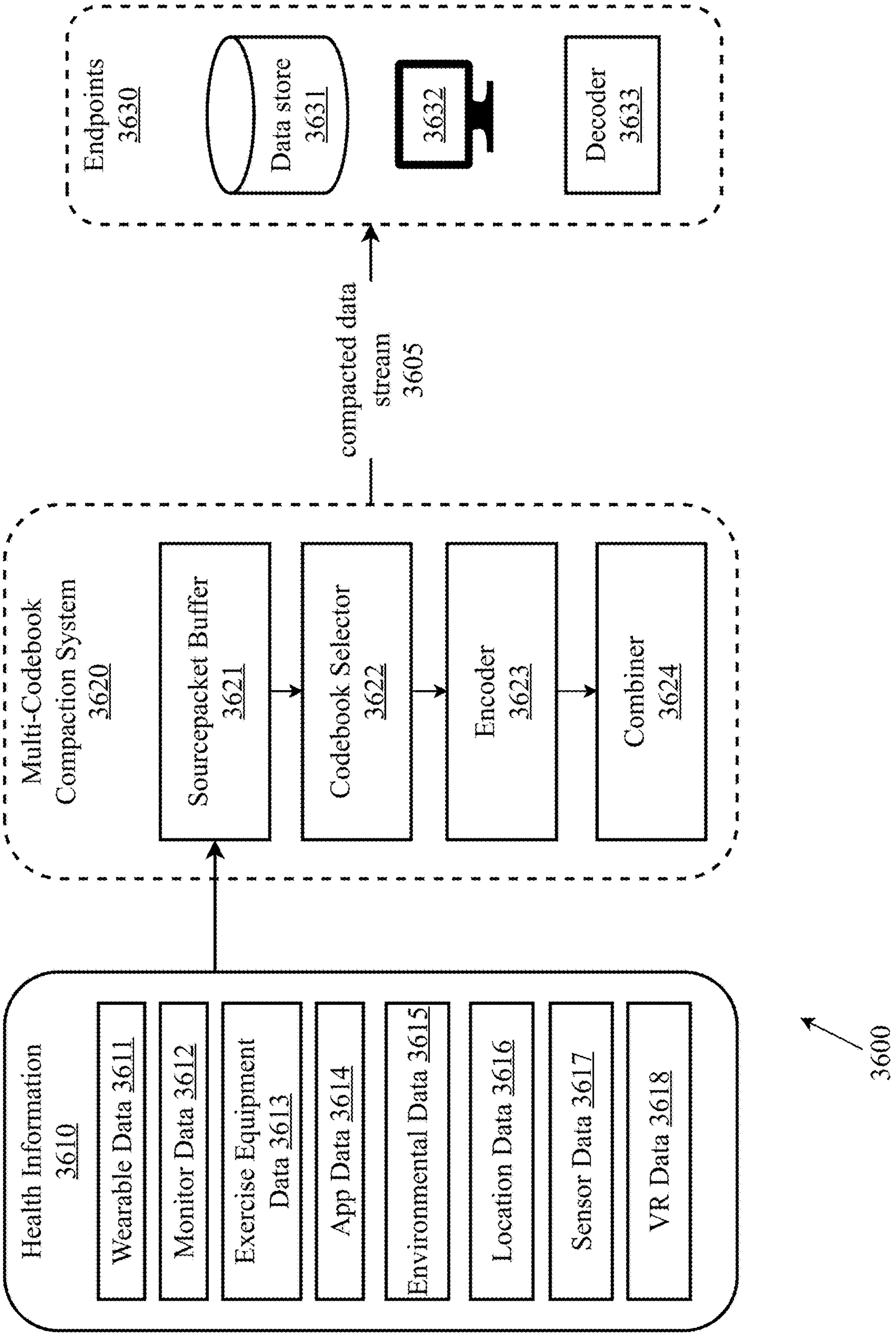
FIG. 36 is a block diagram illustrating an exemplary system architecture for personal health data compaction using multiple encoding algorithms, according to an embodiment.

FIG. 36 is a block diagram illustrating an exemplary system 3600 architecture for personal health data compaction using multiple encoding algorithms, according to an embodiment. According to the embodiment, the system is configured to obtain a plurality of user health information from various sources, perform data compaction on the obtained data using multiple encoding algorithms, and send the compacted health information to one or more relevant endpoints. According to the embodiment, system 3600 comprises a multi-codebook compaction system 3620 configured to receive, retrieve, or otherwise obtain a plurality of health information 3610 from various data sources. Multi-codebook compaction system 3620 may be a specifically configured implementation of the encoding system and methods described herein with reference to FIGS. 32-34. The system 3600 can provide system users with secure storage and transmission of biometric and personal health information such as that provided by personal health monitoring systems and devices.

According to an implementation, the system may use multiple-encoding algorithms to compact health information 3610. In an embodiment, there is a list of codebooks, each with its own codebook identifier, that can be used to encode a plurality of sourcepackets associated with health information 3610. For each sourcepacket to be encoded, an association is made to one stored encoded sourcepacket form one codebook with its own identifier. Each data pair (of codebook identifier and sourceblock identifier) for each respective sourcepacket may then be combined into a single codebook. The single codebook may comprise the plurality of data pairs, wherein each such pair represents in effect a compound pointer to an actual encoded sourcepacket that can be decoded later by going to the respective codebook based on its codebook identifier and then looking up the respective sourceblock using its sourceblock identifier (e.g., codeword).

According to some implementations, multi-codebook compaction system comprises a sourcepacket buffer 3621 which stores the obtained health information 3610 prior to encoding. The obtained health information 3610 may be formatted into sourcepackets and a plurality of sourcepackets may be stored in sourcepacket buffer 3621. Each sourcepacket is routed to a codebook selector 3622 which may be configured to retrieve a list of codebooks from a database comprising a plurality of codebooks. In an implementation, the sourcepacket containing health information 3610 is encoded via encoder 3623 using the first codebook of the retrieved list of codebooks. The encoded sourcepacket may be stored in a buffer or cache temporarily until the entire codebook shuffling process has completed. This process may be repeated with the same sourcepacket for each codebook of the list of codebooks until the list of codebooks has been exhausted, at which point the most compact encoded version of the sourcepackets is selected from the encoded sourcepacket buffer or cache. The selected encoded sourcepacket may be logically linked to the codebook used to encode it via the use of codebook ID.

In some implementations, codebook selector 3622 may be configured to implement one or more shuffling algorithms to determine which codebook to select to encode a given sourceblock. Once a codebook is selected via a shuffling algorithm, the sourceblock may be encoded and then the codebook identified of the selected codebook is combined with the encoded sourceblock to form a data pair.

According to an embodiment, a combiner 3624 is present and configured to receive a data pair comprises a codebook identifier and a sourceblock identifier (e.g., codeword) and aggregates them into a data structure. The data structure may have pairs associated with a variety of different codebooks, as some codebooks may yield better compaction on some sourcepackets when compared to other codebooks. Multi-codebook compaction system 3620 can then output a compacted data stream 3605 comprising the single, combined codebook comprising a plurality of data pairs (codebook ID and sourceblock ID) to an appropriate endpoint 3630 via a suitable communication network such as, for example, the Internet. Exemplary endpoints can include, but are not limited to, a data store 3631, a physician's terminal 3632, and a decoder module 3633.

Data store 3631 may represent an suitable data storage device such as a non-volatile data storage device. For example, data store 3631 may comprise one or more electronic health records for one or more individuals, and an individual's encoded health/biometric data may be stored in the electronic health record associated with said individual. Physician's terminal 3632 may be any suitable computing device at a physician's workstation wherein the physician can receive encoded health data associated with a patient. For example, the physician may be performing a telehealth call with the patient who is actively wearing a monitor which is measuring the blood pressure of the patient and transmitting the data to the physician over the Internet. The blood pressure measurement data can be obtained by multi-codebook compaction system and encoded accordingly, and then sent to the physician's terminal 3632 for review by the physician. At the physician's terminal is a decoder 3633 which is another exemplary endpoint 3630 which may receive a compacted data stream comprising encoded health information. Decoder 3633 can receive the encoded health information and use the single, combined codebook to decode the health information.

An exemplary list of health information 3610 is shown including, but not limited to, wearable data 3611, monitor data 3612, exercise equipment 3613, application (App) data 3614, environmental data 3615, location data 3616, sensor data 3617, and virtual reality (VR) device data 3618. Wearable data 3611 may be associated with data generated, measured, inferred, computed, or otherwise obtained by a wearable device such as, for example, wearable fitness trackers which can monitor physical activity, heart rate, sleep patterns, and sometimes oxygen levels. In addition to tracking physical activity, smartwatches can monitor heart rate, ECG, and some even have built in GPS and fall detection features. Wearable devices can also refer to headword devices or devices placed upon the hand or fingers such as devices commonly used to measure blood pressure. Monitor data 3612 may be related to information that is generated by a monitoring device implemented on or for the user. For example, blood pressure monitors, glucose monitors, pulse oximeters, sleep trackers, smart thermometers, EKG monitors, and spirometers may be devices or processes which can provide monitor data 3612.

Exercise equipment data 3613 may be information associated with a user and generated while the user is operating a piece of exercise equipment. Various types of exercise equipment are able to monitor a user's physical activity and may collect data 3613 such as total calories burned, peak heart rate, average heart rate, total distance, total time, and/or the like. This information can be sent to multi-codebook compaction system 3620 for encoding. As an example, a user may be performing physical therapy in the presence of a physician while riding a stationary bike and hooked-up to multiple monitors, and system 3600 can receive information from the stationary bike and the monitors simultaneously. Another example of exercise equipment are smart scales which can not only measure weight but also calculate body mass index (BMI), body fat percentage, and other metrics. They often sync data with health and fitness apps and can send data to system 3600 as well.

App data 3614 may be received from various application which may be operating on a user's mobile device such as a smart phone or from an application operating on a computer such as a webapp. App data 3614 can include data obtained from mobile health apps. While not physical devices, health and fitness apps are essential for monitoring and analyzing personal health. These apps can help users track nutrition, exercise, medication, and even connect with healthcare professionals, and can be a source of personal health information 3610.

Environmental data 3615 may comprise data obtained from one or more environmental sensors. These sensors can monitor indoor air quality, which can affect health. They can detect factors like temperature, humidity, air pollution, and allergens. Similarly, location data 3616 can also be received and processed by system 3620. Sensor data 3617 may be obtained from a plurality of sensors which may be used to capture one or more biometric or physical properties of an individual. For example, user biometric data related to a fingerprint, a voiceprint, an eye scan, a gait analysis, and/or the like may be received and processed by system 3620. In an embodiment, VR data 3618 can be processed by system 3620 as well. Smart wearables have evolved to include augmented reality glasses, aiding productivity, and helping in physical and neurological therapies. Patient health data generated during a user's session in a VR environment for a therapy treatment can be obtained by system 3620 and encoded before being sent to an appropriate endpoint 3630.

In some embodiments, multi-codebook compaction system 3620 may be configured to operate on a computing device comprising at least a processor and a memory, wherein the memory stores a plurality of computer programming instruction which, when executing on the processor, causes the computing device to execute the functionality described herein. In an embodiment, multi-codebook compaction system 3620 and one or more of the endpoints 3630 may be arranged on the same computing device. In an embodiment, multi-codebook compaction system 3620 may be distributed among multiple computing devices such as in a data center, or on a server configured to operate as two or more separate computing devices. In an embodiment, multi-codebook compaction system 3620 and one or more of the health information sources (e.g., smart wearable, monitor, application, sensor, IoT device, etc.) are arranged on the same computing device. For example, multi-codebook compaction system 3620 may be stored and operational on a user's smart phone and may encode data obtained from fitness tracker apps stored on the smart phone. As another example, an EKG machine may be configured with a built-in multi-codebook compaction system 3620 which can perform data encoding on the data generated by the EKG machine.

Figure 37:
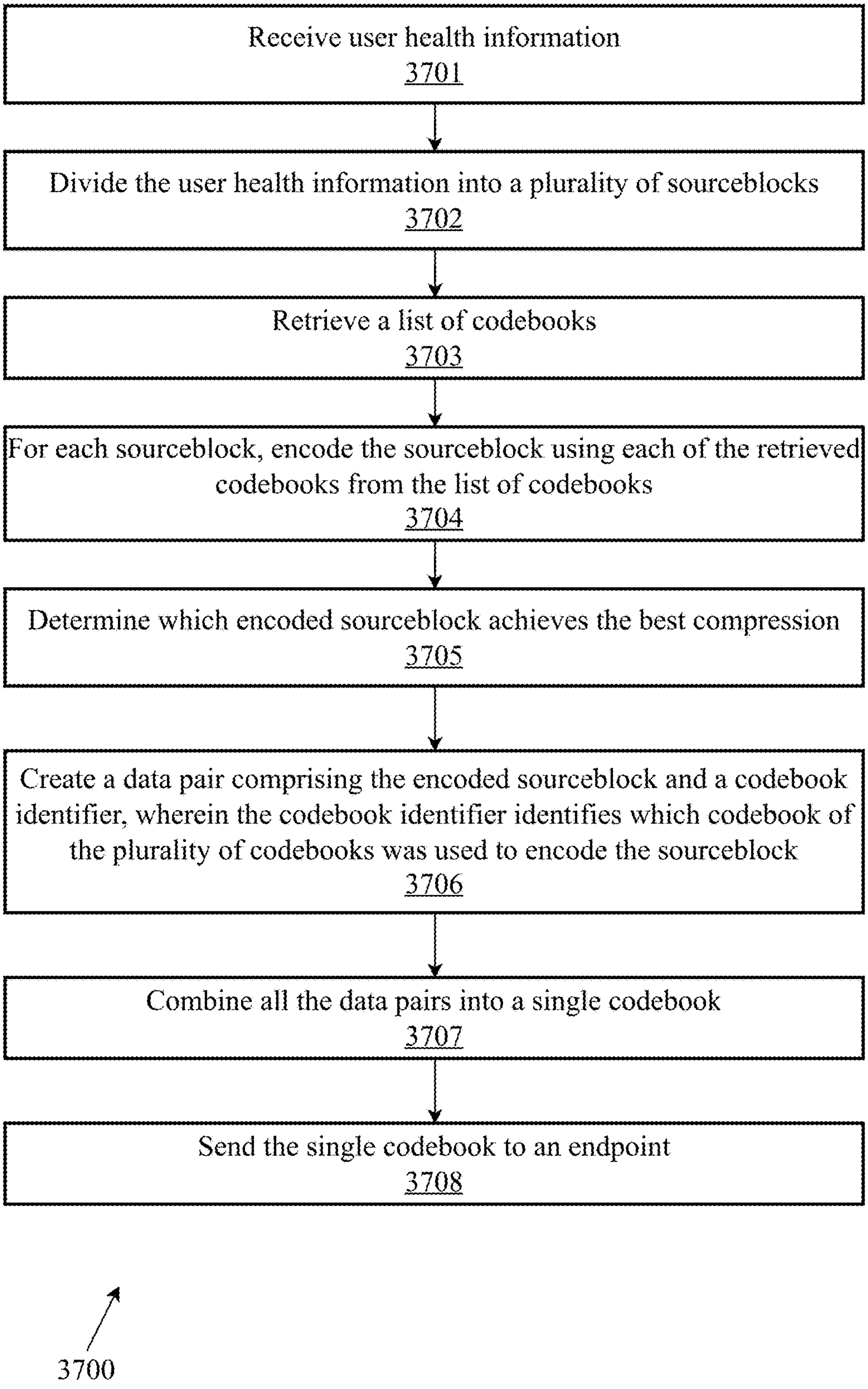
FIG. 37 is a flow diagram illustrating an exemplary method for encoding personal health information using multiple encoding algorithms, according to an embodiment.

FIG. 37 is a flow diagram illustrating an exemplary method 3700 for encoding personal health information using multiple encoding algorithms, according to an embodiment. According to the embodiment, the process begins at step 3701 when multi-codebook compaction system 3620 receives, retrieves, or otherwise obtains user health information. The user health information may be obtained from a personal health monitoring system or device such as, for example, a smartwatch or fitness tracker. In an embodiment, the personal health monitoring system may comprise one or more of the following components: sensors, monitors, transducers, IoT devices, wearable devices, computers, microphones, and cameras. In such a personal health monitoring system, each of the one or more components may be communicate with each other via a suitable network connection such as, for example, a mesh network, a Bluetooth network, a wired-network, and/or a near-field communication network. In such a personal health monitoring system, a central processing node may be present which can receive a plurality of health information associated with a user from the plurality of components and may be configured to transmit received health information to multi-codebook compaction system 3620. In other embodiments, multi-codebook compaction system 3620 may be integrated with the centralized processing component, or with a health monitoring component, or both.

As a next step 3702, the received user health information is divided into a plurality of sourceblocks, wherein each of the sourceblocks may be encoded. At step 3703, system 3600 can retrieve a list of codebooks from a codebook database, wherein each of the codebooks was generated using a different encoding algorithm. For each sourceblock, multi-codebook compaction system 3620 encodes the sourceblock using each of the retrieved codebooks from the list of codebooks at 3704. After each codebook has been used to encode a given sourceblock, system 3600 determines which encoded sourceblock achieved the best compression at step 3705. At step 3706, multi-codebook compaction system 3620 creates a data pair comprising the encoded sourceblock and a codebook identifier, wherein the codebook identifier identifies which codebook of the plurality of codebooks was used to encode the sourceblock. After all the sourceblocks have been processed and assigned as a data pair, then combiner 3624 can combine all the data pairs into a single codebook at step 3707. This single codebook may comprise codebook identifiers from multiple different codebooks. The single codebook may be sent to an appropriate endpoint as a last step 3708. Exemplary endpoints can include data storage devices, physician workstations, and decoder systems. At an endpoint, the single codebook may be used to decode the encoded personal health information. The result is a compacted data structure which protects user biometrics and health data generated from a personal health monitoring system or device from being hacked or exposed to a malicious entity.

Figure 38:
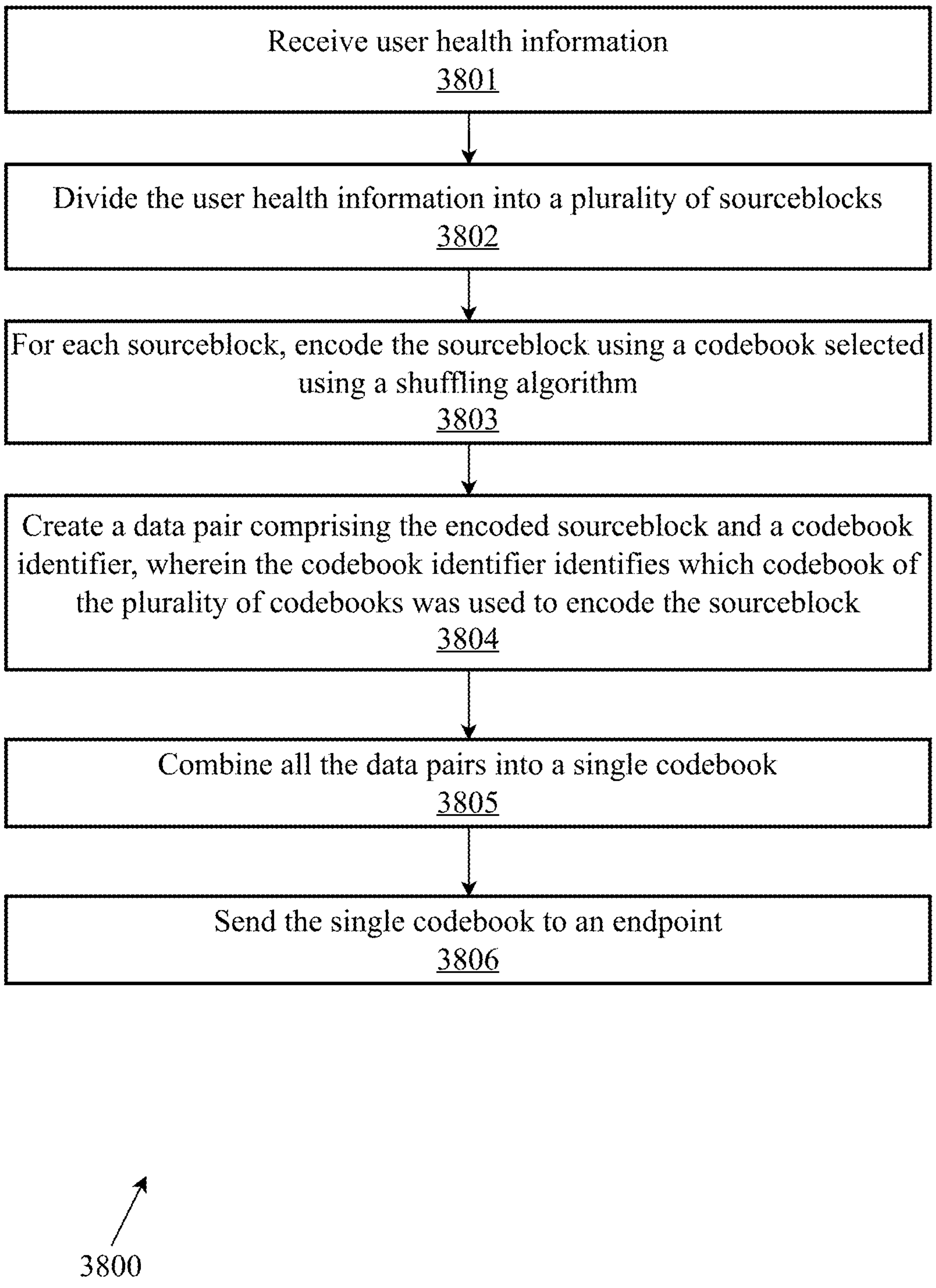
FIG. 38 is a flow diagram illustrating an exemplary method for encoding personal health information using a codebook shuffling algorithm, according to an embodiment.

FIG. 38 is a flow diagram illustrating an exemplary method 3800 for encoding personal health information using a codebook shuffling algorithm, according to an embodiment. According to the embodiment, the process begins at step 3801 when multi-codebook compaction system 3620 receives, retrieves, or otherwise obtains user health information. The user health information may be obtained from a personal health monitoring system or device such as, for example, continuous glucose monitors, cardiac monitoring devices, smart insulin pens, asthma monitors, and wearable electroencephalogram monitors, to name a few. In an embodiment, the personal health monitoring system may comprise one or more of the following components: sensors, monitors, transducers, IoT devices, wearable devices, computers, microphones, and cameras. In such a personal health monitoring system, each of the one or more components may be communicate with each other via a suitable network connection such as, for example, a mesh network, a Bluetooth network, a wired-network, and/or a near-field communication network. In such a personal health monitoring system, a central processing node may be present which can receive a plurality of health information associated with a user from the plurality of components and may be configured to transmit received health information to multi-codebook compaction system 3620. In other embodiments, multi-codebook compaction system 3620 may be integrated with the centralized processing component, or with a health monitoring component, or both.

As a next step 3802, the received user health information is divided into a plurality of sourceblocks, wherein each of the sourceblocks may be encoded. At step 3803, for each sourceblock, multi-codebook compaction system 3620 uses a shuffling algorithm to select a codebook and then encodes the sourceblock using the selected codebook. At step 3804, multi-codebook compaction system 3620 creates a data pair comprising the encoded sourceblock and a codebook identifier, wherein the codebook identifier identifies which codebook was selected by the shuffling algorithm to encode the sourceblock. After all the sourceblocks have been processed and assigned as a data pair, then combiner 3624 can combine all the data pairs into a single codebook at step 3805. This single codebook may comprise codebook identifiers from multiple different codebooks. The single codebook may be sent to an appropriate endpoint as a last step 3806. Exemplary endpoints can include data storage devices, physician workstations, and decoder systems. At an endpoint, the single codebook may be used to decode the encoded personal health information. The result is a compacted data structure which protects user biometrics and health data generated from a personal health monitoring system or device from being hacked or exposed to a malicious entity.

Description of Method Aspects

Since the library consists of re-usable building sourceblocks, and the actual data is represented by reference codes to the library, the total storage space of a single set of data would be much smaller than conventional methods, wherein the data is stored in its entirety. The more data sets that are stored, the larger the library becomes, and the more data can be stored in reference code form.

As an analogy, imagine each data set as a collection of printed books that are only occasionally accessed. The amount of physical shelf space required to store many collections would be quite large, and is analogous to conventional methods of storing every single bit of data in every data set. Consider, however, storing all common elements within and across books in a single library, and storing the books as references codes to those common elements in that library. As a single book is added to the library, it will contain many repetitions of words and phrases. Instead of storing the whole words and phrases, they are added to a library, and given a reference code, and stored as reference codes. At this scale, some space savings may be achieved, but the reference codes will be on the order of the same size as the words themselves. As more books are added to the library, larger phrases, quotations, and other words patterns will become common among the books. The larger the word patterns, the smaller the reference codes will be in relation to them as not all possible word patterns will be used. As entire collections of books are added to the library, sentences, paragraphs, pages, or even whole books will become repetitive. There may be many duplicates of books within a collection and across multiple collections, many references and quotations from one book to another, and much common phraseology within books on particular subjects. If each unique page of a book is stored only once in a common library and given a reference code, then a book of 1,000 pages or more could be stored on a few printed pages as a string of codes referencing the proper full-sized pages in the common library. The physical space taken up by the books would be dramatically reduced. The more collections that are added, the greater the likelihood that phrases, paragraphs, pages, or entire books will already be in the library, and the more information in each collection of books can be stored in reference form. Accessing entire collections of books is then limited not by physical shelf space, but by the ability to reprint and recycle the books as needed for use.

The projected increase in storage capacity using the method herein described is primarily dependent on two factors: 1) the ratio of the number of bits in a block to the number of bits in the reference code, and 2) the amount of repetition in data being stored by the system.

With respect to the first factor, the number of bits used in the reference codes to the sourceblocks must be smaller than the number of bits in the sourceblocks themselves in order for any additional data storage capacity to be obtained. As a simple example, 16-bit sourceblocks would require 216, or 65536, unique reference codes to represent all possible patterns of bits. If all possible 65536 blocks patterns are utilized, then the reference code itself would also need to contain sixteen bits in order to refer to all possible 65,536 blocks patterns. In such case, there would be no storage savings. However, if only 16 of those block patterns are utilized, the reference code can be reduced to 4 bits in size, representing an effective compression of 4 times (16 bits/4 bits=4) versus conventional storage. Using a typical block size of 512 bytes, or 4,096 bits, the number of possible block patterns is 24,096, which for all practical purposes is unlimited. A typical hard drive contains one terabyte (TB) of physical storage capacity, which represents 1,953,125,000, or roughly 231, 512 byte blocks. Assuming that 1 TB of unique 512-byte sourceblocks were contained in the library, and that the reference code would thus need to be 31 bits long, the effective compression ratio for stored data would be on the order of 132 times (4,096/31≈132) that of conventional storage.

With respect to the second factor, in most cases it could be assumed that there would be sufficient repetition within a data set such that, when the data set is broken down into sourceblocks, its size within the library would be smaller than the original data. However, it is conceivable that the initial copy of a data set could require somewhat more storage space than the data stored in a conventional manner, if all or nearly all sourceblocks in that set were unique. For example, assuming that the reference codes are 1/10th the size of a full-sized copy, the first copy stored as sourceblocks in the library would need to be 1.1 megabytes (MB), (1 MB for the complete set of full-sized sourceblocks in the library and 0.1 MB for the reference codes). However, since the sourceblocks stored in the library are universal, the more duplicate copies of something you save, the greater efficiency versus conventional storage methods. Conventionally, storing 10 copies of the same data requires 10 times the storage space of a single copy. For example, ten copies of a 1 MB file would take up 10 MB of storage space. However, using the method described herein, only a single full-sized copy is stored, and subsequent copies are stored as reference codes. Each additional copy takes up only a fraction of the space of the full-sized copy. For example, again assuming that the reference codes are 1/10th the size of the full-size copy, ten copies of a 1 MB file would take up only 2 MB of space (1 MB for the full-sized copy, and 0.1 MB each for ten sets of reference codes). The larger the library, the more likely that part or all of incoming data will duplicate sourceblocks already existing in the library.

The size of the library could be reduced in a manner similar to storage of data. Where sourceblocks differ from each other only by a certain number of bits, instead of storing a new sourceblock that is very similar to one already existing in the library, the new sourceblock could be represented as a reference code to the existing sourceblock, plus information about which bits in the new block differ from the existing block. For example, in the case where 512 byte sourceblocks are being used, if the system receives a new sourceblock that differs by only one bit from a sourceblock already existing in the library, instead of storing a new 512 byte sourceblock, the new sourceblock could be stored as a reference code to the existing sourceblock, plus a reference to the bit that differs. Storing the new sourceblock as a reference code plus changes would require only a few bytes of physical storage space versus the 512 bytes that a full sourceblock would require. The algorithm could be optimized to store new sourceblocks in this reference code plus changes form unless the changes portion is large enough that it is more efficient to store a new, full sourceblock.

It will be understood by one skilled in the art that transfer and synchronization of data would be increased to the same extent as for storage. By transferring or synchronizing reference codes instead of full-sized data, the bandwidth requirements for both types of operations are dramatically reduced.

In addition, the method described herein is inherently a form of encryption. When the data is converted from its full form to reference codes, none of the original data is contained in the reference codes. Without access to the library of sourceblocks, it would be impossible to reconstruct any portion of the data from the reference codes. This inherent property of the method described herein could obviate the need for traditional encryption algorithms, thereby offsetting most or all of the computational cost of conversion of data back and forth to reference codes. In theory, the method described herein should not utilize any additional computing power beyond traditional storage using encryption algorithms. Alternatively, the method described herein could be in addition to other encryption algorithms to increase data security even further.

In other embodiments, additional security features could be added, such as: creating a proprietary library of sourceblocks for proprietary networks, physical separation of the reference codes from the library of sourceblocks, storage of the library of sourceblocks on a removable device to enable easy physical separation of the library and reference codes from any network, and incorporation of proprietary sequences of how sourceblocks are read and the data reassembled.

Figure 7:
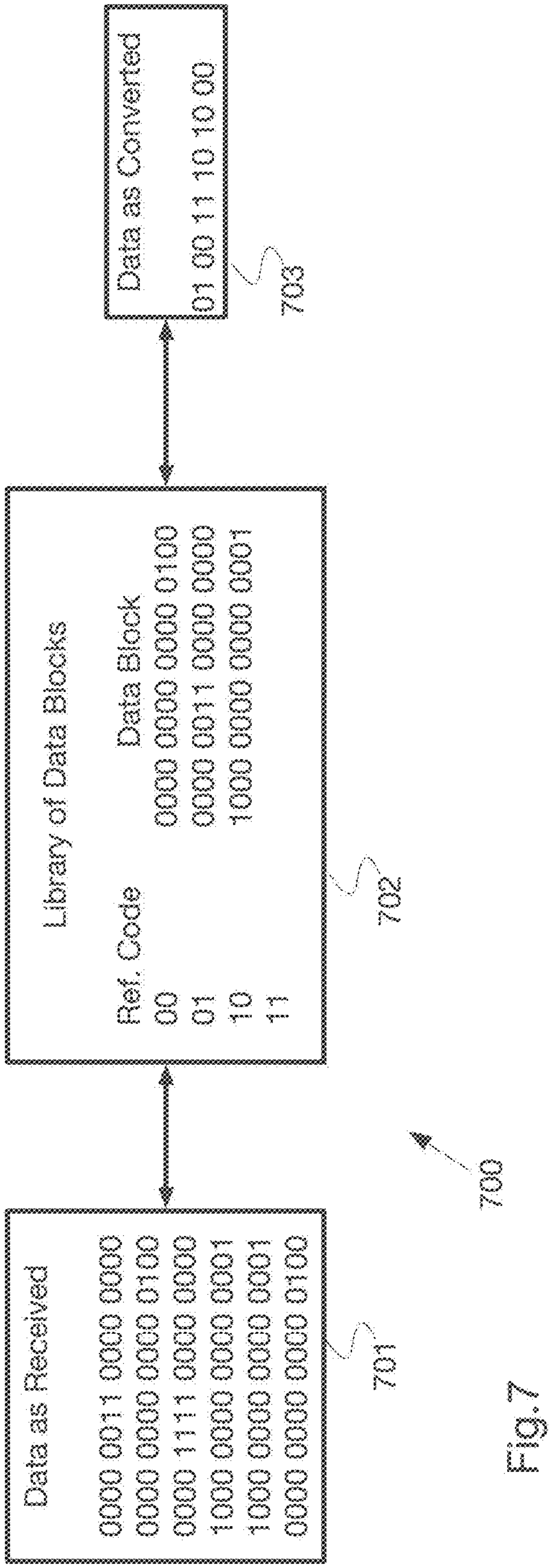
FIG. 7 is a diagram showing an example of how data might be converted into reference codes using an aspect of an embodiment.

FIG. 7 is a diagram showing an example of how data might be converted into reference codes using an aspect of an embodiment 700. As data is received 701, it is read by the processor in sourceblocks of a size dynamically determined by the previously disclosed sourceblock size optimizer 410. In this example, each sourceblock is 16 bits in length, and the library 702 initially contains three sourceblocks with reference codes 00, 01, and 10. The entry for reference code 11 is initially empty. As each 16 bit sourceblock is received, it is compared with the library. If that sourceblock is already contained in the library, it is assigned the corresponding reference code. So, for example, as the first line of data (0000 0011 0000 0000) is received, it is assigned the reference code (01) associated with that sourceblock in the library. If that sourceblock is not already contained in the library, as is the case with the third line of data (0000 1111 0000 0000) received in the example, that sourceblock is added to the library and assigned a reference code, in this case 11. The data is thus converted 703 to a series of reference codes to sourceblocks in the library. The data is stored as a collection of codewords, each of which contains the reference code to a sourceblock and information about the location of the sourceblocks in the data set. Reconstructing the data is performed by reversing the process. Each stored reference code in a data collection is compared with the reference codes in the library, the corresponding sourceblock is read from the library, and the data is reconstructed into its original form.

Figure 8:
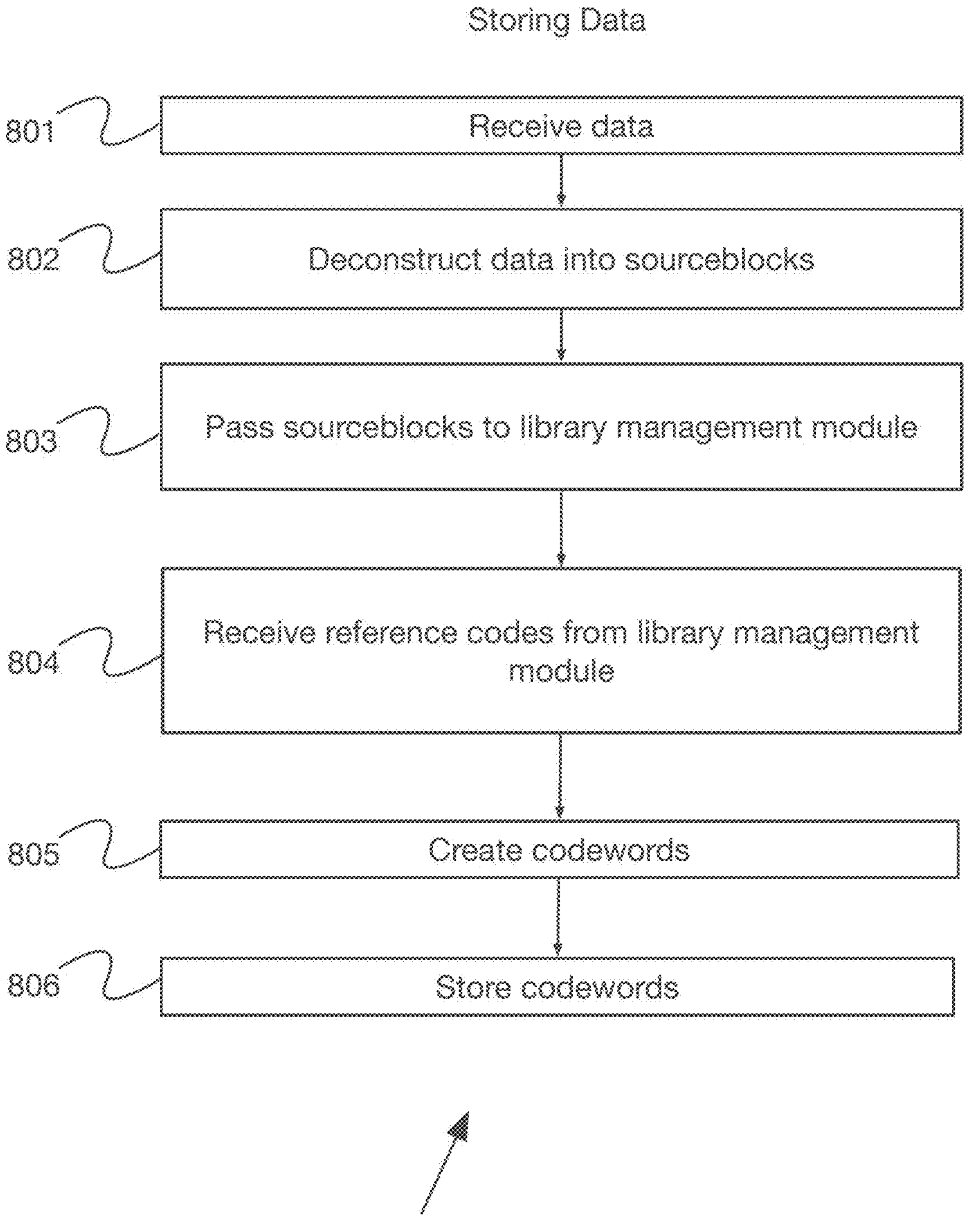
FIG. 8 is a method diagram showing the steps involved in using an embodiment to store data.

FIG. 8 is a method diagram showing the steps involved in using an embodiment 800 to store data. As data is received 801, it would be deconstructed into sourceblocks 802, and passed 803 to the library management module for processing. Reference codes are received back 804 from the library management module and may be combined with location information to create codewords 805, which are then be stored 806 as representations of the original data.

Figure 9:
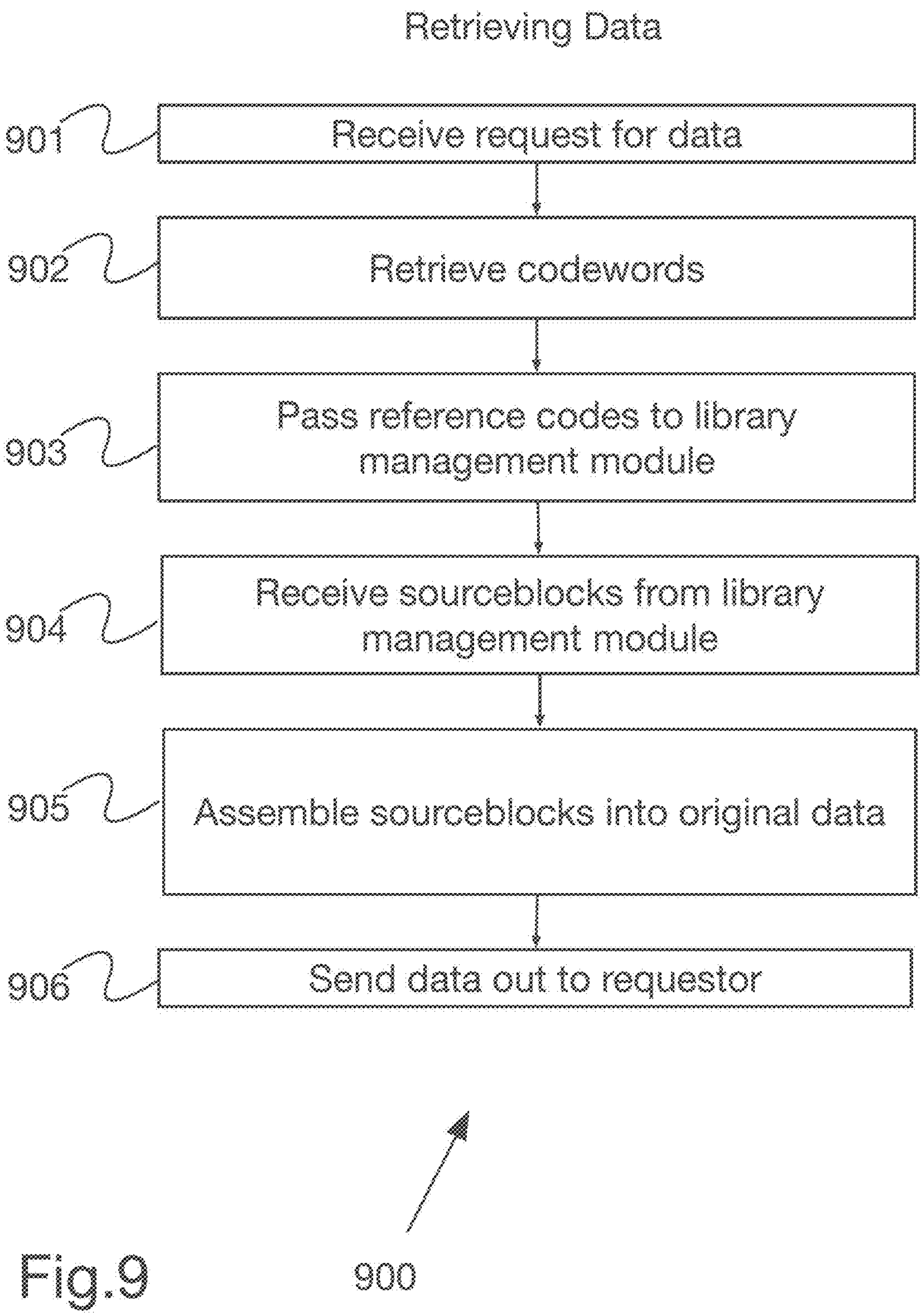
FIG. 9 is a method diagram showing the steps involved in using an embodiment to retrieve data.

FIG. 9 is a method diagram showing the steps involved in using an embodiment 900 to retrieve data. When a request for data is received 901, the associated codewords would be retrieved 902 from the library. The codewords would be passed 903 to the library management module, and the associated sourceblocks would be received back 904. Upon receipt, the sourceblocks would be assembled 905 into the original data using the location data contained in the codewords, and the reconstructed data would be sent out 906 to the requestor.

Figure 10:
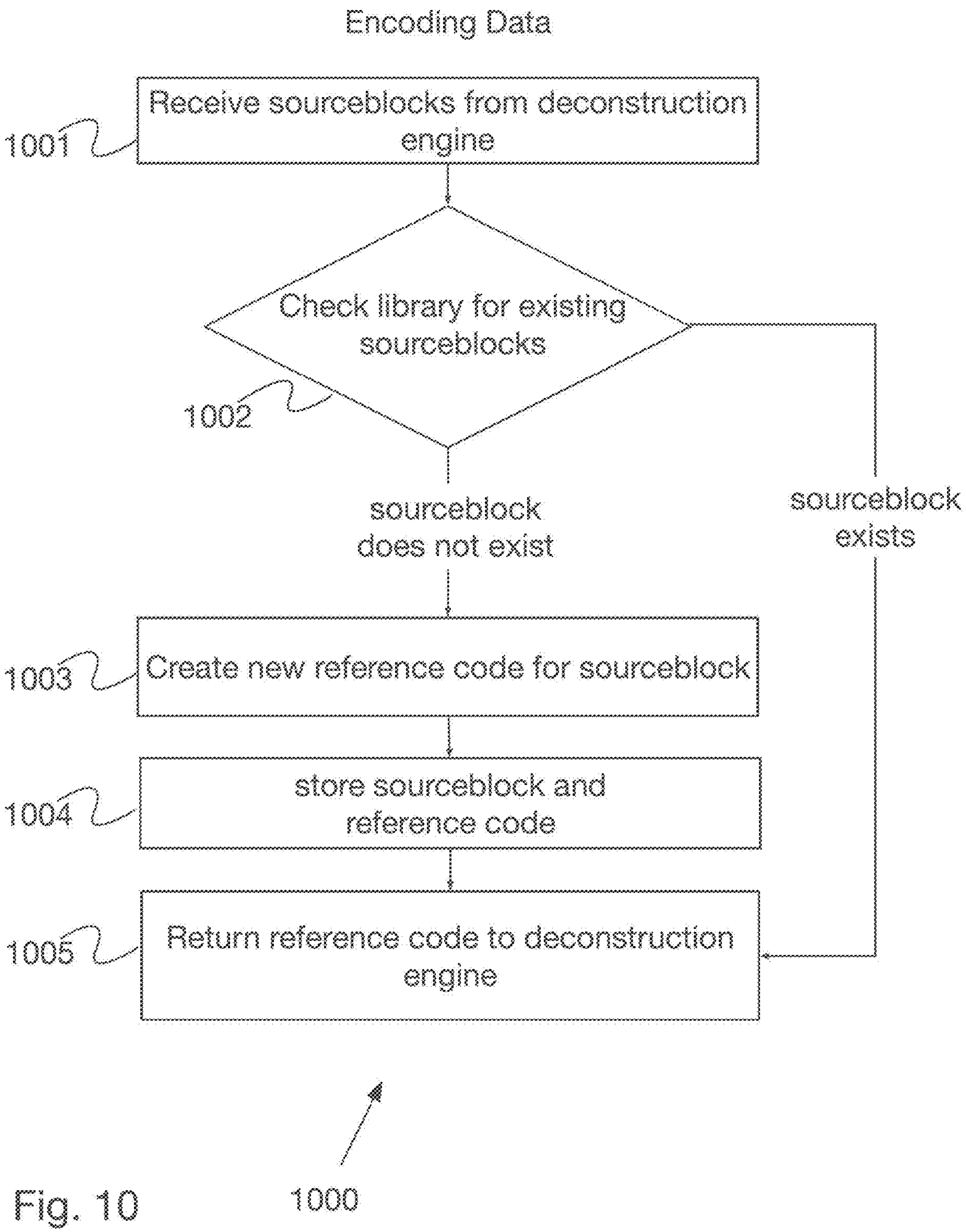
FIG. 10 is a method diagram showing the steps involved in using an embodiment to encode data.

FIG. 10 is a method diagram showing the steps involved in using an embodiment 1000 to encode data. As sourceblocks are received 1001 from the deconstruction engine, they would be compared 1002 with the sourceblocks already contained in the library. If that sourceblock already exists in the library, the associated reference code would be returned 1005 to the deconstruction engine. If the sourceblock does not already exist in the library, a new reference code would be created 1003 for the sourceblock. The new reference code and its associated sourceblock would be stored 1004 in the library, and the reference code would be returned to the deconstruction engine.

Figure 11:
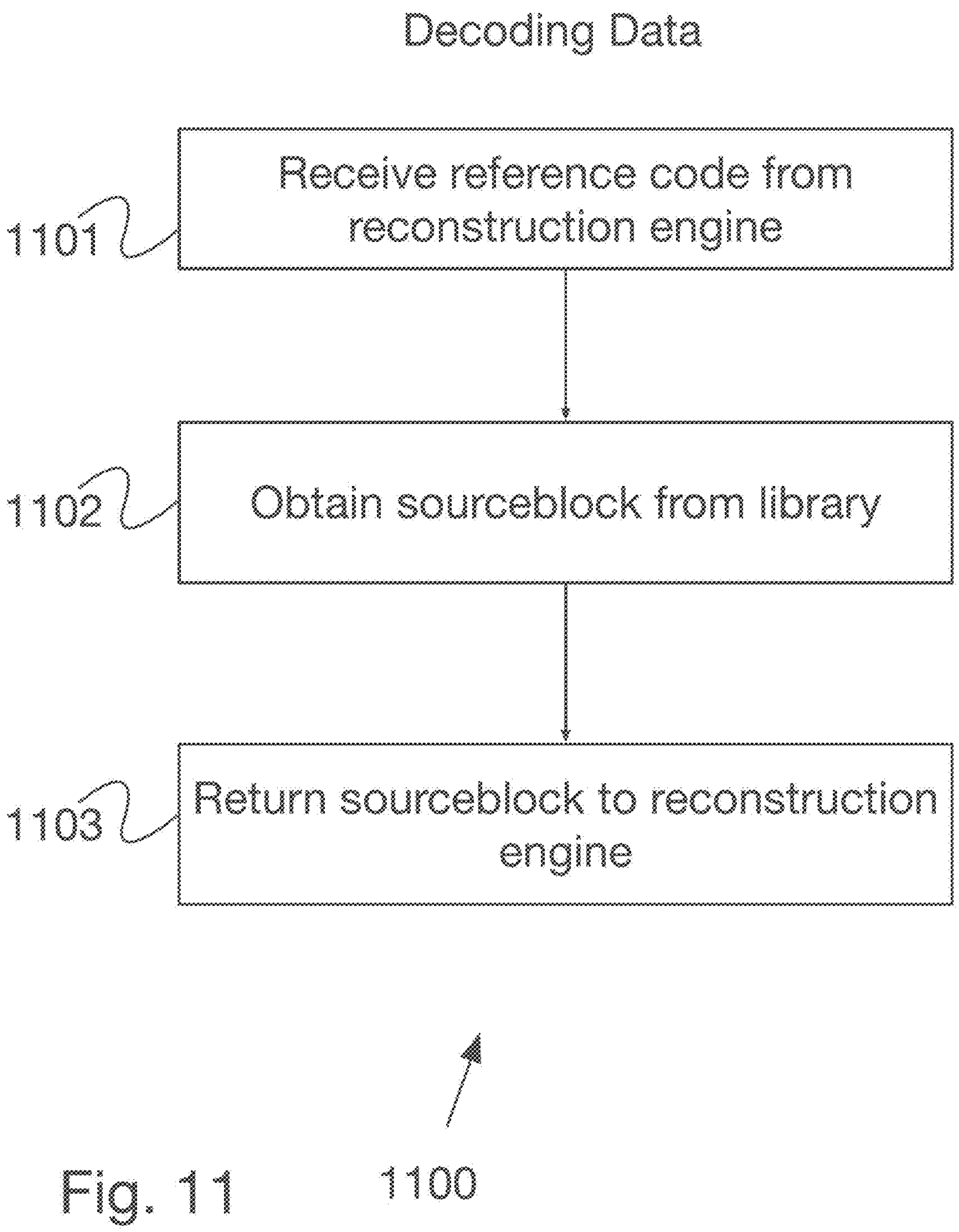
FIG. 11 is a method diagram showing the steps involved in using an embodiment to decode data.

FIG. 11 is a method diagram showing the steps involved in using an embodiment 1100 to decode data. As reference codes are received 1101 from the reconstruction engine, the associated sourceblocks are retrieved 1102 from the library, and returned 1103 to the reconstruction engine.

Figure 16:
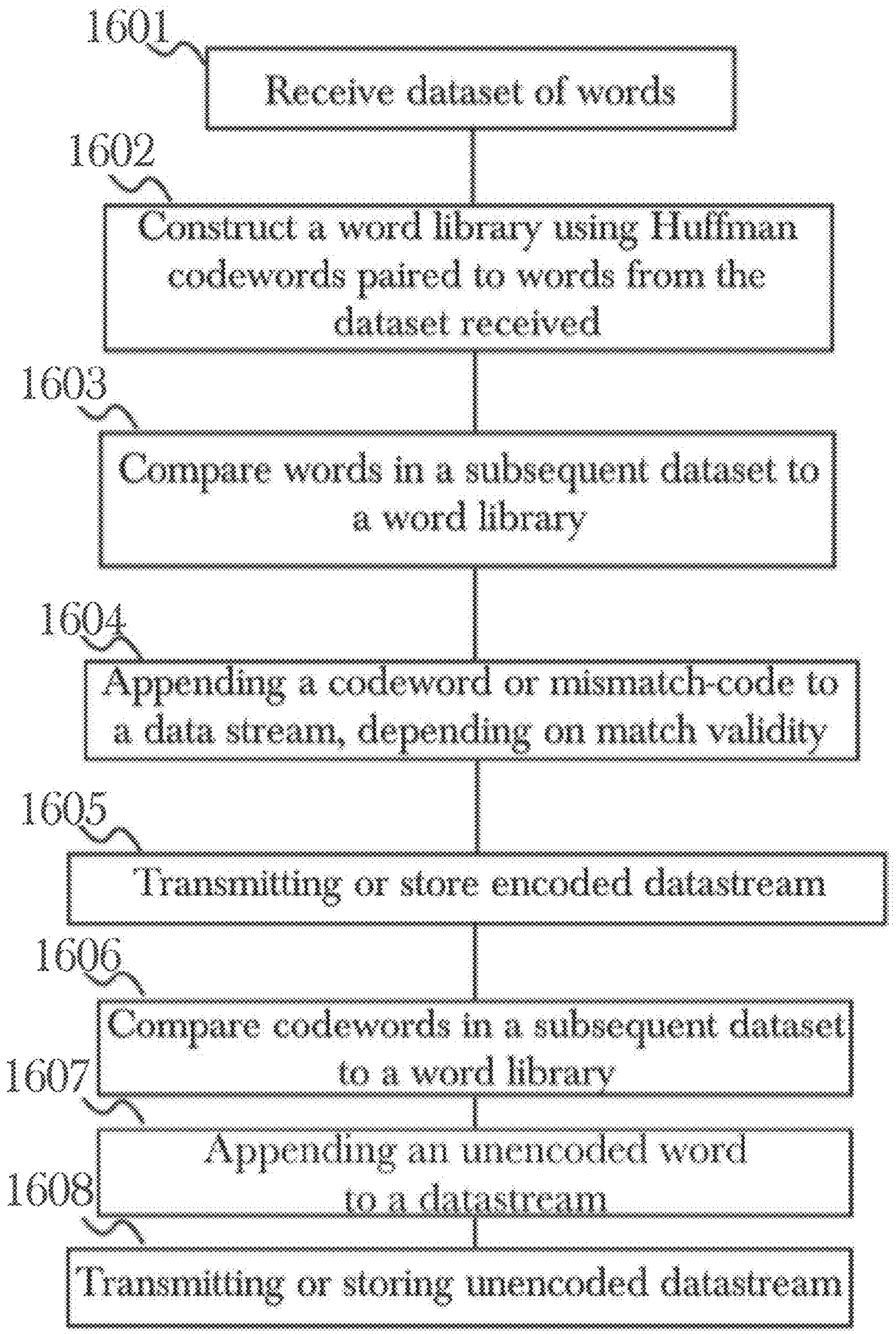
FIG. 16 is a method diagram illustrating key system functionality utilizing an encoder and decoder pair.

FIG. 16 is a method diagram illustrating key system functionality utilizing an encoder and decoder pair, according to a preferred embodiment. In a first step 1601, at least one incoming data set may be received at a customized library generator 1300 that then 1602 processes data to produce a customized word library 1201 comprising key-value pairs of data words (each comprising a string of bits) and their corresponding calculated binary Huffman codewords. A subsequent dataset may be received and compared to word library 1603 to determine proper codewords to use in order to encode the dataset. Words in the dataset are checked against the word library and appropriate encodings are appended to a data stream 1604. If a word is mismatched within the word library and the dataset, meaning that it is present in the dataset but not the word library, then a mismatched code is appended, followed by the unencoded original word. If a word has a match within the word library, then the appropriate codeword in the word library is appended to the data stream. Such a data stream may then be stored or transmitted 1605 to a destination as desired. For the purposes of decoding, an already-encoded data stream may be received and compared 1606, and un-encoded words may be appended to a new data stream 1607 depending on word matches found between the encoded data stream and the word library that is present. A matching codeword that is found in a word library is replaced with the matching word and appended to a data stream, and a mismatch code found in a data stream is deleted and the following unencoded word is re-appended to a new data stream, the inverse of the process of encoding described earlier. Such a data stream may then be stored or transmitted 1608 as desired.

Figure 17:
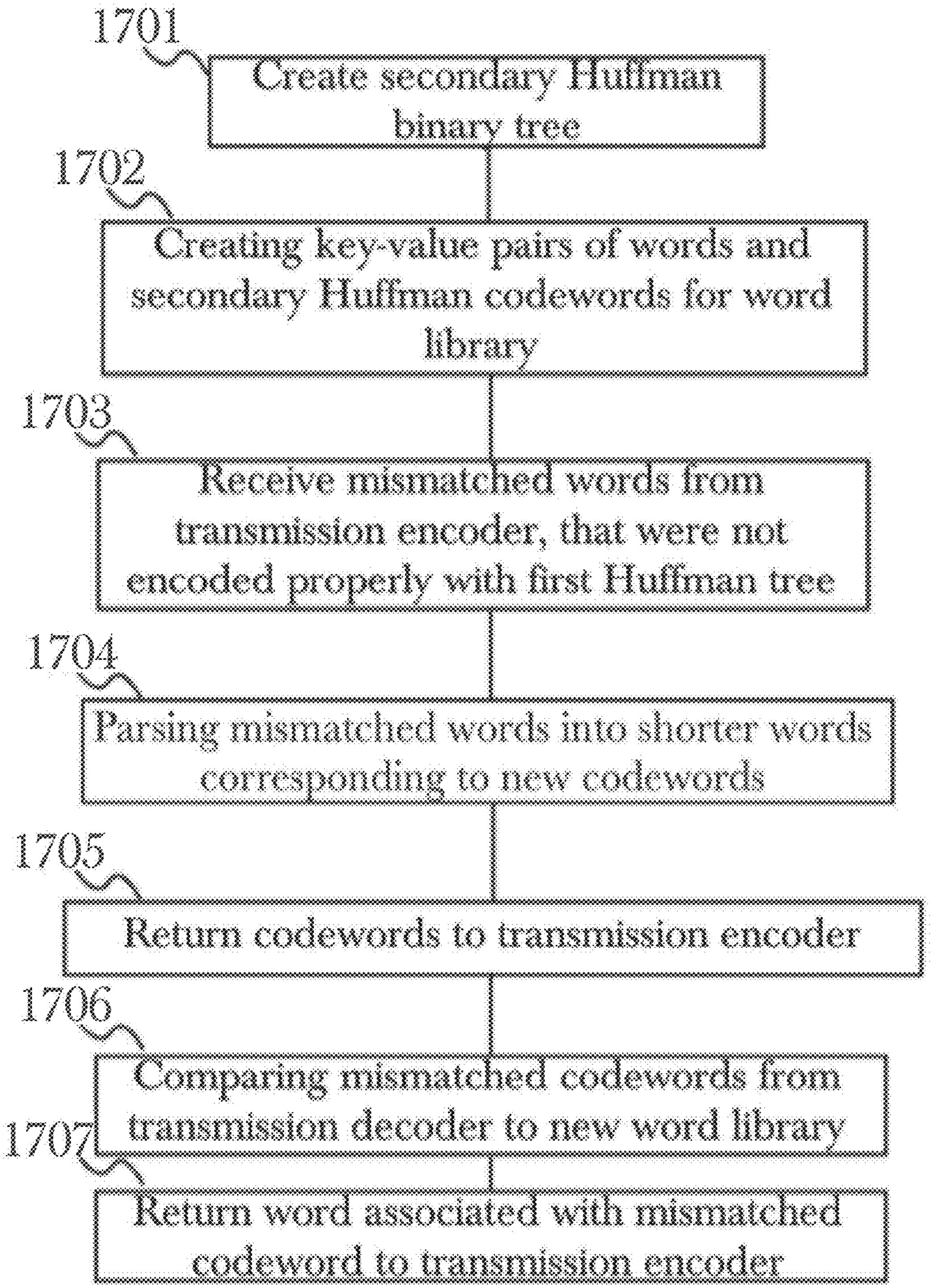
FIG. 17 is a method diagram illustrating possible use of a hybrid encoder/decoder to improve the compression ratio.

FIG. 17 is a method diagram illustrating possible use of a hybrid encoder/decoder to improve the compression ratio, according to a preferred aspect. A second Huffman binary tree may be created 1701, having a shorter maximum length of codewords than a first Huffman binary tree 1602, allowing a word library to be filled with every combination of codeword possible in this shorter Huffman binary tree 1702. A word library may be filled with these Huffman codewords and words from a dataset 1702, such that a hybrid encoder/decoder 1304, 1503 may receive any mismatched words from a dataset for which encoding has been attempted with a first Huffman binary tree 1703, 1604 and parse previously mismatched words into new partial codewords (that is, codewords that are each a substring of an original mismatched codeword) using the second Huffman binary tree 1704. In this way, an incomplete word library may be supplemented by a second word library. New codewords attained in this way may then be returned to a transmission encoder 1705, 1500. In the event that an encoded dataset is received for decoding, and there is a mismatch code indicating that additional coding is needed, a mismatch code may be removed and the unencoded word used to generate a new codeword as before 1706, so that a transmission encoder 1500 may have the word and newly generated codeword added to its word library 1707, to prevent further mismatching and errors in encoding and decoding.

It will be recognized by a person skilled in the art that the methods described herein can be applied to data in any form. For example, the method described herein could be used to store genetic data, which has four data units: C, G, A, and T. Those four data units can be represented as 2 bit sequences: 00, 01, 10, and 11, which can be processed and stored using the method described herein.

It will be recognized by a person skilled in the art that certain embodiments of the methods described herein may have uses other than data storage. For example, because the data is stored in reference code form, it cannot be reconstructed without the availability of the library of sourceblocks. This is effectively a form of encryption, which could be used for cyber security purposes. As another example, an embodiment of the method described herein could be used to store backup copies of data, provide for redundancy in the event of server failure, or provide additional security against cyberattacks by distributing multiple partial copies of the library among computers are various locations, ensuring that at least two copies of each sourceblock exist in different locations within the network.

Figure 18:
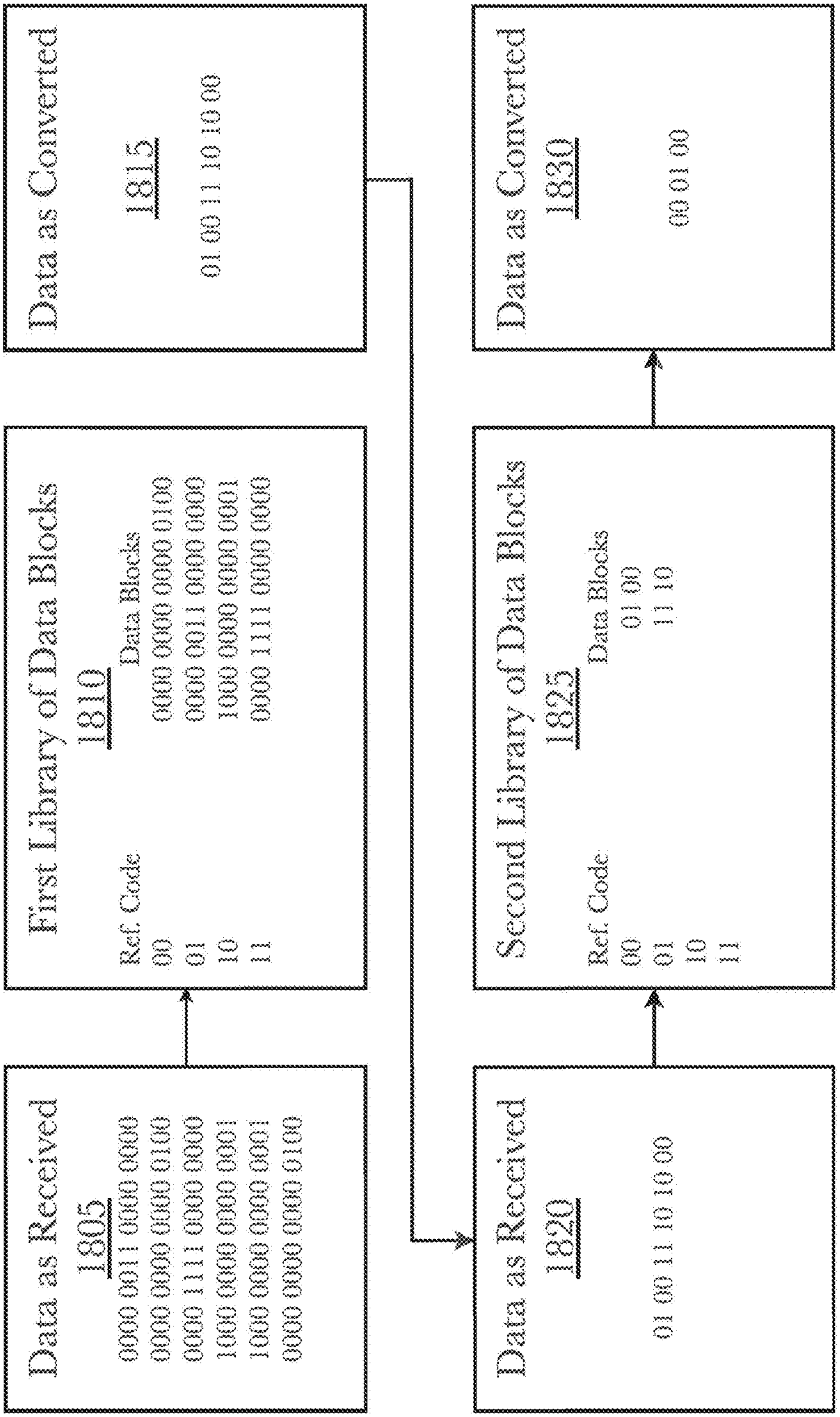
FIG. 18 is a flow diagram illustrating the use of a data encoding system used to recursively encode data to further reduce data size.

FIG. 18 is a flow diagram illustrating the use of a data encoding system used to recursively encode data to further reduce data size. Data may be input 1805 into a data deconstruction engine 102 to be deconstructed into code references, using a library of code references based on the input 1810. Such example data is shown in a converted, encoded format 1815, highly compressed, reducing the example data from 96 bits of data, to 12 bits of data, before sending this newly encoded data through the process again 1820, to be encoded by a second library 1825, reducing it even further. The newly converted data 1830 is shown as only 6 bits in this example, thus a size of 6.25% of the original data packet. With recursive encoding, then, it is possible and implemented in the system to achieve increasing compression ratios, using multi-layered encoding, through recursively encoding data. Both initial encoding libraries 1810 and subsequent libraries 1825 may be achieved through machine learning techniques to find optimal encoding patterns to reduce size, with the libraries being distributed to recipients prior to transfer of the actual encoded data, such that only the compressed data 1830 must be transferred or stored, allowing for smaller data footprints and bandwidth requirements. This process can be reversed to reconstruct the data. While this example shows only two levels of encoding, recursive encoding may be repeated any number of times. The number of levels of recursive encoding will depend on many factors, a non-exhaustive list of which includes the type of data being encoded, the size of the original data, the intended usage of the data, the number of instances of data being stored, and available storage space for codebooks and libraries. Additionally, recursive encoding can be applied not only to data to be stored or transmitted, but also to the codebooks and/or libraries, themselves. For example, many installations of different libraries could take up a substantial amount of storage space. Recursively encoding those different libraries to a single, universal library would dramatically reduce the amount of storage space required, and each different library could be reconstructed as necessary to reconstruct incoming streams of data.

Figure 20:
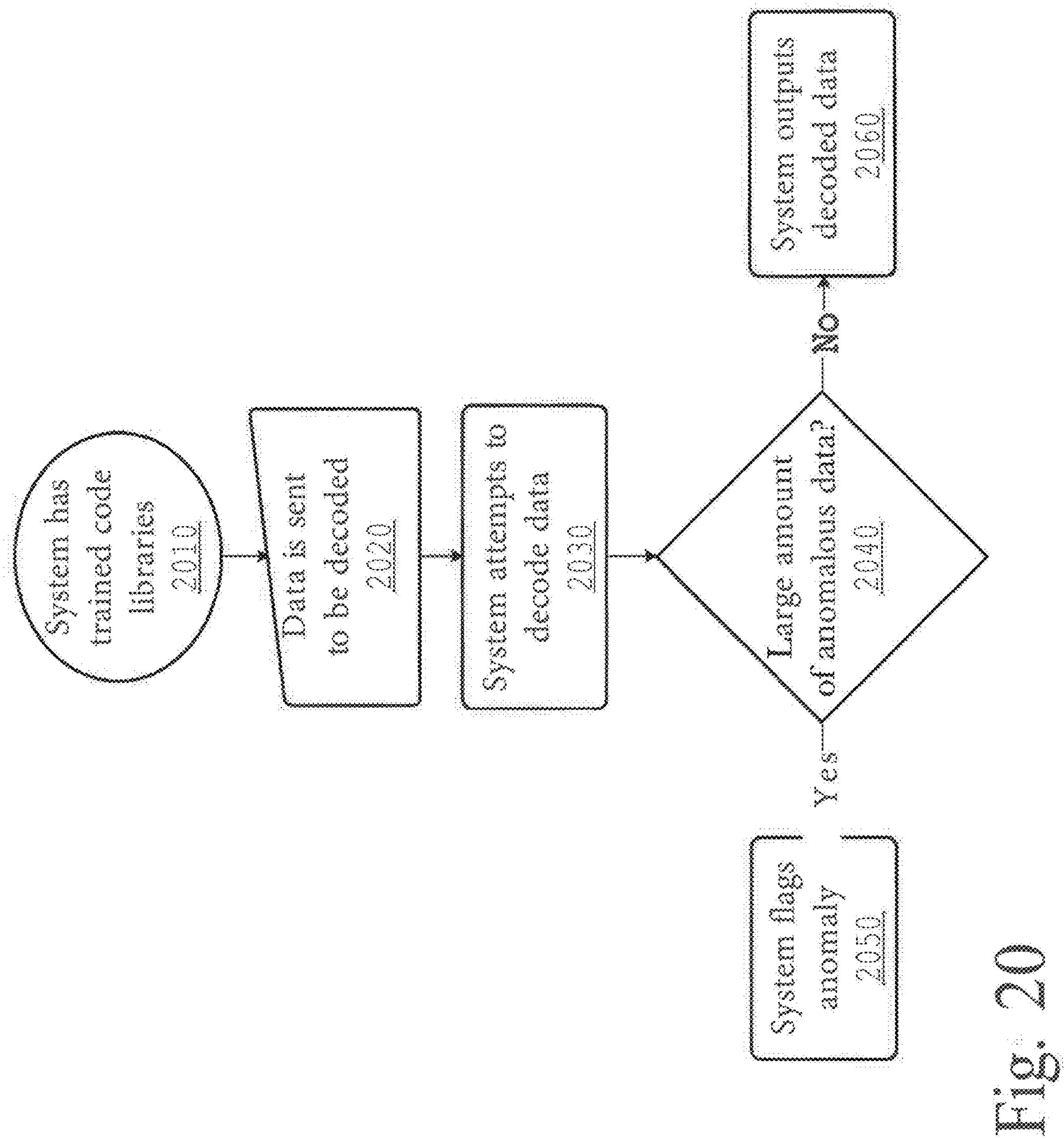
FIG. 20 is a flow diagram of an exemplary method used to detect anomalies in received encoded data and producing a warning.

FIG. 20 is a flow diagram of an exemplary method used to detect anomalies in received encoded data and producing a warning. A system may have trained encoding libraries 2010, before data is received from some source such as a network connected device or a locally connected device including USB connected devices, to be decoded 2020. Decoding in this context refers to the process of using the encoding libraries to take the received data and attempt to use encoded references to decode the data into its original source 2030, potentially more than once if recursive encoding was used, but not necessarily more than once. An anomaly detector 1910 may be configured to detect a large amount of un-encoded data 2040 in the midst of encoded data, by locating data or references that do not appear in the encoding libraries, indicating at least an anomaly, and potentially data tampering or faulty encoding libraries. A flag or warning is set by the system 2050, allowing a user to be warned at least of the presence of the anomaly and the characteristics of the anomaly. However, if a large amount of invalid references or unencoded data are not present in the encoded data that is attempting to be decoded, the data may be decoded and output as normal 2060, indicating no anomaly has been detected.

Figure 21:
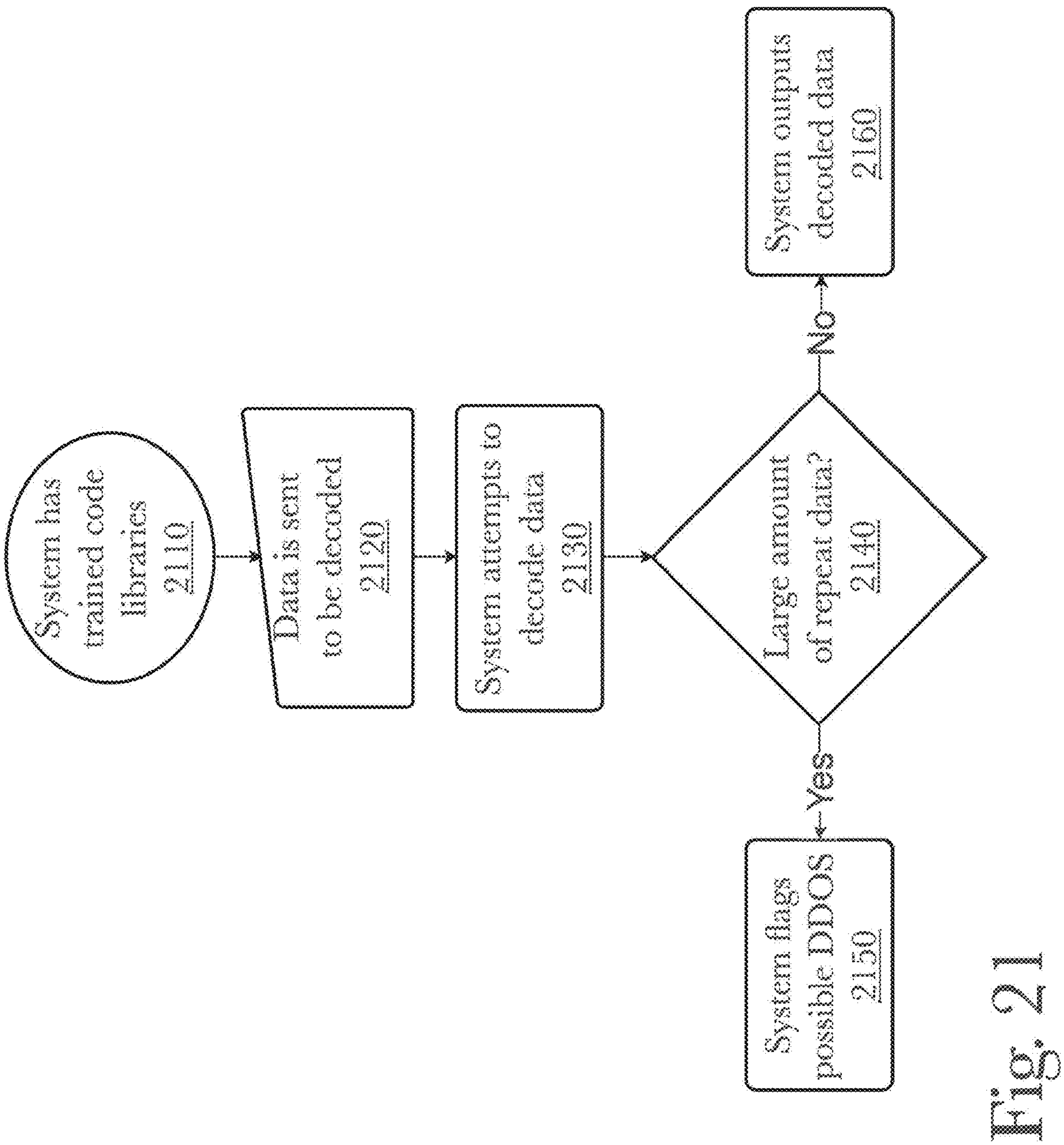
FIG. 21 is a flow diagram of a data encoding system used for Distributed Denial of Service (DDOS) attack denial.

FIG. 21 is a flow diagram of a method used for Distributed Denial of Service (DDoS) attack denial. A system may have trained encoding libraries 2110, before data is received from some source such as a network connected device or a locally connected device including USB connected devices, to be decoded 2120. Decoding in this context refers to the process of using the encoding libraries to take the received data and attempt to use encoded references to decode the data into its original source 2130, potentially more than once if recursive encoding was used, but not necessarily more than once. A DDOS detector 1920 may be configured to detect a large amount of repeating data 2140 in the encoded data, by locating data or references that repeat many times over (the number of which can be configured by a user or administrator as need be), indicating a possible DDOS attack. A flag or warning is set by the system 2150, allowing a user to be warned at least of the presence of a possible DDOS attack, including characteristics about the data and source that initiated the flag, allowing a user to then block incoming data from that source. However, if a large amount of repeat data in a short span of time is not detected, the data may be decoded and output as normal 2160, indicating no DDOS attack has been detected.

Figure 23:
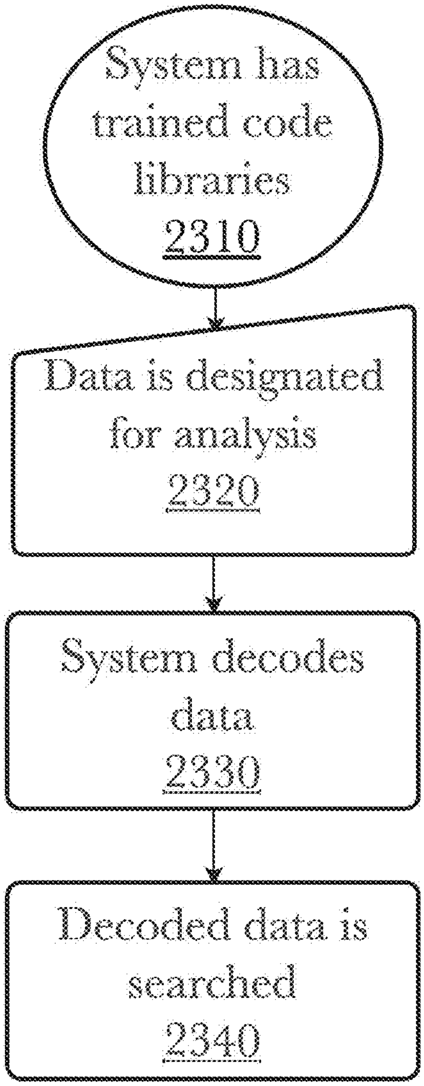
FIG. 23 is a flow diagram of an exemplary method used to enable high-speed data mining of repetitive data.

FIG. 23 is a flow diagram of an exemplary method used to enable high-speed data mining of repetitive data. A system may have trained encoding libraries 2310, before data is received from some source such as a network connected device or a locally connected device including USB connected devices, to be analyzed 2320 and decoded 2330. When determining data for analysis, users may select specific data to designate for decoding 2330, before running any data mining or analytics functions or software on the decoded data 2340. Rather than having traditional decryption and decompression operate over distributed drives, data can be regenerated immediately using the encoding libraries disclosed herein, as it is being searched. Using methods described in FIG. 9 and FIG. 11, data can be stored, retrieved, and decoded swiftly for searching, even across multiple devices, because the encoding library may be on each device. For example, if a group of servers host codewords relevant for data mining purposes, a single computer can request these codewords, and the codewords can be sent to the recipient swiftly over the bandwidth of their connection, allowing the recipient to locally decode the data for immediate evaluation and searching, rather than running slow, traditional decompression algorithms on data stored across multiple devices or transfer larger sums of data across limited bandwidth.

Figure 25:
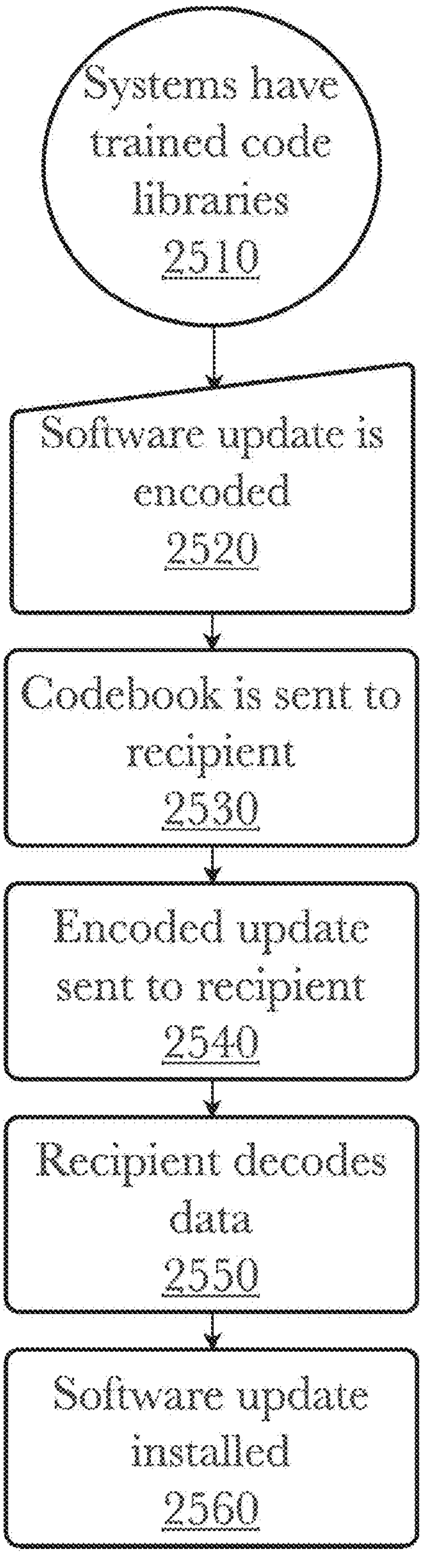
FIG. 25 is a flow diagram of an exemplary method used to encode and transfer software and firmware updates to a device for installation, for the purposes of reduced bandwidth consumption.

FIG. 25 is a flow diagram of an exemplary method used to encode and transfer software and firmware updates to a device for installation, for the purposes of reduced bandwidth consumption. A first system may have trained code libraries or "codebooks" present 2510, allowing for a software update of some manner to be encoded 2520. Such a software update may be a firmware update, operating system update, security patch, application patch or upgrade, or any other type of software update, patch, modification, or upgrade, affecting any computer system. A codebook for the patch must be distributed to a recipient 2530, which may be done beforehand and either over a network or through a local or physical connection, but must be accomplished at some point in the process before the update may be installed on the recipient device 2560. An update may then be distributed to a recipient device 2540, allowing a recipient with a codebook distributed to them 2530 to decode the update 2550 before installation 2560. In this way, an encoded and thus heavily compressed update may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 27:
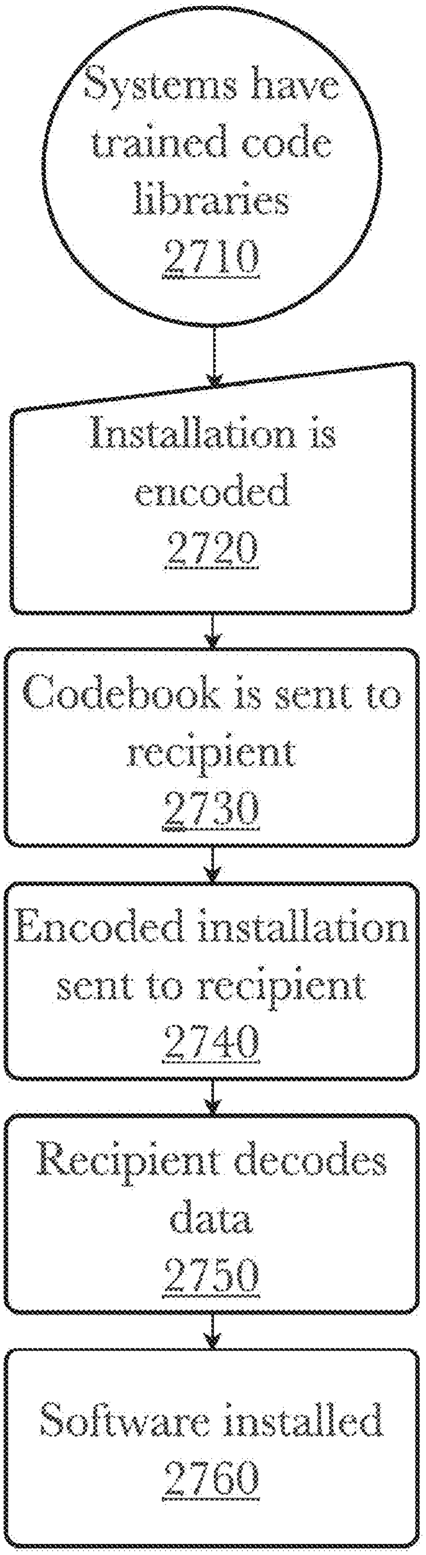
FIG. 27 is a flow diagram of an exemplary method used to encode new software and operating system installations for reduced bandwidth required for transference.

FIG. 27 is a flow diagram of an exemplary method used to encode new software and operating system installations for reduced bandwidth required for transference. A first system may have trained code libraries or "codebooks" present 2710, allowing for a software installation of some manner to be encoded 2720. Such a software installation may be a software update, operating system, security system, application, or any other type of software installation, execution, or acquisition, affecting a computer system. An encoding library or "codebook" for the installation must be distributed to a recipient 2730, which may be done beforehand and either over a network or through a local or physical connection, but must be accomplished at some point in the process before the installation can begin on the recipient device 2760. An installation may then be distributed to a recipient device 2740, allowing a recipient with a codebook distributed to them 2730 to decode the installation 2750 before executing the installation 2760. In this way, an encoded and thus heavily compressed software installation may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 31:
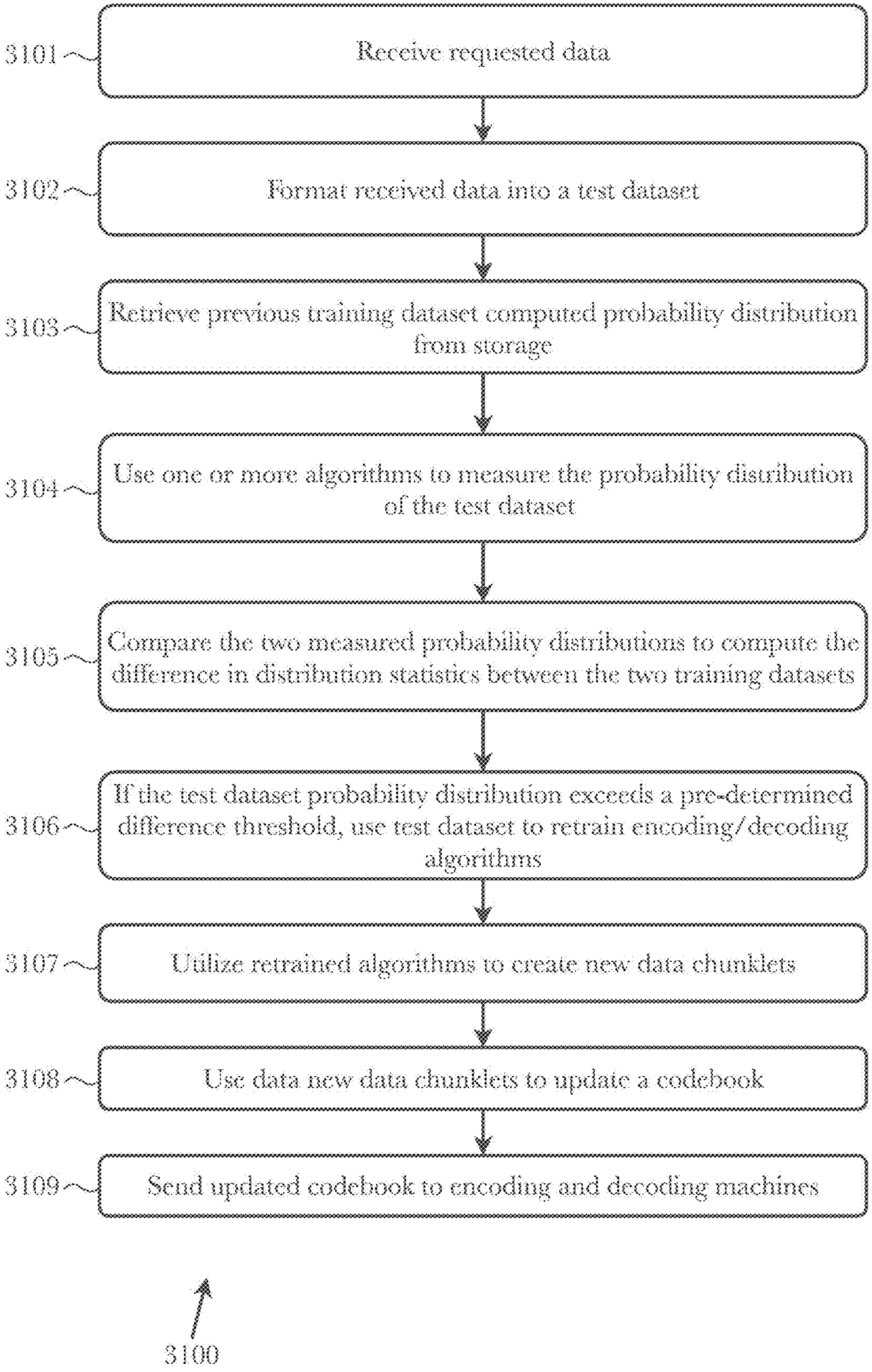
FIG. 31 is a method diagram illustrating the steps involved in using an embodiment of the codebook training system to update a codebook.

FIG. 31 is a method diagram illustrating the steps 3100 involved in using an embodiment of the codebook training system to update a codebook. The process begins when requested data is received 3101 by a codebook training module. The requested data may comprise a plurality of sourceblocks. Next, the received data may be stored in a cache and formatted into a test dataset 3102. The next step is to retrieve the previously computed probability distribution associated with the previous (most recent) training dataset from a storage device 3103. Using one or more algorithms, measure and record the probability distribution of the test dataset 3104. The step after that is to compare the measured probability distributions of the test dataset and the previous training dataset to compute the difference in distribution statistics between the two datasets 3105. If the test dataset probability distribution exceeds a pre-determined difference threshold, then the test dataset will be used to retrain the encoding/decoding algorithms 3106 to reflect the new distribution of the incoming data to the encoder/decoder system. The retrained algorithms may then be used to create new data sourceblocks 3107 that better capture the nature of the data being received. These newly created data sourceblocks may then be used to create new codewords and update a codebook 3108 with each new data sourceblock and its associated new codeword. Last, the updated codebooks may be sent to encoding and decoding machines 3109 in order to ensure the encoding/decoding system function properly.

Exemplary Computing Environment

Figure 39:
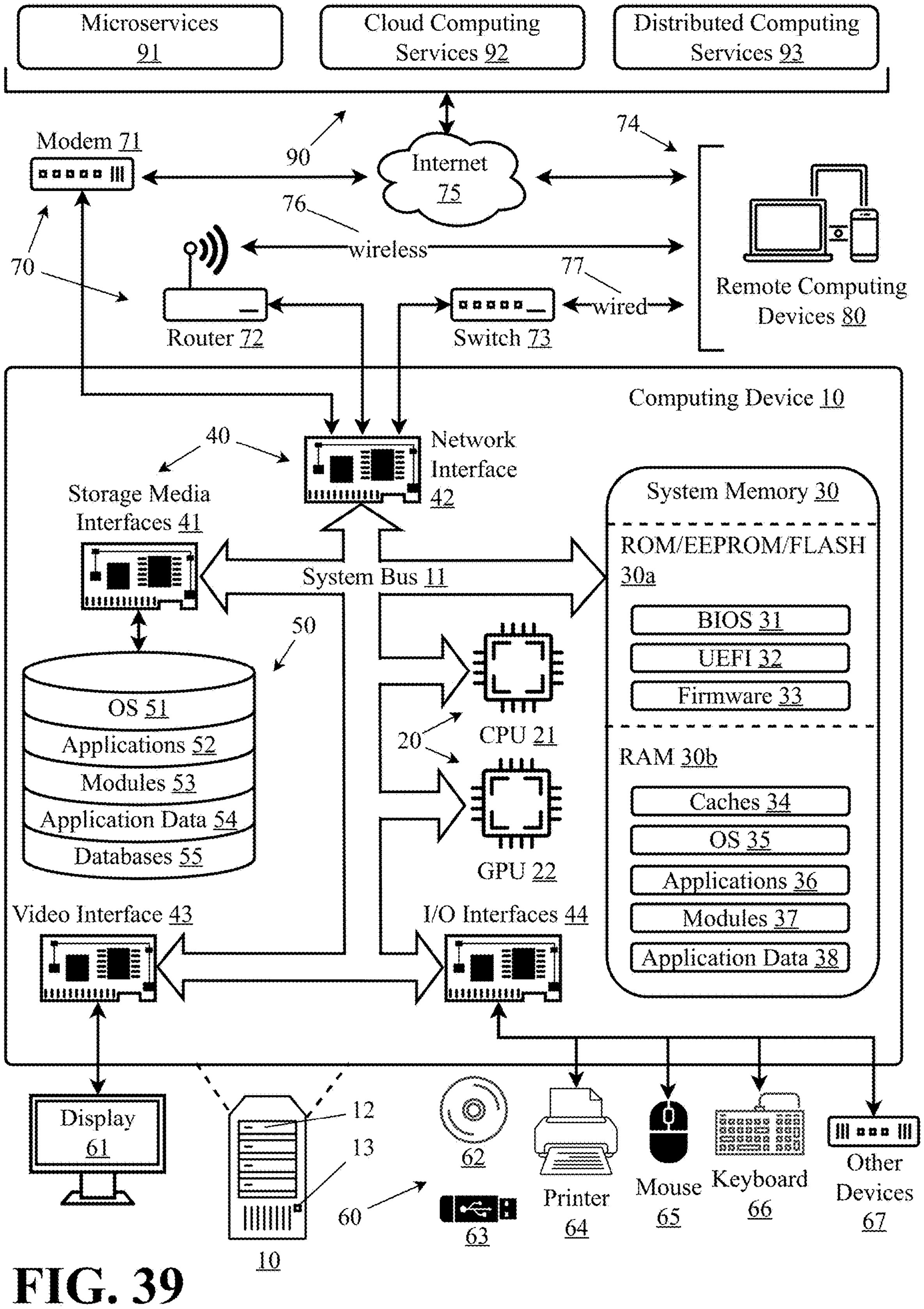
FIG. 39 illustrates an exemplary computing environment on which an embodiment described herein may be implemented, in full or in part.

FIG. 39 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for biometric-authenticated health data compaction, comprising:

a computing device comprising a processor, a memory, and a non-volatile data storage device;

a biometric authentication module comprising a first plurality of programming instructions stored in the memory and operable on the processor, wherein the first plurality of programming instructions, when operating on the processor, causes the processor to:

receive biometric signals from a plurality of biometric sensors associated with a patient;

extract biometric features from the received biometric signals using signal processing algorithms;

perform patient identity verification by comparing the extracted biometric features against stored biometric templates;

generate authentication credentials comprising cryptographic keys derived from the verified biometric features; and determine security access levels based on biometric authentication confidence scores;

a multi-codebook compaction system comprising a second plurality of programming instructions stored in the memory and operable on the processor, wherein the second plurality of programming instructions, when operating on the processor, causes the processor to:

receive health data from the patient;

divide the health data into a plurality of sourceblocks;

encode each sourceblock using a plurality of compression codebooks enhanced with the cryptographic keys derived from the biometric authentication;

select encoded sourceblocks based on compression efficiency; and generate compressed health data comprising the selected encoded sourceblocks with associated codebook identifiers and authentication metadata.

2. The system of claim 1, further comprising a clinical trial data optimization engine comprising a third plurality of programming instructions stored in the memory and operable on the processor, wherein the third plurality of programming instructions, when operating on the processor, causes the processor to:

classify the health data by clinical data type and trial endpoint significance;

determine statistical preservation requirements based on regulatory compliance standards;

select specialized compression codebooks optimized for clinical research data; and validate compressed health data maintains required statistical properties for clinical analysis.

3. The system of claim 1, wherein the biometric signals comprise at least two of: heart rate variability data, gait analysis data, voice pattern data, blood pressure waveform data, and breathing pattern data.

4. The system of claim 1, wherein the biometric authentication module further causes the processor to:

perform multi-modal biometric fusion by combining biometric features from multiple biometric modalities using mathematical fusion algorithms; and detect liveness of the biometric signals using temporal analysis and physiological correlation verification.

5. The system of claim 1, further comprising an emergency override system that causes the processor to:
detect medical emergency conditions based on biometric anomalies or external emergency signals;
perform streamlined authentication using healthcare provider credentials; and
provide rapid access to compressed health data while maintaining audit trail integrity.

6. The system of claim 1, wherein the multi-codebook compaction system further causes the processor to:
dynamically rotate compression codebooks based on biometric-derived selection parameters; and
vary sourceblock sizes for individual sourceblocks to enhance encoding security.

7. The system of claim 2, wherein the clinical trial data optimization engine classifies the health data into categories comprising:
primary endpoint data requiring maximum statistical preservation;
secondary endpoint data requiring high statistical preservation; and
safety data requiring specialized adverse event preservation protocols.

8. The system of claim 1, wherein the authentication credentials further comprise:
codebook selection seeds derived from the biometric features using cryptographic key derivation functions; and
session management tokens for continuous authentication during extended data collection periods.

9. The system of claim 1, wherein the system further comprises a multi-modal security controller that causes the processor to:
implement role-based access control using hierarchical user permissions;
generate comprehensive audit logs of all authentication and data access events; and
monitor for authentication anomalies and security threats.

10. A method for biometric-authenticated health data compaction, comprising the steps of:
receiving biometric signals from a plurality of biometric sensors associated with a patient;
extracting biometric features from the received biometric signals using signal processing algorithms;
performing patient identity verification by comparing the extracted biometric features against stored biometric templates;
generating authentication credentials comprising cryptographic keys derived from the verified biometric features;
determining security access levels based on biometric authentication confidence scores;
receiving health data from the patient;
dividing the health data into a plurality of sourceblocks;
encoding each sourceblock using a plurality of compression codebooks enhanced with the cryptographic keys derived from the biometric authentication;
selecting encoded sourceblocks based on compression efficiency; and
generating compressed health data comprising the selected encoded sourceblocks with associated codebook identifiers and authentication metadata.

11. The method of claim 10, further comprising the steps of:
classifying the health data by clinical data type and trial endpoint significance;
determining statistical preservation requirements based on regulatory compliance standards;
selecting specialized compression codebooks optimized for clinical research data; and
validating compressed health data maintains required statistical properties for clinical analysis.

12. The method of claim 10, wherein the biometric signals comprise at least two of: heart rate variability data, gait analysis data, voice pattern data, blood pressure waveform data, and breathing pattern data.

13. The method of claim 10, further comprising the steps of:
performing multi-modal biometric fusion by combining biometric features from multiple biometric modalities using mathematical fusion algorithms; and
detecting liveness of the biometric signals using temporal analysis and physiological correlation verification.

14. The method of claim 10, further comprising the steps of:
detecting medical emergency conditions based on biometric anomalies or external emergency signals;
performing streamlined authentication using healthcare provider credentials; and
providing rapid access to compressed health data while maintaining audit trail integrity.

15. The method of claim 10, wherein encoding each sourceblock further comprises:
dynamically rotating compression codebooks based on biometric-derived selection parameters; and
varying sourceblock sizes for individual sourceblocks to enhance encoding security.

16. The method of claim 11, wherein classifying the health data comprises categorizing the health data into:
primary endpoint data requiring maximum statistical preservation;
secondary endpoint data requiring high statistical preservation; and
safety data requiring specialized adverse event preservation protocols.

17. The method of claim 10, wherein generating authentication credentials further comprises:
deriving codebook selection seeds from the biometric features using cryptographic key derivation functions; and
creating session management tokens for continuous authentication during extended data collection periods.

18. The method of claim 10, further comprising the steps of:
implementing role-based access control using hierarchical user permissions;
generating comprehensive audit logs of all authentication and data access events; and
monitoring for authentication anomalies and security threats.

* * * * *